United States Patent
Yu et al.

(10) Patent No.: US 10,954,634 B2
(45) Date of Patent: Mar. 23, 2021

(54) NANOFIBRILLATED CELLULOSE PLY BONDING AGENT OR ADHESIVE AND MULTI-PLY ABSORBENT SHEET MADE THEREWITH

(71) Applicant: GPCP IP Holdings LLC, Atlanta, GA (US)

(72) Inventors: Zhiying Yu, Oskhosh, WI (US); Siddharth S. Vaijapurkar, Appleton, WI (US); Daniel W. Sumnicht, Hobart, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 282 days.

(21) Appl. No.: 15/405,397

(22) Filed: Jan. 13, 2017

(65) Prior Publication Data
US 2017/0204567 A1    Jul. 20, 2017

Related U.S. Application Data

(60) Provisional application No. 62/366,154, filed on Jul. 25, 2016, provisional application No. 62/366,137, (Continued)

(51) Int. Cl.
*D21H 27/00* (2006.01)
*D21H 27/32* (2006.01)
(Continued)

(52) U.S. Cl.
CPC .............. *D21H 27/002* (2013.01); *C08L 1/02* (2013.01); *C08L 1/08* (2013.01); *C08L 5/00* (2013.01);
(Continued)

(58) Field of Classification Search
None
See application file for complete search history.

(56) References Cited

U.S. PATENT DOCUMENTS

| | | |
|---|---|---|
| 3,414,459 A | 12/1968 | Wells |
| 3,994,771 A | 11/1976 | Morgan, Jr. et al. |

(Continued)

FOREIGN PATENT DOCUMENTS

| | | |
|---|---|---|
| CN | 102863940 B | 2/2015 |
| EP | 0947549 A1 | 10/1999 |

(Continued)

OTHER PUBLICATIONS

Paakko et al, enzymatic hydrolysis combined with mechanical shearing and high pressure homogenization for nanoscale cellulose fibrils and strong gels, biomacromolecules, 8, 1934-1941 (Year: 2007).*

(Continued)

*Primary Examiner* — Stefanie J Cohen
(74) *Attorney, Agent, or Firm* — Laura L. Bozek

(57) ABSTRACT

A ply-bonding agent or adhesive composition characterized by a viscosity and a surface tension for the manufacture of paper tissue and paper towel, includes: (a) water; (b) nanofibrillated cellulose; and (c) one or more modifiers effective to modify either or both of (i) the viscosity of the composition or (ii) the surface tension of the composition, wherein the one or more additional modifiers are selected from the group consisting of components (iii), (iv), (v), (vi), (vii) or (viii), wherein: (iii) is PVOH and a viscosity modifier; (iv) is a viscosity modifier; (v) is a viscosity modifier and a surface tension modifier other than PVOH; (vi) is a water-soluble cellulose derivative; (vii) is a water soluble polyol; and (viii) is a surface tension modifier other than PVOH. The (Continued)

compositions are particularly useful for ply-bonding multiply absorbent sheet when the plies are treated with debonder.

26 Claims, 28 Drawing Sheets

Related U.S. Application Data filed on Jul. 25, 2016, provisional application No. 62/280,161, filed on Jan. 19, 2016.

(51) Int. Cl.

| | | |
|---|---|---|
| *D21H 21/24* | (2006.01) | |
| *C08L 1/02* | (2006.01) | |
| *C08L 1/08* | (2006.01) | |
| *C08L 5/00* | (2006.01) | |
| *C09J 5/04* | (2006.01) | |
| *C09J 7/21* | (2018.01) | |
| *C09J 105/06* | (2006.01) | |
| *C09J 105/00* | (2006.01) | |
| *C09J 171/02* | (2006.01) | |
| *C08L 5/06* | (2006.01) | |
| *C08L 71/02* | (2006.01) | |
| *C09J 11/08* | (2006.01) | |
| *C09J 101/04* | (2006.01) | |
| *C09J 129/04* | (2006.01) | |

(52) U.S. Cl.
CPC ............... *C08L 5/06* (2013.01); *C08L 71/02* (2013.01); *C09J 5/04* (2013.01); *C09J 7/21* (2018.01); *C09J 11/08* (2013.01); *C09J 101/04* (2013.01); *C09J 105/00* (2013.01); *C09J 105/06* (2013.01); *C09J 129/04* (2013.01); *C09J 171/02* (2013.01); *D21H 21/24* (2013.01); *D21H 27/005* (2013.01); *D21H 27/32* (2013.01); *C08L 2205/025* (2013.01); *C08L 2205/03* (2013.01); *C09J 2401/00* (2013.01); *C09J 2401/006* (2013.01); *C09J 2405/00* (2013.01); *C09J 2429/00* (2013.01)

(56) References Cited

U.S. PATENT DOCUMENTS

| | | |
|---|---|---|
| 4,026,752 A | 5/1977 | Hartbauer et al. |
| 4,102,737 A | 7/1978 | Morton |
| 4,351,699 A | 9/1982 | Osborn, III |
| 4,441,962 A | 4/1984 | Osborn, III |
| 4,447,294 A | 5/1984 | Osborn, III |
| 4,460,738 A | 7/1984 | Frentzel et al. |
| 4,528,334 A | 7/1985 | Knopf et al. |
| 4,529,480 A | 7/1985 | Trokhan |
| 4,702,496 A | 10/1987 | Hume, III |
| 5,240,562 A | 8/1993 | Phan et al. |
| 5,279,767 A | 1/1994 | Phan et al. |
| 5,622,597 A | 4/1997 | Callen et al. |
| 5,698,076 A | 12/1997 | Phan et al. |
| 5,730,839 A | 3/1998 | Wendt et al. |
| 5,753,079 A | 5/1998 | Jenny et al. |
| 5,858,554 A | 1/1999 | Neal et al. |
| 6,342,297 B1 | 1/2002 | LaBrash |
| 6,734,335 B1 | 5/2004 | Graef et al. |
| 7,201,815 B2 | 4/2007 | Muvundamina |
| 7,585,388 B2 | 9/2009 | Yeh et al. |
| 7,585,389 B2 | 9/2009 | Yeh et al. |
| 7,614,110 B2 | 11/2009 | Akai et al. |
| 7,642,226 B2 | 1/2010 | Verrall et al. |
| 7,662,257 B2 | 2/2010 | Edwards et al. |
| 7,700,764 B2 | 4/2010 | Heijnesson-Hultén |
| 7,736,464 B2 | 6/2010 | Kokko |
| 7,799,402 B2 | 9/2010 | Redmann et al. |
| 7,850,823 B2 | 12/2010 | Chou et al. |
| 7,951,266 B2 | 5/2011 | Kokko et al. |
| 7,967,933 B2 | 6/2011 | Redmann et al. |
| 8,057,892 B2 * | 11/2011 | Yang ............... C09J 189/00 428/323 |
| 8,287,692 B2 | 10/2012 | Miyawaki et al. |
| 8,287,986 B2 | 10/2012 | Huss et al. |
| 8,377,563 B2 | 2/2013 | Miyawaki et al. |
| 8,409,404 B2 | 4/2013 | Harper et al. |
| 8,546,558 B2 | 10/2013 | Ankerfors et al. |
| 8,647,468 B2 | 2/2014 | Heiskanen et al. |
| 8,728,273 B2 | 5/2014 | Heiskanen et al. |
| 8,747,612 B2 | 6/2014 | Heiskanen et al. |
| 8,778,134 B2 | 7/2014 | Vehvilainen et al. |
| 8,778,138 B2 | 7/2014 | Super et al. |
| 8,992,728 B2 | 3/2015 | Isogai et al. |
| 9,000,073 B2 | 4/2015 | Ceulemans et al. |
| 9,822,285 B2 | 11/2017 | Sumnicht et al. |
| 2008/0142177 A1 | 6/2008 | Shannon et al. |
| 2009/0042003 A1 | 2/2009 | Govang et al. |
| 2009/0308552 A1 | 12/2009 | Yano et al. |
| 2010/0285295 A1 * | 11/2010 | Wang ............... C09J 11/04 428/292.4 |
| 2010/0300605 A1 | 12/2010 | Redmann et al. |
| 2011/0052881 A1 | 3/2011 | Netravali et al. |
| 2011/0263756 A1 | 10/2011 | Yano et al. |
| 2011/0277947 A1 | 11/2011 | Hua et al. |
| 2012/0058536 A1 | 3/2012 | Ruda et al. |
| 2012/0219816 A1 | 8/2012 | Heiskanen et al. |
| 2013/0035263 A1 * | 2/2013 | Laukkanen ............... C08L 1/02 507/112 |
| 2014/0083634 A1 | 3/2014 | Bjoerkqvist et al. |
| 2014/0154756 A1 | 6/2014 | Nelson et al. |
| 2014/0284407 A1 | 9/2014 | Tamper et al. |
| 2015/0090156 A1 | 4/2015 | Combs et al. |
| 2015/0167243 A1 | 6/2015 | Bilodeau et al. |
| 2015/0368368 A1 | 12/2015 | Retsina et al. |
| 2016/0215179 A1 | 7/2016 | Sumnicht et al. |
| 2017/0204304 A1 | 7/2017 | Yu et al. |
| 2017/0204567 A1 | 7/2017 | Yu et al. |
| 2018/0037781 A1 | 2/2018 | Sumnicht et al. |

FOREIGN PATENT DOCUMENTS

| | | |
|---|---|---|
| EP | 2526158 A1 | 11/2012 |
| JP | S60250079 A | 12/1985 |
| JP | 2012197544 A | 10/2012 |
| JP | 2015189205 A | 11/2015 |
| WO | 1997008387 A1 | 3/1997 |
| WO | 1997011226 A1 | 3/1997 |
| WO | 2006071147 A1 | 7/2006 |
| WO | 2010066905 A1 | 6/2010 |
| WO | 2011089053 A1 | 7/2011 |
| WO | 2014085729 A1 | 6/2014 |
| WO | 2016122956 A1 | 8/2016 |
| WO | 2017127335 A1 | 7/2017 |
| WO | 2017127336 A1 | 7/2017 |

OTHER PUBLICATIONS

Huang et al, adhesive properties of soy proteins modified by sodium dodecyl sulfate and sodium dodecylbenzene sulfonate, JAOCS, 77, 7 pp. 705-708 (Year: 2000).*

Vishnuvarthanan et al, additives for enhancing the drying properties of adhesives for corrugated boards, alexandria engineering journal, 52, 137-140 (Year: 2013).*

Gonzalez et al, from paper to nanopaper:evolution of mechanical and physical properties, cellulose, 21:2599-2609 (Year: 2014).*

Adel et al, a study of wet and dry strength properties of unaged and hygrothermally aged paper sheets reinforced with biopolymer composites, journal of applied polymer science, wiley, 131(18), pp. 40671-40774 (Year: 2014).*

Pahinnanolis et al, Nanofibrillated cellulose/carboxymethyl cellulose composite with improved wet strength, cellulose, 20:1459-1468 (Year: 2013).*

(56) References Cited

OTHER PUBLICATIONS

Extended European Search report dated Oct. 15, 2018 in related European patent application No. EP 16743873.
Bertolla, L. et al.; "Preparation and characterization of Bioglass-based scaffolds reinforced by poly-vinyl alcohol/microfibrillated cellulose composite coating"; Journal of the European Ceramic Society; 2014; pp. 3379-3387; 34; Elsevier Ltd.
Bertolla, L. et al.; "Preparation and characterization of Bioglass-based scaffolds reinforced by poly-vinyl alcohol/microfibrillated cellulose composite coating"; Chem Abstracts Service: XP002782684; pp. 1-2.
European Search Report dated Jul. 4, 2019 in related U.S. Appl. No. 15/405,795, filed Jan. 13, 2017.
Sorvari, Anni et al., "Modifying the flocculation of microfibrillated cellulose suspensions by soluble polysaccharides under conditions unfavorable to adsorption"; Carbohydrate Polymers, Jun. 15, 2014, pp. 283-292, vol. 106, Elsevier Ltd.
European Search Report dated Jul. 4, 2019.
International Preliminary Report on Patentability (U.S. Appl. No. 15/405,397) dated Jan. 29, 2018.
International Preliminary Report on Patentability (U.S. Appl. No. 15/405,795) dated Jan. 28, 2018.
U.S. Appl. No. 15/405,795, Yu et al.
International Search Report dated Mar. 30, 2017 (PCT/US2017/013693; Corresponding to U.S. Appl. No. 15/405,795).
Written Opinion dated Mar. 30, 2017 (PCT/US2017/013693; Corresponding to U.S. Appl. No. 15/405,795).
International Search Report dated Feb. 26, 2016 (PCT/US2016/014256; Corresponding to U.S. Appl. No. 15/000,071).
Written Opinion dated Feb. 26, 2016 (PCT/US2016/014256; Corresponding to U.S. Appl. No. 15/000,071).
Written Opinion dated Nov. 14, 2016 (PCT/US2016/014256; Corresponding to U.S. Appl. No. 15/000,071).
International Preliminary Report on Patentablility dated May 10, 2017 (PCT/US2016/014256; Corresponding to U.S. Appl. No. 15/000,071).
International Search Report dated Mar. 30, 2017.
Written Opinion dated Mar. 30, 2017.
S. Jonjankiat et al., "Improvement of Poly(Vinyl Alcohol) Adhesives With Cellulose Microfibre from Surgarcane Bagasse", Iranian Polymer Journal, Jan. 1, 2011, pp. 305-317, vol. 20, No. 4, Iran Polymer and Petrochemical Institute, IR.
Partial European Search report in related European counterpart application to U.S. Appl. No. 15/951,630 dated Aug. 3, 2018.
Lu, J., et al., "Preparation and properties of microfibrillated cellulose polyvinyl alcohol composite materials", Composites: Part A (2008), pp. 738-746, vol. 39, Elsevier.
Richter, K., et al., "Performance of cellulose nano-fibrils in wood adhesives", Proceeding of Swiss Bonding 09 (2009), pp. 239-246.
Virtanen, S., et al., "Modified nanofibrillated cellulose-polyvinyl alcohol films with improved mechanical performance", RSC Advances (2014), pp. 11343-11350, vol. 4, Royal Society of Chemistry.
García-Ochoa, F., et al. , "Xanthan gum: production, recovery, and properties", Biotechnology Advances, 2000, pp. 549-579, vol. 18, Issue 7, Elsevier.

* cited by examiner

CWP BASE SHEET

STRUCTURED BASE SHEET

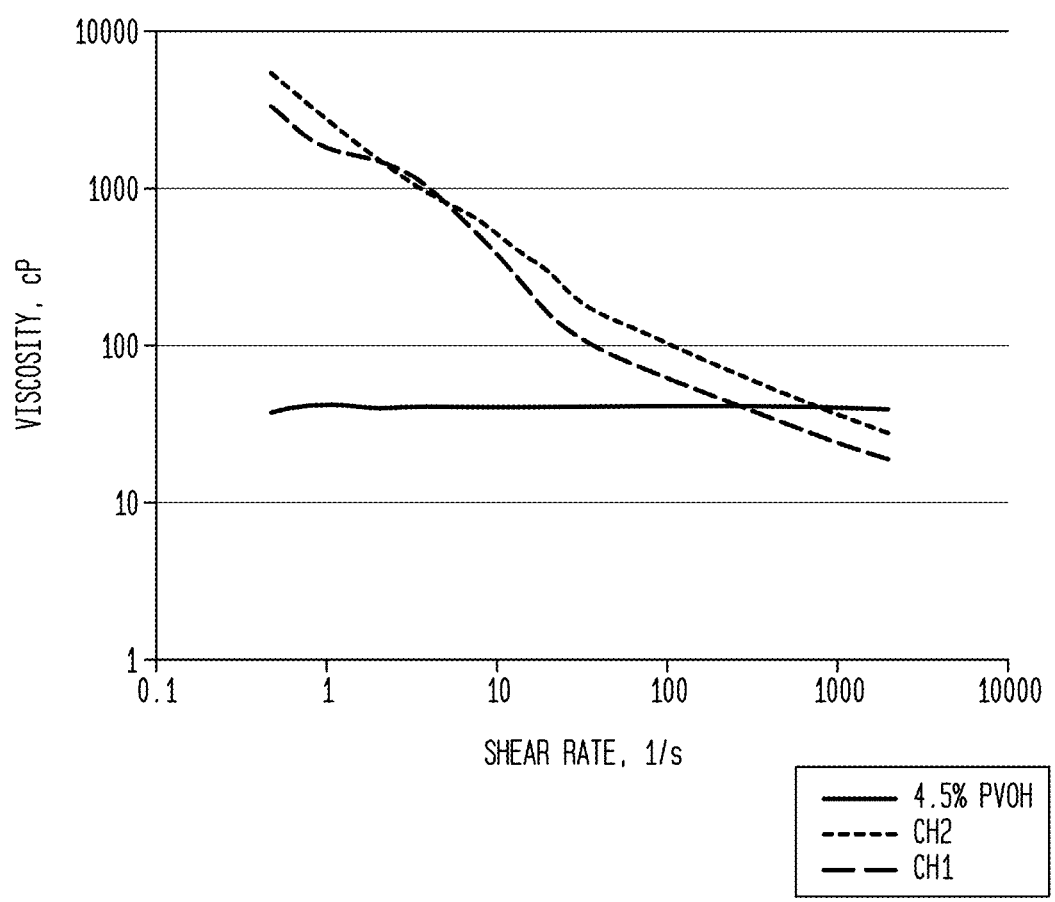

COMPARISON OF PLYBOND
CWP

COMPARISON OF PLYBOND
STRUCTURED

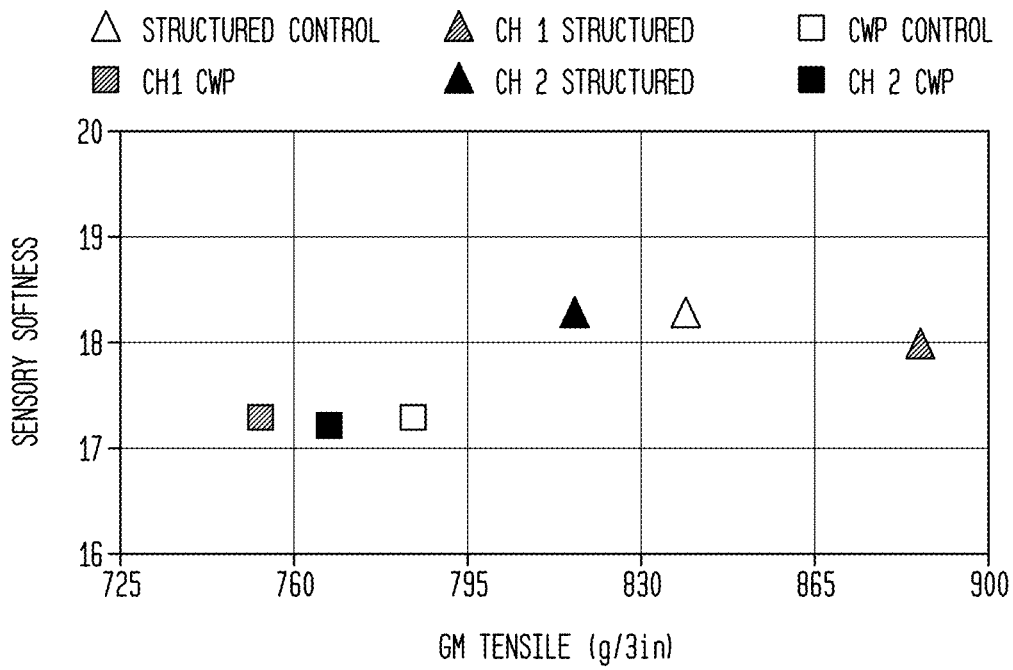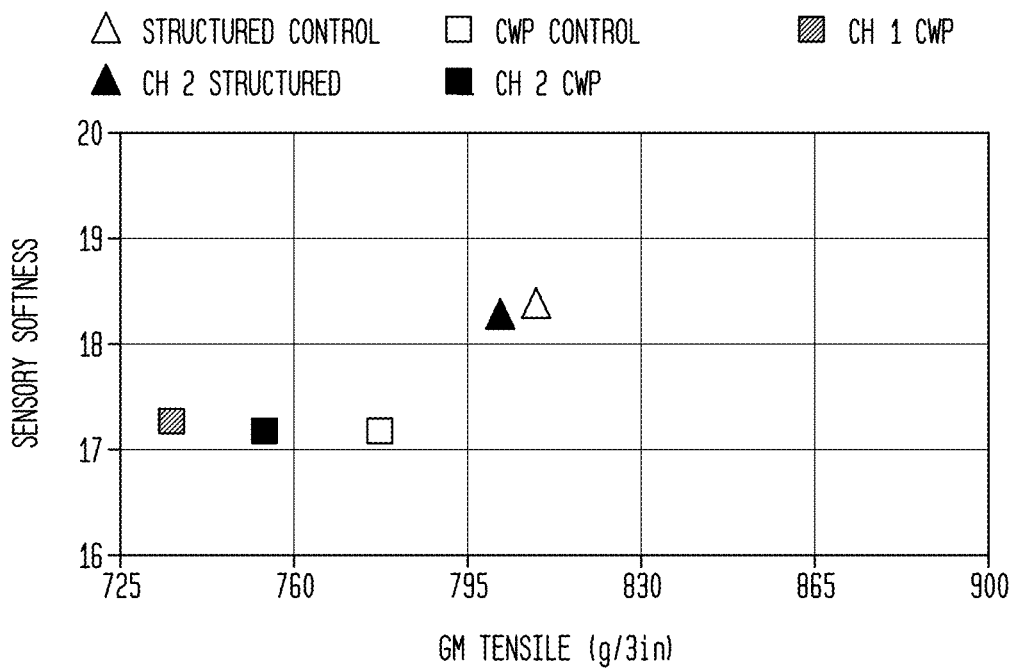

FIG. 10
COMPARISON OF PLYBOND THROUGH A POLYMER MATRIX (SUCH AS PVOH) AND PLYBOND THROUGH THE USE OF NFC ADHESIVE.
(a). TISSUE PLYBOND THROUGH THE USE OF POLYMER (PVOH):
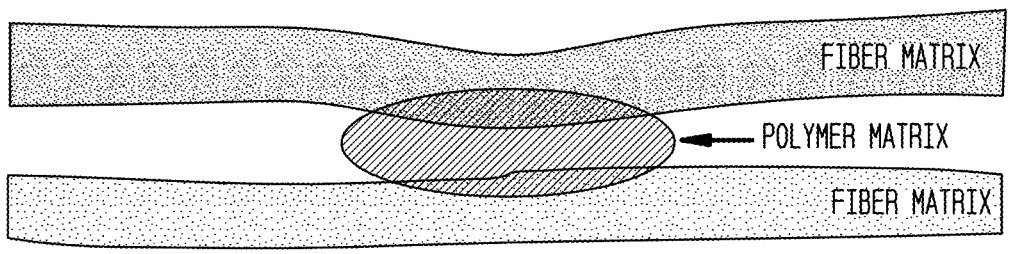
(b). TISSUE PLYBOND THROUGH THE USE OF NFC BONDING AGENT:
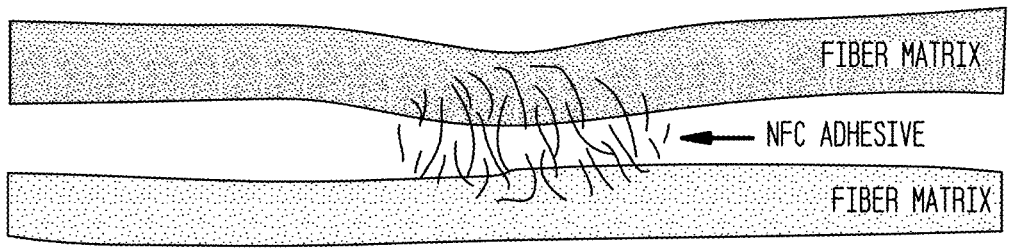

SEM MICROGRAPHS OF NFC PREPARED BY AIR DRYING (A) AND SUPERCRITICAL $CO_2$ DRYING (B)

SURFACE TENSION OF NFC

NFC W/ VISCOSITY MODIFIER

NFC-CMC BONDING ADHESIVE

NFC-PECTIN BONDING ADHESIVE

THE EFFECT OF CONVERTING SPEED ON PLYBOND WITH NFC ADHESIVE

THE EFFECT OF CONVERTING SPEED ON PLYBOND WITH H.B. FULLER REGULAR GLUE AND H.B. FULLER NFC ADHESIVE

THE EFFECT OF NFC ADHESIVE ON PLYBOND REINFORCEMENT

NFC ADHESIVE AND CONVERTING SPEED

HENKEL REGULAR VS. HENKEL NFC ADHESIVE

NANOFIBRILLATED CELLULOSE PLY BONDING AGENT OR ADHESIVE AND MULTI-PLY ABSORBENT SHEET MADE THEREWITH

CLAIM FOR PRIORITY

This application is based on U.S. Provisional Application No. 62/280,161, filed Jan. 19, 2016, entitled Nanofibrillated Cellulose Ply-bonding Agent and Multi-Ply Absorbent Sheet Made Therewith and U.S. Provisional Application No. 62/366,154, filed Jul. 25, 2016 entitled Converting Process and Multi-Ply Absorbent Sheet with Nanofibrillated Cellulose Ply-Bonding Adhesive as well as U.S. Provisional Application No. 62/366,137 filed Jul. 25, 2016 entitled Absorbent Sheet Tail Sealed with Nanofibrillated Cellulose Containing Adhesives. The priorities of the foregoing applications are hereby claimed and their disclosures incorporated herein by reference.

TECHNICAL FIELD

The present invention relates generally to multi-ply absorbent sheet ply-bonding or adhesive compositions, wherein the plies are bonded to one another with a pseudoplastic composition provided with nanofibrillated cellulose. The plybonding compositions of the invention include nanofibrillated cellulose and additional components such as a viscosity modifier in preferred embodiments. The plybonding compositions of the invention develop increased plybond and are relatively insensitive to debonder content in the basesheet which enables higher converting speed and productivity.

BACKGROUND

Nanofibrillated cellulose (NFC) or sometimes referred to as microfibrillated cellulose (MFC) is known in the art to be useful for a variety of purposes, including for use as a structural material in sheet and related articles. For example, in U.S. Pat. No. 6,734,335 it is mentioned that NFC is useful in absorbent structures. Col. 22, lines 13+. See, also, U.S. Pat. No. 7,614,110, Col. 13, lines 38+. United States Patent Application Publication No. US 2012/0219816 discloses use of NFC as a layer in a multilayer paperboard structure, Abstract. See, generally, United States Patent Application Publication No. US 2012/0058536, ¶ [0151], which discloses NFC as a structural material. NFC is used in molded structures, as seen in United States Patent Application Publication No. US 2009/0308552, ¶ [0001], as well as United States Patent Application Publication No. US 2011/0263756, Abstract. NFC is, likewise, known for use in adhesives. JP 60250079 discloses a liquid adhesive made by blending a polyvinyl acetate emulsion, sodium carboxymethyl cellulose and above 3-4% NFC based on the weight of the liquid composition. See, also, United States Patent Application Publication No. US 2010/0285295, ¶ [0023], where NFC is mentioned as a filler for an adhesive resin; United States Patent Application Publication No. US 2011/0052881, ¶ [0062], having similar discussion, as well as United States Patent Application Publication No. US 2009/0042003, ¶ [0057].

United States Patent Application Publication No. US2015/0090156 of Combs et al., entitled Adhesives That Include Plasticized Starch Derivatives and Methods and Articles Relating Thereto (Celanese Acetate LLC) disclose hot melt adhesive compositions based on starch, cellulose acetate and/or acetins and propose the use of cellulose nanofibrils as an optional filler and xanthan gum as an optional polymeric ingredient.

Multi-ply absorbent sheet such as towel and tissue sometimes conventionally include a plurality of glue-bonded layers or plies. Such products are commercially produced on high speed converting lines with an adhesive to bond the plies. Adhesives employed include aqueous polyvinyl alcohol (PVOH) solutions as is disclosed in U.S. Pat. No. 3,414,459. Such solutions usually contain 4-10% by weight PVOH and exhibit Newtonian Fluid viscosity characteristics; that is, wherein viscosity is substantially independent of shear. Tissue/towel ply-bonding is typically carried out in the following steps: 1) embossing one or more plies; 2) applying glue to the web on the raised emboss pattern elements; 3) bringing one or more plies into contact with the glued surface and applying sufficient pressure to the mated web to provide enduring plybond once the glue has dried. This process places several demands on the glue. It must penetrate the first web, but not too much. Enough tackiness must remain to stick to the non-glued web. The remaining glue must preferably penetrate the nonglued web to improve the integrity of the bond. See, also, U.S. Pat. No. 5,858,554 to Neal et al., entitled Paper Product Comprising Adhesively Joined Plies which describes ply-bonded absorbent sheet provided with polyvinyl alcohol or starch adhesive compositions, note Col. 4, lines 20-55.

Conventional adhesives tend to adversely impact softness of the product due to their inherent stiffness and their use in relatively high concentration. Moreover, one of the most challenging obstacles of high speed converting is that the loss of plybond causes ply separation and eventually stops the machine. Conventional plybond glues frequently do not generate enough plybond to enable higher speeds and are thus a bottleneck to higher productivity, especially when debonder is used to provide additional softness to the product.

SUMMARY OF INVENTION

Nanofibrillated cellulose together with one or more viscosity or surface tension modifiers has been found to be a surprisingly effective ply-bonding agent for absorbent sheet. Without intending to be bound by any theory, it is believed that NFC bonds two plies of tissue together by way of a "double ended nail" mechanism discussed hereinafter. This may be similar to the mechanism employed by the Velcro® strips for temporarily plying two surfaces together. The forces involved in holding adhesives to their substrates are mainly from adhesive and cohesive forces. Adhesive forces hold two materials together at their surface, and cohesive forces are those forces that exist between molecules of the same materials. For NFC bonding agent, both the bonding agent and substrate are made from cellulose, the adhesive and cohesive forces are consistent and they are both hydrogen bonds. Hydrogen bonds are stronger bonds than Van der Waals forces which may be the force between cellulose and PVOH. Therefore, a comparable plybond can be formed by using NFC bonding agent at a much lower solids content (0.5-1% solids) than PVOH glue (4%-5% solids). NFC provides more surface area to connect the fiber and the plybond is achieved by mechanical contact force between the NFC and the basesheet. NFC thus serves as an alternative laminating agent to PVOH. It may be used at a significantly lower concentration than PVOH due to its high viscosity, and offers advantages in terms of surface finish and texture, especially the softness of finished product, by avoiding using PVOH and by using less solids of adhesive.

The plybond of finished products converted with the NFC bonding agents were found to be less sensitive to converting speed compared to the plybond converted with conventional PVOH glue. Therefore, using the invention NFC bonding agent allows for increased productivity without sacrificing plybond while obtaining improved softness (less marrying roll pressure, less glue) as noted above. The adhesives are particularly advantageous with debonder treated sheet because they maintain superior plybond in the presence of debonder.

The invention is appreciated by reference to FIG. 1A and FIG. 1B, which are histograms showing Peel Test Plybond for CWP and Structured basesheet. It is seen that a 1% NFC/0.1% xanthan gum bonding agent and a 0.5% NFC/0.1% xanthan gum bonding agent have Peel Test Plybond values remarkably higher than a 2.5% PVOH composition.

The invention is further appreciated by reference to FIGS. 2A, 2B and 2C which are histograms comparing Peel Test Plybond of various compositions of the invention with 4.5% PVOH plybond adhesive. FIG. 2A shows that NFC bonding agent has very good laminating properties compared to 4.5% PVOH. 0.5% NFC-0.1% xanthan gum developed a plybond which was approximately 22% lower than 4.5% PVOH, while 1% NFC-0.1% xanthan gum formed the plybond 44% higher than 4.5% PVOH. Therefore, a certain NFC concentration between 0.5% and 1% should provide the same plybond as 4.5% PVOH. In addition, the Figures show that the bonding strength was mainly from NFC because it is seen that xanthan gum itself was a weak adhesive; 1% xanthan gum's plybond was 10.7 g while 1% NFC-0.1% xanthan gum laminating agent has a plybond of 34.9 g. Xanthan gum's major functions are as suspending agent and viscosity modifier. It is desirable to use the minimum amount of xanthan gum as long as it can effectively disperse and suspend NFC to obtain an appropriate viscosity. Unlike conventional uses of xanthan gum as a thickener, its use with NFC reduces the viscosity of the bonding agent dispersion. Additional advantages of xanthan gum are that it is inexpensive and safe (food grade). Alternative food-grade viscosity modifiers which have properties similar to xanthan gum are also suitable. The plybond of NFC-CMC laminating agent and NFC-pectin (from apple) laminating agent were tested for Peel Test Plybond. Details as to specific ingredients are discussed below. The results showed that they were somewhat less effective than xanthan gum at the same dosage in terms of plybond strength (FIGS. 2B and 2C). According to the viscosity results discussed herein, pectin does not as effectively reduce the viscosity of NFC-pectin bonding agent as xanthan gum, while NFC-CMC may be substituted for xanthan gum if the cost of CMC is significantly lower than xanthan gum and strong plybond is not a requirement for the finished product.

In addition to the benefits seen in terms of ply-bonding and softness, the use of low solids adhesive also reduces converting costs and might also provide advantage in cleaning the glue from the surface of converting equipment.

The present invention is thus directed, in part, to an aqueous plybonding adhesive including: (a) water; (b) nanofibrillated cellulose; and (c) one or more modifiers effective to modify either or both of (i) the viscosity of the composition or (ii) the surface tension of the composition, wherein the one or more additional modifiers are selected from the group consisting of components (iii), (iv), (v), (vi), (vii) or (viii), wherein: (iii) is PVOH and a viscosity modifier; (iv) is a viscosity modifier; (v) is a viscosity modifier and a surface tension modifier other than PVOH; (vi) is a water-soluble cellulose derivative; (vii) is a water soluble polyol; and (viii) is a surface tension modifier other than PVOH.

Further features and advantages of the invention will be apparent from the discussion which follows.

BRIEF DESCRIPTION OF DRAWINGS

The invention is described in detail below with reference to the drawings wherein:

FIG. 6 is a plot of viscosity versus shear rate for various adhesives;

FIGS. 8A and 8B are plots of panel softness (arbitrary scale) for various products;

FIG. 10 is a schematic diagram illustrating ply-bonding of the invention material and conventional PVOH glue;

DETAILED DESCRIPTION

The invention is described in detail below in connection with the Figures for purposes of illustration, only. The invention is defined in the appended claims. Terminology used herein is given its ordinary meaning consistent with the exemplary definitions set forth immediately below; mg refers to milligrams and $m^2$ refers to square meters, Fpm refers to feet per minute and so forth.

Adhesive Viscosity is measured at room temperature using a cone and plate geometry.

Characteristic Breaking Length of NFC material is determined by testing a handsheet of the subject NFC fiber as described herein.

Characteristic Nanofiber Viscosity is measured on a 1 wt % suspension of the NFC in water as further described herein.

"Consisting essentially of" and like terminology refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components.

Figure 1A:
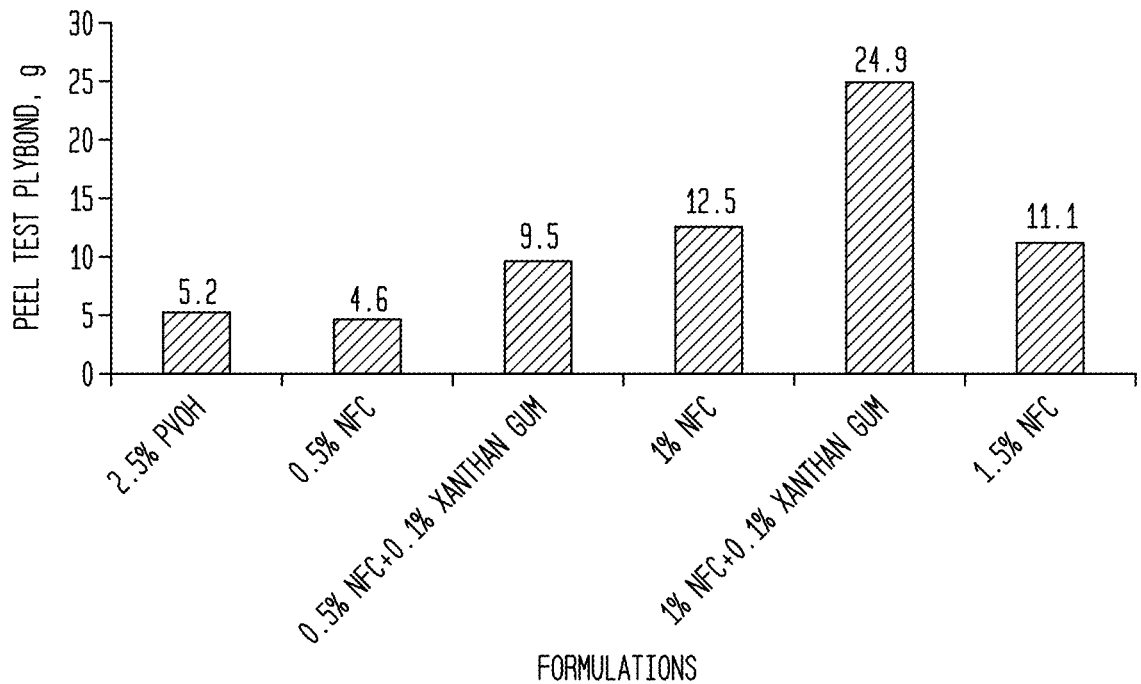
FIG. 1A is a histogram detailing Peel Test Plybond for various bonding agent formulations applied to CWP basesheet.
Figure 1B:
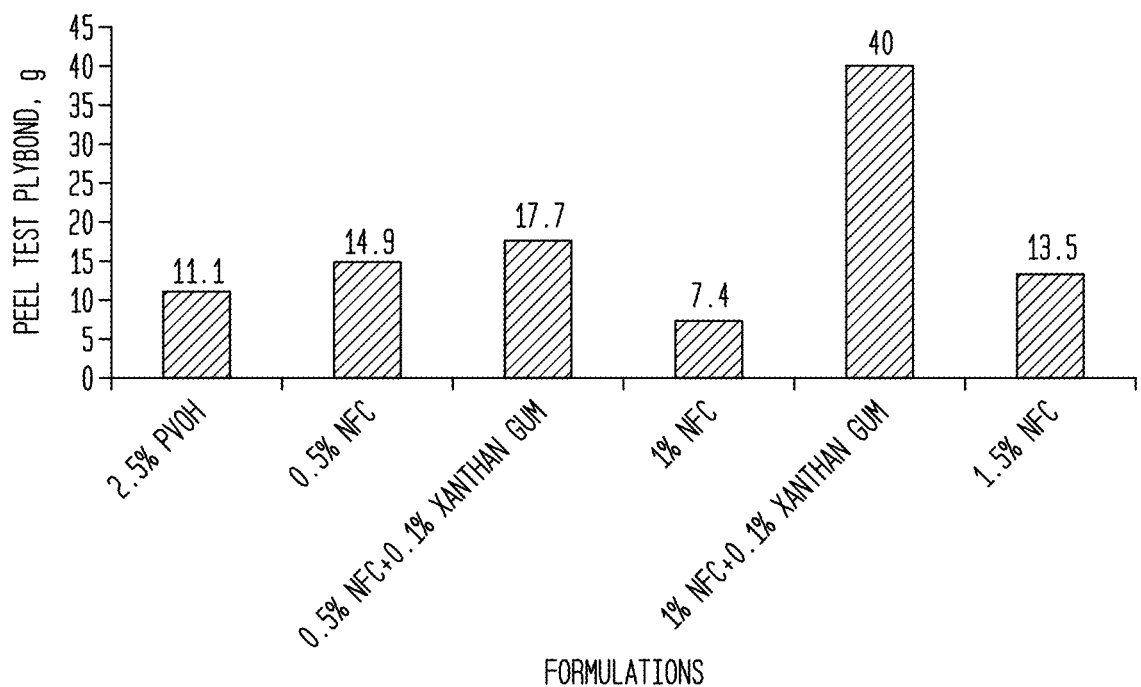
FIG. 1B is a histogram detailing Peel Test Plybond for various bonding agent formulations applied to a Structured basesheet.
Figure 2A:
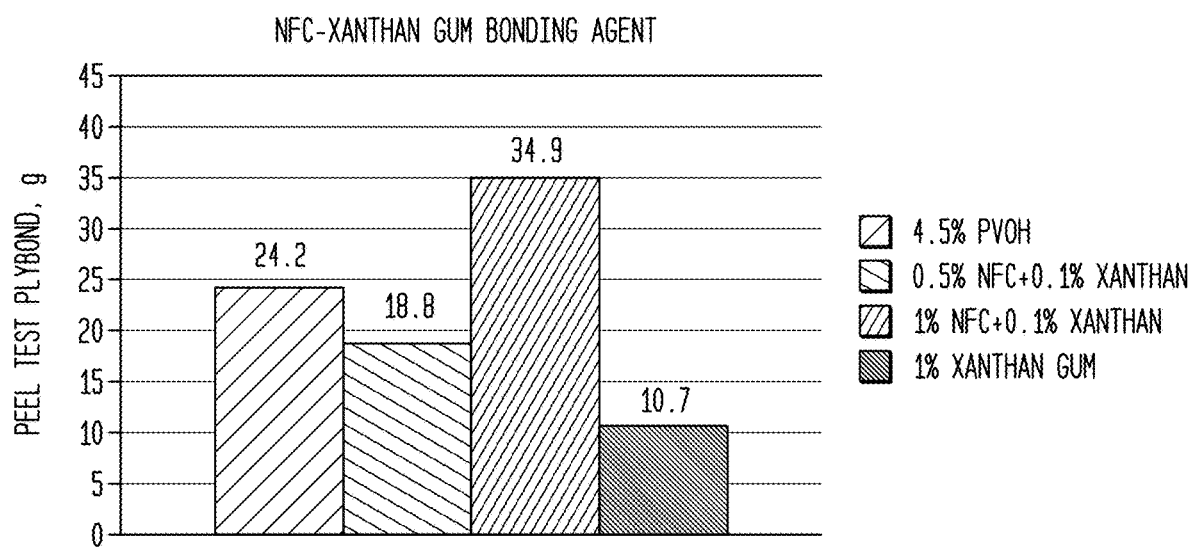
FIG. 2A is a histogram detailing Peel Test Plybond for various bonding agent formulations applied to a Structured basesheet.
Figure 2B:
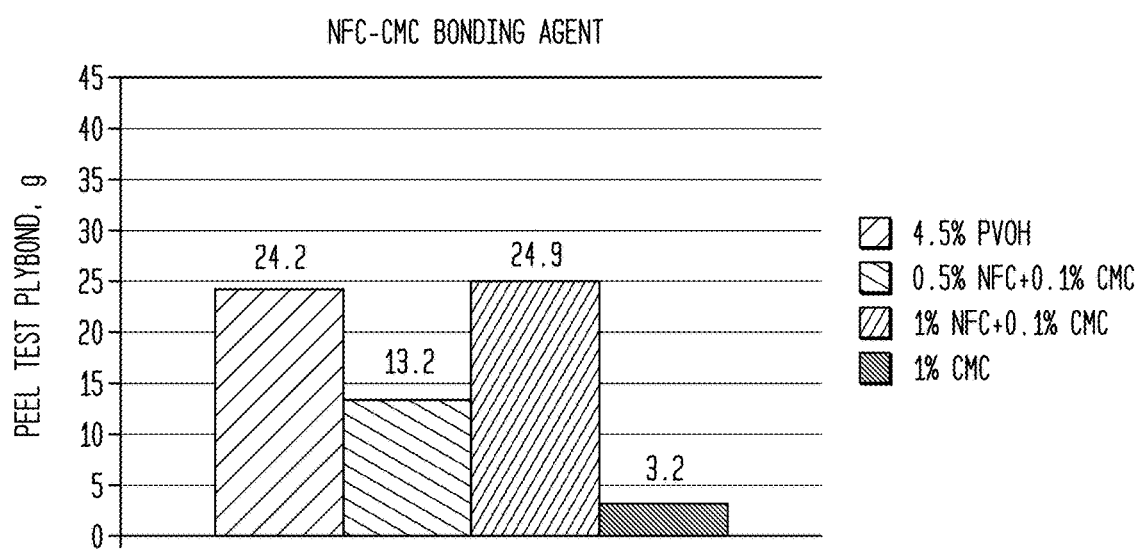
FIG. 2B is a histogram detailing Peel Test Plybond for various bonding agent formulations applied to a Structured basesheet.
Figure 2C:
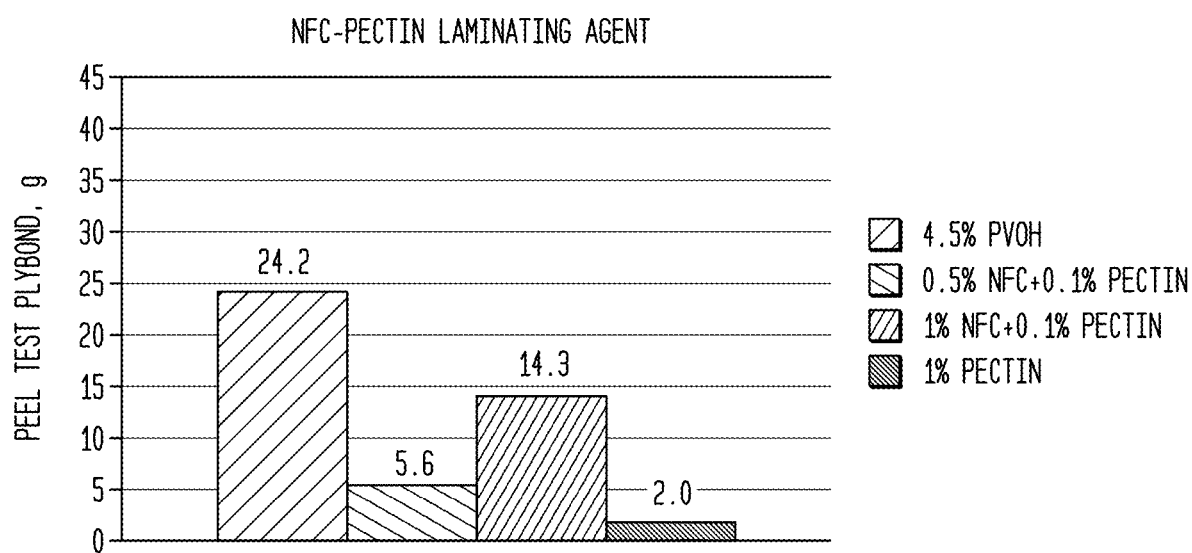
FIG. 2C is a histogram detailing Peel Test Plybond for various bonding agent formulations applied to a Structured basesheet.
Figure 3:
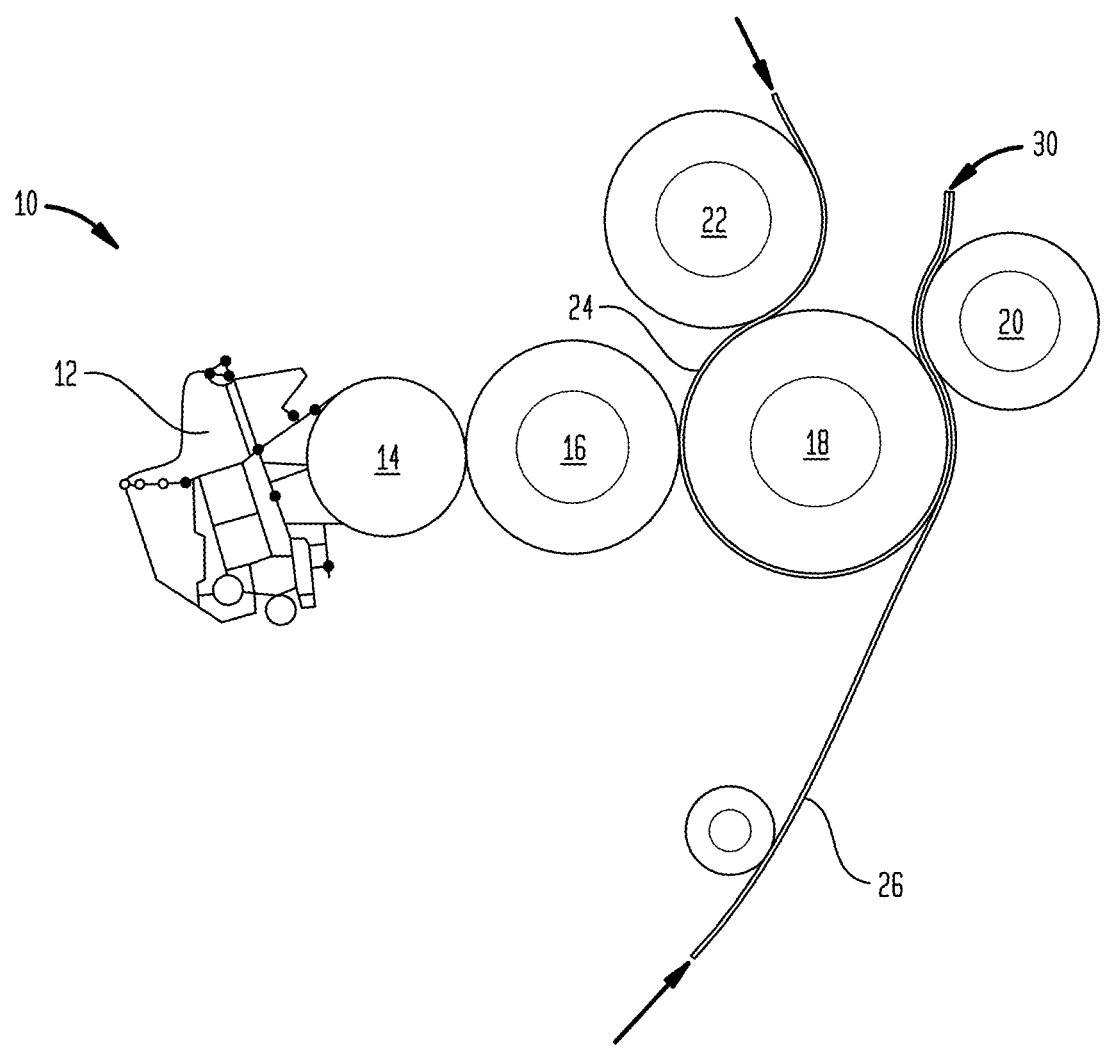
FIG. 3 is a schematic diagram of an embossing and laminating apparatus for preparing multi-ply absorbent sheet.

"Converting speed" refers to the linear velocity of the basesheets and multi-ply product through a converting or laminating line as is seen in FIG. 3.

A surface tension modifier refers to an agent effective to reduce the surface tension of an aqueous composition of the invention. The addition of surface tension modifier is optional depending on the needs of the application. Typically, a suitable surface tension modifier is used in amounts effective to reduce the surface tension of the same composition without a surface tension modifier by at least about 10 mN/m, preferably by 15 mN/m, 20 mN/m or more. The same composition without a surface tension modifier refers to a composition with the same ingredients and proportions except that the surface tension modifier is absent.

A viscosity modifier refers to an agent effective to reduce the viscosity of an aqueous composition including NFC. Preferred viscosity modifiers are effective to reduce the room temperature viscosity of a 1% NFC aqueous composition by at least 750 cP at a shear rate of 100 $s^{-1}$ when added to the composition at a level of 0.1% by weight of the aqueous composition.

Cellulosic Sheet, Components and Related Terminology

The term "cellulosic", "cellulosic sheet" and the like are meant to include any product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as eucalyptus, maple, birch, aspen, or the like. Papermaking fibers used in connection with the invention are typically naturally occurring pulp-derived fibers (as opposed to reconstituted fibers such as lyocell or rayon) which are liberated from their source material by any one of a number of pulping processes familiar to one experienced in the art including sulfate, sulfite, polysulfide, soda pulping, etc. The pulp can be bleached if desired by chemical means including the use of chlorine dioxide, oxygen, alkaline peroxide and so forth. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including papermaking fibers, optionally wet strength resins, debonders and the like for making paper products.

Kraft softwood fiber is low yield fiber made by the well-known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., eucalyptus and also has generally a lignin content of less than 5 percent by weight. Kraft hardwood fibers are shorter than softwood fibers, typically having a length weighted average fiber length of less than 1 mm and an arithmetic average length of less than 0.5 mm or less than 0.4 mm.

Recycle fiber may be added to the papermaking furnish in any amount. While any suitable recycle fiber may be used, recycle fiber with relatively low levels of ground wood is preferred in many cases, for example recycle fiber with less than 15% by weight lignin content, or less than 10% by weight lignin content may be preferred depending on the furnish mixture employed and the application. Recycle fiber is in many cases 80% hardwood fiber.

"Basesheet" refers to a unitary cellulosic sheet as manufactured by a paper machine. Basesheets may be layered; however, they have a unitary structure not readily delaminated. A "ply" of a finished product refers to basesheet incorporated into the product.

Unless otherwise specified, "basis weight", BWT, bwt, and so forth refers to the weight of a 3000 $ft^2$ ream of product. Consistency refers to percent solids of a nascent web, for example, calculated on a bone dry basis. "Air dry" or simply "dry" means including residual moisture, by convention up to about 10 percent moisture for pulp and up to about 6 percent for paper. A nascent web having 50 percent water and 50 percent bone dry pulp has a consistency of 50 percent.

Products of the invention are made with a cellulosic fiber basesheet and have an absorbency or SAT value as well as tensiles and densities suitable for tissue and towel products.

Typical SAT values are greater than about 3 g/g in most cases. See U.S. Pat. No. 8,778,138.

Figure 7A:
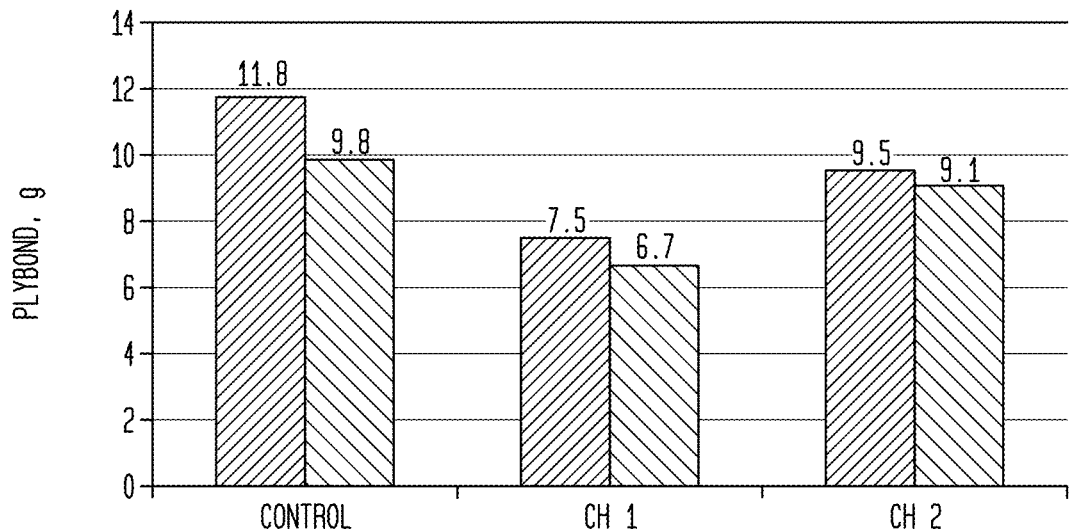
FIGS. 7A and 7B are histograms of plybond strength for different products at different converting speeds.
Figure 7B:
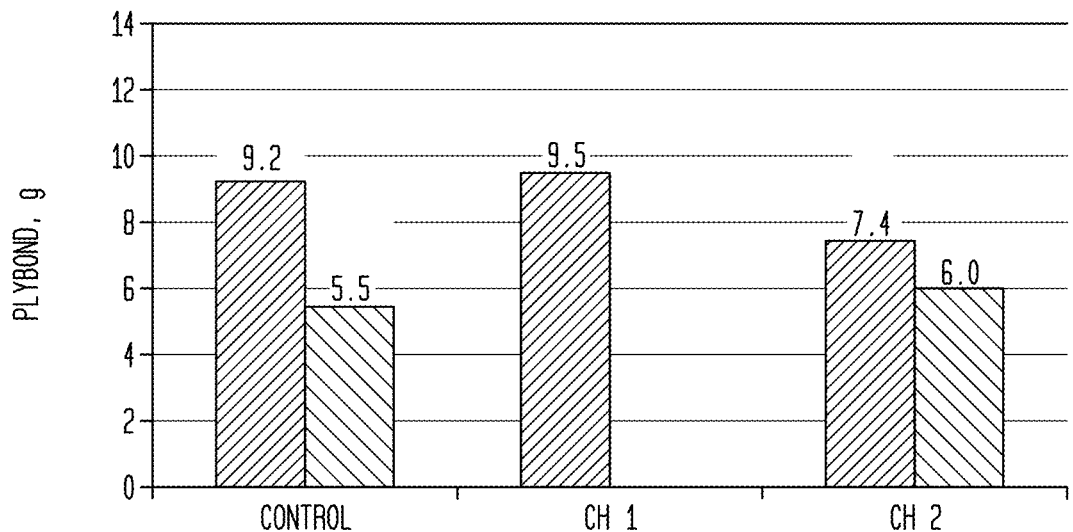

"CWP" refers to absorbent products made by a conventional wet-press process; that is, wet-pressing a furnish to a drying cylinder with a papermaking felt followed by creping the web from the cylinder. See U.S. Pat. No. 7,951,266, FIG. 7 thereof.

"Structured" basesheet refers to product that is wet creped (fabric creped) from a cylinder prior to final drying. See U.S. Pat. Nos. 7,850,823; 7,585,388; 7,585,389; and 7,662,257.

"TAD" refers to through-air dried absorbent products. Throughdried, creped products are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer.

The absorbent characteristics of a product can be affected by the furnish, basis weight, strength, papermaking technology, and so forth. The sheet absorbency and converting technology for a specific product will impact the selection of bonding agent characteristics. CWP sheets are more consolidated than TAD sheets and therefore may have a lower wicking rate. Towel sheets commonly contain more softwood than tissue sheets, which may impact the pore size distribution of the web. It can be appreciated that an optimal bonding agent formula for one product may not be optimal for another.

A towel product is typically characterized by having predominantly (more than 50% by weight based on fiber content) softwood fiber.

A tissue product is typically characterized by having predominantly (more than 50% by weight based on fiber content) hardwood fiber.

Ply-bonding adhesive composition may be described in terms of percent solids or other ingredient based on the total weight of the ply-bonding composition. A composition described as 1% NFC and 0.1% xanthan gum thus has 1% NFC, 0.1% xanthan gum and the balance of 98.9% water and other optional ingredients. Two bonding agents generally comparable to a control glue at 4.5% PVOH solids are a bonding agent 1 (CH1) comprised of 2% PVOH+0.5% NFC, and NFC bonding agent 2 (CH2) comprised of 2.3% PVOH+0.6% NFC+0.1% xanthan gum.

Alternatively, it is sometimes convenient to express the amount of NFC in compositions with relatively high levels of PVOH content in terms of PVOH solids, which is particularly convenient for bonding agents with relatively high weight ratios of PVOH/NFC. 3% PVOH glue should be understood as 3 grams of PVOH per 100 grams solution. NFC addition may then be described as a percentage of the PVOH in the formula. Thus, "3% PVOH+5% NFC based on PVOH content" means that the glue has 3 grams PVOH and 3*0.05=0.15 g NFC per 100 grams solution.

Representative compositions have one or more features enumerated in Tables 1A through 1C and Table 2 below and may consist essentially of the listed components optionally with ranges adopted from another table as discussed herein or by omitting a particular feature such as wt % of one component or weight ratios of two components. The various ranges in Tables 1A through 1C and Table 2 may be combined or interchanged between compositions as to various ingredients, that is, a general content range as to wt % PVOH content in one table may be matched with a select content range of NFC wt % content in the same or another table in a particular embodiment of the invention, in which case the weight ratios listed in the following tables may be inapplicable to the particular embodiment contemplated. For example, a general content range as to wt % PVOH content in Table 1B may be matched with a select content range NFC wt % content in Table 1C. Likewise the wt % ranges in Table 2 for NFC content may be applied to any of the wt % ranges in Tables 1A-1C as to PVOH content in an aqueous composition and the weight ratios re-calculated.

TABLE 1A

PVOH/NFC Compositions Content Ranges

| Component | General | Typical |
|---|---|---|
| PVOH (wt %) | 1%-7.5% | 1.5%-6% |
| NFC (wt %) | 0.005%-3.75% | 0.01%-1.5% |
| Water (wt %) | 90%-99% | 94-98.5% |
| NFC (% based on PVOH) | 0.5%-50% | 1%-25% |
| Weight Ratio NFC/PVOH | 0.0007-3.75 | 0.015-1.5 |
| Other Additives | balance | balance |

TABLE 1B

PVOH based/NFC containing Compositions Content Ranges

| Component | General | Typical | Select |
|---|---|---|---|
| PVOH (wt %) | 2%-7.5% | 2.5%-6% | 3%-5% |
| NFC (wt %) | 0.01%-1.5% | 0.04%-0.75% | 0.1%-0.5% |
| Water (wt %) | 90%-98% | 94-97.5% | 95%-97% |
| NFC (% based on PVOH) | 1%-20% | 1.5%-12.5% | 4%-11% |
| Weight Ratio NFC/PVOH | 0.001-0.75 | 0.007-0.3 | 0.02-0.17 |
| Other Additives | balance | balance | balance |

TABLE 1C

NFC and PVOH containing Bonding Compositions Content Ranges

| Component | General | Typical | Select |
|---|---|---|---|
| PVOH (wt %) | 1%-3% | 1.5%-2.5% | 1.75%-2.5% |
| NFC (wt %) | 0.25%-1% | 0.3%-0.8% | 0.4%-0.75% |
| Viscosity modifier (wt %) | 0-0.2% | 0.0-0.15% | 0.05%-0.15% |
| Water (wt %) | 95%-99% | 95%-99% | 96%-99% |
| NFC (% based on PVOH) | 8%-100% | 12%-53% | 16%-43% |
| Weight Ratio NFC/PVOH | 0.08-1 | 0.1-0.5 | 0.15-0.4 |
| Other Additives | balance | balance | balance |

TABLE 2

NFC/Viscosity Modifier Bonding Compositions Content Ranges

| Component | General | Typical | Select |
|---|---|---|---|
| NFC (wt %) | 0.15%-3% | 0.175%-2% | 0.2%-1% |
| Viscosity modifier (wt %) | 0.02%-0.2% | 0.05%-0.15% | 0.07%-0.13% |
| Weight Ratio NFC:Viscosity Modifier | 150-0.75 | 40-1.2 | 14-1.5 |

TABLE 2-continued

NFC/Viscosity Modifier Bonding Compositions Content Ranges

| Component | General | Typical | Select |
|---|---|---|---|
| Water (wt %) | 95%-99.9% | 97%-99.8% | 98%-99.8% |
| Other Additives | balance | balance | balance |

Debonder compositions including surfactants are widely used in the paper industry. There is disclosed in U.S. Pat. No. 7,736,464 to Kokko a debonder composition including a combination of: (a) a quaternary ammonium surfactant component; and (b) a nonionic surfactant component. In many cases, these compositions include a quaternary ammonium surfactant component comprising a surfactant compound selected from the group consisting of a dialkyldimethyl-ammonium salt of the formula:

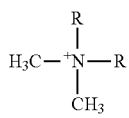

a bis-dialkylamidoammonium salt of the formula:

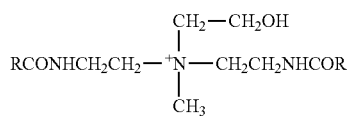

a dialkylmethylimidazolinium salt of the formula:

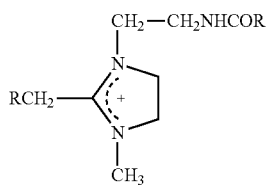

wherein each R may be the same or different and each R indicates a hydrocarbon chain having a chain length of from about twelve to about twenty-two carbon atoms and may be saturated or unsaturated; and wherein said compounds are associated with a suitable anion; and (b) a nonionic surfactant component that preferably includes a surfactant selected from the group consisting of alkoxylated fatty acids and alkoxylated fatty alcohols. Typically the nonionic surfactant includes the reaction product of a fatty acid or fatty alcohol with ethylene oxide such as a polyethylene glycol diester of a fatty acid (PEG diols or PEG diesters). One preferred composition which is used in connection with the present invention includes 30 wt % of imidazolinium (Im+) quats in a 1:1 mixture of PEG-400-mono and dioleates.

The quaternary ammonium surfactant component most preferably includes an imidazolinium salt. Other debonder compositions are disclosed in the following references: U.S. Pat. No. 5,622,597 to Callen et al.; U.S. Pat. No. 4,441,962 to Osborn, III and U.S. Pat. No. 4,351,699 also to Osborn, III; U.S. Pat. No. 5,698,076 to Phan et al.; U.S. Pat. No. 5,730,839 to Wendt et al.; U.S. Pat. No. 5,753,079 to Jenny et al.; U.S. Pat. No. 4,447,294 to Osborn, III; U.S. Pat. No. 5,279,767 to Phan et al. and U.S. Pat. No. 5,240,562 of Phan et al. Debonder applied to the absorbent sheet is expressed on a dry basis of pounds debonder/ton of papermaking fiber in the absorbent sheet.

Debonder may be applied to the sheet by any suitable method such as spraying or more typically by way of adding the debonder to the aqueous furnish in the headbox of a papermaking machine used to produce the sheet. In cases where a multilayer headbox is used to produce plies having multiple layers, treatment levels of debonder apply to any layer provided to the sheet. For example, if one layer has no added debonder (other than perhaps residual debonder in the water provided to the furnish) and another layer is treated at 4 lbs debonder/ton of papermaking fiber in the sheet, then the basesheet is considered to be treated at a level of 4 lbs debonder/ton.

Embossing and Laminating Multi-Ply Absorbent Sheet

Referring to FIG. 3, there is shown a converting apparatus 10 for embossing and plying basesheet into a multi-ply product. Apparatus 10 includes a glue chamber 12, an anilox roll 14, an applicator roll 16, an embossing roll 18, a marrying roll 20 and an upper rubber roll 22 which is softer than marrying roll 20 which is made of hard rubber.

Figure 4:
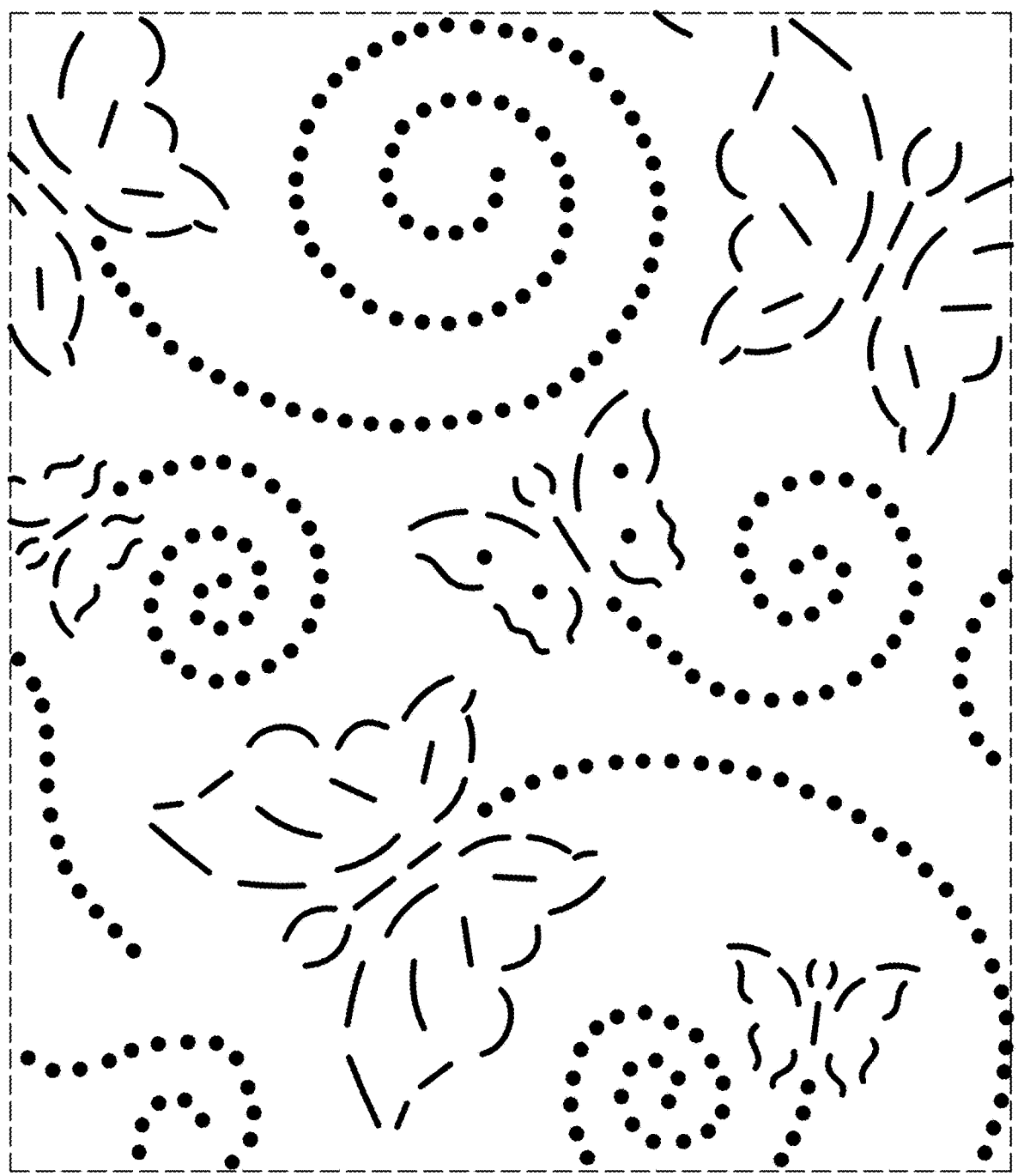
FIG. 4 is a diagram showing the pattern of raised embossments provided to the tissue basesheet by the apparatus of FIG. 3.

In operation, a first basesheet 24 is fed to the nip between upper roll 22 and embossing roll 18 where sheet 24 is provided with a plurality of raised embossments having the pattern shown in FIG. 4. The pattern of FIG. 4 provides an embossed area of raised embossments of 4.3% of the sheet area, which corresponds to the bonding area as will be appreciated from the discussion which follows. Glue, including the NFC bonding agents of this invention is provided as an aqueous composition to glue chamber 12 and is picked up by anilox roll 14 and transferred to applicator roll 16. From applicator roll 16, the glue is applied to the raised embossments of basesheet 24. Concurrently with processing basesheet 24, a second basesheet 26 is fed through the nip defined by marrying roll 20 and embossing roll 18 such that basesheet 26 is pressed to basesheet 24, including the adhesive disposed on the raised embossments on basesheet 24, to produce multi-ply web 30.

Apparatus 10 was operated as described above to produce a variety of multi-ply tissue products. The apparatus was operated at converting speeds of 1000 fpm and 1500 fpm with tissue basesheet which consisted predominantly of hardwood fiber. Details as to finished product and basesheet properties appear in Tables 3 and 4. Adhesive compositions are noted below.

Figure 5A:
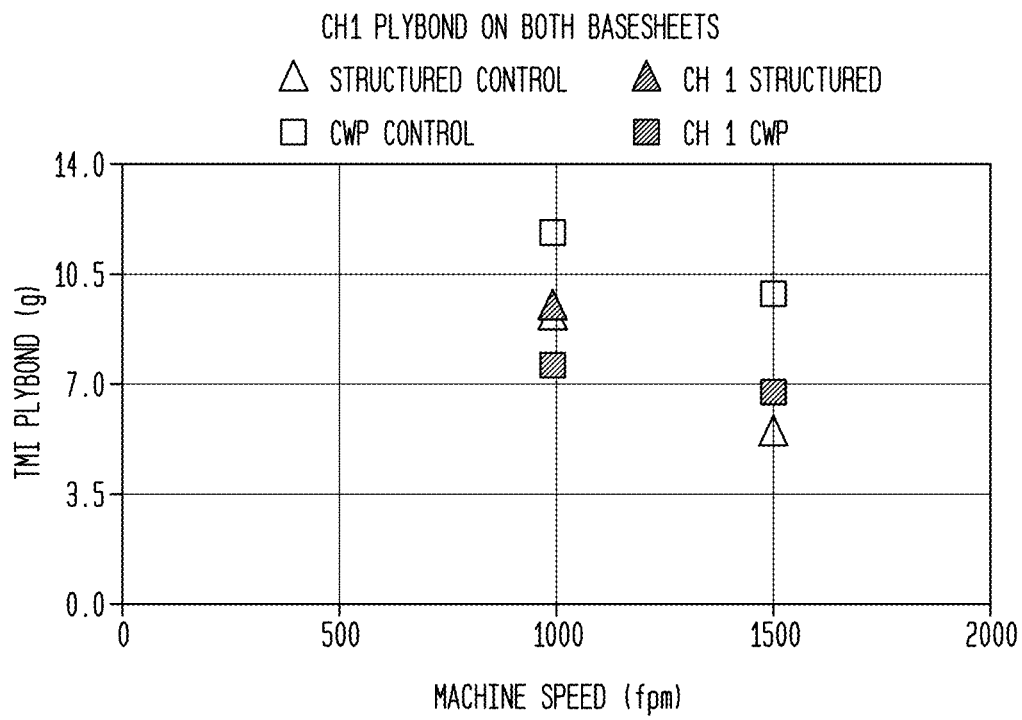
FIGS. 5A and 5B are plots of plybond strength versus converting speed.
Figure 5B:
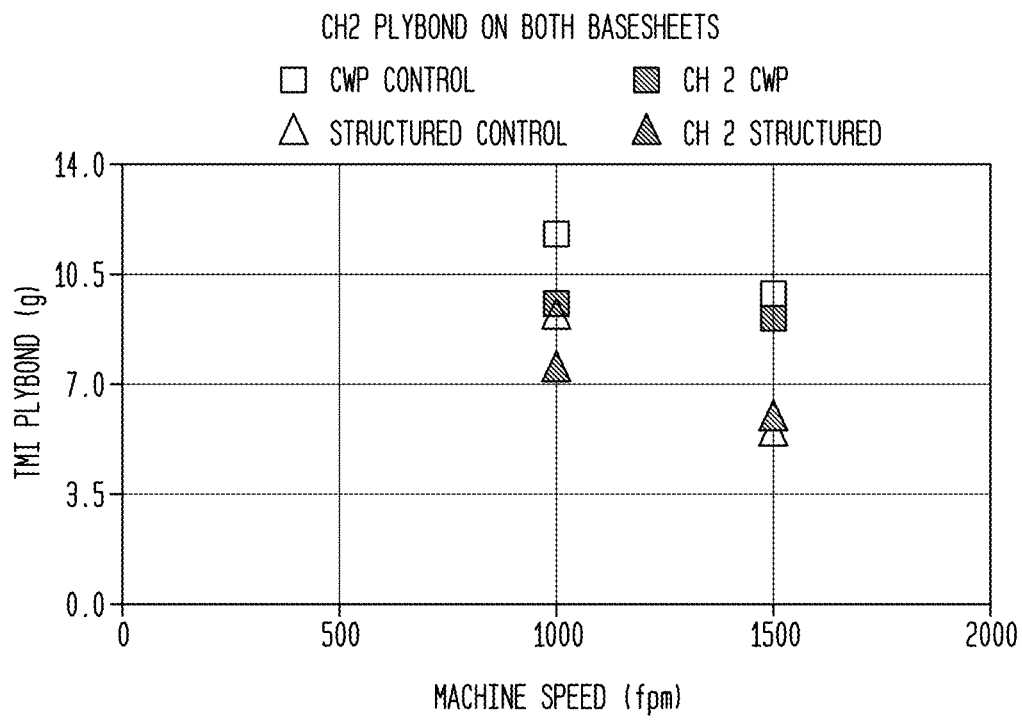

The plybond was consistent over the given machine setting and its range could be controlled in a very similar way as that of the traditional glue. Two bonding agents were tested against the control glue at 4.5% PVOH solids. The NFC bonding agent 1 (CH1) consisted of 2% PVOH+0.5% NFC, and NFC bonding agent 2 (CH2) comprised of 2.3% PVOH+0.6% NFC+0.1% xanthan gum. Two speed levels were tested for each of the bonding agents as shown in FIGS. 5A and 5B.

The traditional PVOH glue utilized for laminating the control consists of 4.5% PVOH solids. However, CH1 and CH2 chemistries of the bonding agent utilized PVOH solids at 2% and 2.3%, respectively. The usage of PVOH may be avoided by alternative chemicals which are effective on reducing surface tension, as is discussed, below. Samples laminated using the NFC bonding agent chemistries showed satisfactory levels of softness in the sensory evaluation. While producing these samples, the marrying roll was used to put pressure on the plies to set the bond.

TABLE 3

Finished Product Physicals (1000 fpm)

| Description | Basis Weight lb/3000 ft^2 | Caliper 8 Sheet mils/ 8 sht | GM Tensile g/3 in | Tensile CD g/3 in | Stretch CD % | Perf Tensile g/3 in | Tensile MD g/3 in | Stretch MD % | TMI Plybond g | Sensory Softness |
|---|---|---|---|---|---|---|---|---|---|---|
| CONTROL STRUCTURED SHEET | 26.73 | 132.66 | 839.31 | 629.75 | 7.48 | 532.44 | 1,118.61 | 23.68 | 9.25 | 18.30 |
| CH1 STRUCTURED SHEET | 27.40 | 122.64 | 886.85 | 650.95 | 7.40 | 601.87 | 1,208.23 | 22.97 | 9.54 | 18.00 |
| CH2 STRUCTURED SHEET | 27.63 | 128.29 | 816.52 | 598.90 | 7.82 | 531.97 | 1,113.23 | 22.38 | 7.44 | 18.30 |
| CWP Control | 23.10 | 100.56 | 783.78 | 457.59 | 5.17 | 484.76 | 1,342.48 | 18.72 | 11.76 | 17.30 |
| CH1 CWP | 22.99 | 92.73 | 753.13 | 493.77 | 6.50 | 477.50 | 1,148.71 | 15.53 | 7.49 | 17.30 |
| CH2 CWP | 23.20 | 93.07 | 766.93 | 493.47 | 6.38 | 491.30 | 1,191.93 | 16.93 | 9.50 | 17.20 |

TABLE 4

Basesheet Properties

| Description | Basis Weight lb/3000 ft^2 | Caliper 8 Sheet mils/ 8 sht | Tensile MD g/3 in | Tensile CD g/3 in | Tensile GM g/3 in | Stretch MD % | Stretch CD % | Break Mod GM g/% | Break Mod MD g/% | Break Mod CD g/% | T.E.A. MD mm-g/ mm^2 | T.E.A. CD mm-g/ mm^2 |
|---|---|---|---|---|---|---|---|---|---|---|---|---|
| Structured Sheet UnEmb #2 | 13.77 | 58.73 | 703.81 | 406.00 | 534.55 | 25.22 | 6.52 | 41.57 | 28.05 | 61.61 | 1.23 | 0.18 |
| Structured Sheet Emb #3 | 13.28 | 60.00 | 542.78 | 348.82 | 435.12 | 24.69 | 7.41 | 32.23 | 21.99 | 47.24 | 0.94 | 0.18 |
| CWP Unemb | 11.08 | 31.30 | 631.25 | 290.26 | 428.05 | 16.82 | 4.24 | 51.60 | 39.18 | 67.96 | 0.73 | 0.08 |
| CWP Emb | 12.21 | 34.43 | 739.85 | 274.36 | 450.54 | 19.45 | 7.26 | 38.25 | 38.95 | 37.57 | 1.01 | 0.16 |

As shown in FIG. 6, the viscosity of 4.5% PVOH and NFC bonding agents were within a similar range at the converting speed (the correlated shear rate is in the range of 100 to 1000 s$^{-1}$). The viscosity modifier was able to suspend the NFC particles through the glue pumping unit without causing coagulation in the glue tank.

For the products in Table 3, the tissue plybond target was 5 to 8 g, and all the products met the plybond target. At the same converting settings, the increase of converting speed typically results in a significant decrease of plybond when using regular PVOH glue. The drop of plybond might be due to the reduced diffusion time of the PVOH polymers in to the basesheet. When using 4.5% PVOH, by increasing the converting speed from 1000 fpm to 1500 fpm, the plybond of CWP tissue decreased from 11.8 g to 9.8 g which was a 16% decrease while structured tissue suffered more where the plybond was dropped from 9.2 g to 5.5 g which was a 41% decrease. However, by using the NFC bonding agent, the speed associated plybond decrease was significantly minimized as can be seen from FIGS. 7A and 7B. There were no significant differences in plybond between 1000 fpm and 1500 fpm for CWP tissue when using both NFC bonding agents CH1 and CH2 for converting. The plybond of structured sheet was always more sensitive to converting speed, but using CH2 resulted in 20% plybond reduction from 1000 fpm to 1500 fpm whereas the 4.5% PVOH had 41% plybond reduction. NFC may provide an enhanced localized fiber density at the embossed area and tiny fibrils are thought to play an important role in bridging the two basesheets.

Typically, increasing the converting speed causes several issues. One of the major problems is that the plybond decreases significantly. Therefore, increasing marrying roll pressure or applying more glue is needed to bring up the plybond. Both adjustments could result in reduced softness. The smaller sensitivity of NFC bonding agent to converting speed has an advantage of speeding up the converting speed without sacrificing product quality which enables improved productivity.

There was also a difference in plybond strength between the NFC bonding agent CH1 and CH2. For the CWP basesheets, the rolls converted by CH1 and CH2 had the same converting settings (marrying roll), the plybond formed by CH2 was approximately 30% stronger than the plybond formed by CH1. This may be due to the higher solids content or that xanthan gum dispersed NFC in a more uniform way.

It was found that the converting speed did not affect softness. Most of the product converted at 1000 fpm and 1500 fpm had the same softness. For the same type of basesheet, the GM tensile of converted product was in a narrow range, and the slightly varied GM tensile had little impact on softness. See Table 5 and FIGS. 8A and 8B.

TABLE 5

| | Softness | | | |
|---|---|---|---|---|
| | 1000 fpm | | 1500 fpm | |
| Description | GM Tensile, g/3" | Sensory Softness | GM Tensile, g/3" | Sensory Softness |
| CONTROL STRUCTURED | 839 | 18.3 | 809 | 18.4 |

TABLE 5-continued

| | Softness | | | |
|---|---|---|---|---|
| | 1000 fpm | | 1500 fpm | |
| Description | GM Tensile, g/3" | Sensory Softness | GM Tensile, g/3" | Sensory Softness |
| CH1 STRUCTURED | 887 | 18.0 | — | — |
| CH2 STRUCTURED | 816 | 18.3 | 802 | 18.3 |
| CWP Control | 784 | 17.3 | 777 | 17.2 |
| CH1 CWP | 753 | 17.3 | 735 | 17.3 |
| CH2 CWP | 766 | 17.2 | 754 | 17.2 |

Three-Ply Products

Figure 9:
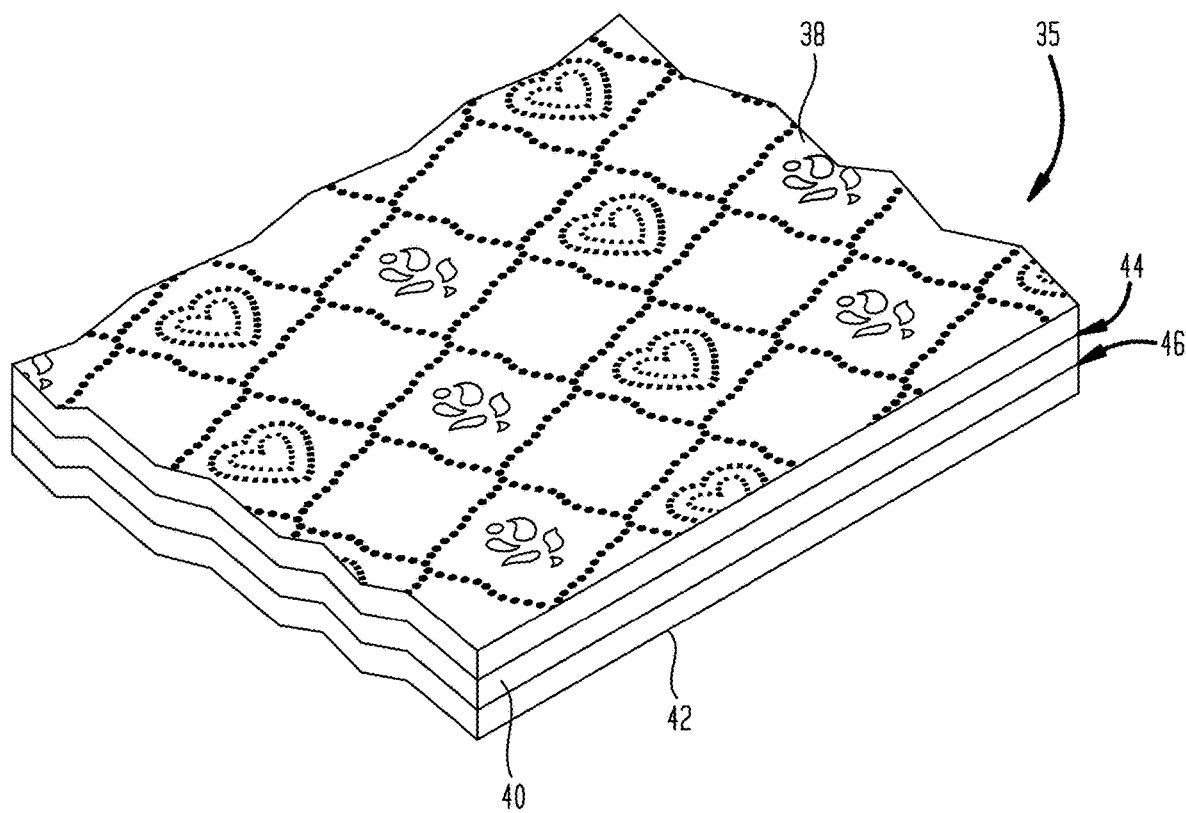
FIG. 9 is a perspective view of a three-ply product.

In some preferred embodiments, the present invention relates to three-ply products such as three-ply tissue products as shown in FIG. 9. A three-ply product 35 includes a first outer ply 38, a central ply 40 and a second outer ply 42. The plies are adhered together by PVOH/NFC adhesive interposed between the plies at their interfaces indicated at 44, 46. Three-ply products may be made by successive lamination of the plies or by way of simultaneous lamination as is known in the art. Towel products may likewise be produced as three-ply absorbent structures, if so desired.

There is no simple theory of adhesion, for any one system adhesion is probably a combination of adsorption, electrostatic attraction and diffusion. The enhancement of the bond between two plies might be explained by 'double ended nail' mechanism that takes place between the NFC and the tissue basesheet (FIG. 10). The NFC acts like a nail sticking between the two "walls" of tissue. Each end of the nano fibril is bonded with the tissue basesheet through a hydrogen bond. The magnitude of this bond is stronger than the van der Waals bond but weaker than the covalent bond. Since the NFC is basically cellulose and the basesheet is composed of cellulose, the large surface area NFC has a potential to form strong hydrogen bonds with the basesheet. According to previous lab experimentation, it was found that the NFC bonding agent could form stronger plybond with much less solids content than that of PVOH glue. It is also proposed that the NFC preserves the softness of converted product compared to that by the polymer matrix such as PVOH. A stable suspension and acceptable shelf life was seen to be obtained by adding viscosity modifier and antibacterial agent to the new NFC laminating agent.

Further details concerning materials, adhesive formulation and testing are described below.

Testing

Dry tensile strengths, stretch, ratios thereof, modulus, break modulus, stress and strain are measured with a standard Instron test device or other suitable elongation tensile tester which may be configured in various ways, typically using 3 or 1 inch wide strips of material, suitably conditioned in an atmosphere of 23°±1° C. (73.4°±1° F.) at 50% relative humidity for 2 hours. This conditioning method is preferably employed for all specimen testing. The tensile test is typically run at a crosshead speed of 2 in/min. Tensile strength is sometimes referred to simply as "tensile" and is reported herein for NFC as breaking length (km), which is the tensile in kg/m divided by the basis weight of the sample in g/m². See U.S. Pat. No. 8,409,404 for additional measurements and details.

The term "Characteristic Breaking Length" when referring to NFC refers to the breaking length of a handsheet or film made from 100% of the NFC. The handsheet (50-70 g/m²) is made by using vacuum filtration and a suitable membrane as is described in more detail hereinafter followed by restrained air drying.

The modulus of a specimen (also referred to as stiffness modulus or tensile modulus) is determined by the procedure for measuring tensile strength described above, using a sample with a width of 1 inch, and the modulus recorded is the chord slope of the load/elongation curve measured over the range of 0-50 grams load. The specific modulus is the modulus divided by density.

Characteristic Nanofiber Viscosity and Bonding Agent Viscosity

Characteristic Nanofiber Viscosity is measured on a 1 wt % suspension of the subject NFC in water.

Viscosity of the glues and NFC suspensions is measured at room temperature, using a TA instruments Discovery Hybrid Rheometer (DHR) 2. A cone and plate geometry was used for analysis. A few drops of sample were placed on a flat metal peltier plate and the cone spindle, which has a 60 mm diameter and 2° angle, was brought down to make contact with the sample to initiate the spreading action. The sample that flowed out of the circumference of the cone spindle was trimmed. The experimental conditions were as follows: flow logarithmic sweep, shear rate 0.5-2000 Hz at room temperature. Trim and geometric gap was 54 microns. Room temperature means ambient temperature between 23° C. and 29° C., typically. If a specific value is required, 25° C. is used.

Peel Test Plybond

In order to characterize the adhesive strength of each glue, a strip of structured basesheet was adhered to a metal plate followed by measurement of the force required to peel the sheet off. Ten drops of glue approximately 0.5 g was evenly spread on a 2"×8" stainless steel test panel plate using a number 40 wire rod to apply a film of approximately 50 microns, followed by attaching a 2"×12" basesheet, to the glued plate surface and pressing it from one end to another for 3 times using a metal roller. After drying the glued structured basesheet, the plybond between basesheet and steel plate was measured by a peeling test using an Instron tensile test machine 5966. The free end of the basesheet strip was separated by hand for 2". The specimen was placed in the testing machine by clamping the steel plate in the bottom grip and turning up the free end of the basesheet and clamping it in the upper grip. The peeling test was performed by stripping the basesheet from the steel plate approximately at an angle of 180° and a ramp rate of 10"/min for 10" displacement. At least 6 specimens were tested for each glue sample. After each test, the steel plate was washed with DI water and acetone to remove the residual glue before the next use. These tests are generally in accordance with test method ASTM D 903-98 except for the differences noted.

Plybond

Generally the force needed to separate a ply of a multi-ply sheet or Plybond is measured with a Lab Master Slip and Friction tester available from Testing Machines, Inc. (Islandia, N.Y.) fitted with a sample clamp platform available from Research Dimensions (Neenah, Wis.). A top ply of the sample is separated and clamped in a clamp attached to a load cell and the average force required to separate the ply from another ply is recorded as the plies are separated. Details appear below for 2-ply testing; while 3-ply testing is substantially the same.

Plybond strengths reported herein are determined from the average load required to separate the plies of two-ply tissue, towel, napkin, and facial finished products using TMI Plybond Lab Master Slip & Friction tester Model 32-90, with high-sensitivity load measuring option and custom planar top without elevator available from: Testing Machines Inc. 2910 Expressway Drive South Islandia, N.Y. 11722; (800)-678-3221; www.testingmachines.com. Plybond clamps are available from: Research Dimensions, 1720

Oakridge Road, Neenah, Wis. 54956, Contact: 920-722-2289 and Fax: 920-725-6874.

Samples are preconditioned according to TAPPI standards and handled only by the edges and corners care being exercised to minimize touching the area of the sample to be tested.

At least ten sheets following the tail seal are discarded. Four samples are cut from the roll thereafter, each having a length equivalent to 2 sheets but the cuts are made ¼" away from the perforation lines by making a first CD cut ¼" before a first perforation and a second CD cut ¼" before the third perforation so that the second perforation remains roughly centered in the sheet. The plies of the each specimen are initially separated in the leading edge area before the first perforation continuing to approximately ½" past this perforation.

The sample is positioned so that the interior ply faces upwardly, the separated portion of the ply is folded back to a location ½" from the initial cut and ¼" from the first perforation, and creased there. The folded back portion of the top ply is secured in one clamp so that the line contact of the top grip is on the perforation; and the clamp is placed back onto the load cell. The exterior ply of the samples is secured to the platform, aligning the perforation with the line contact of the grip and centering it with the clamp edges.

After ensuring that the sample is aligned with the clamps and perforations, the load-measuring arm is slowly moved to the left at a speed of 25.4 cm/min, the average load on the arm (in g.) is measured and recorded. The average of 3 samples is recorded with the fourth sample being reserved for use in case of damage to one of the first three. See U.S. Pat. No. 8,287,986.

Nanofibrillated Cellulose

NFC is commonly produced by mechanically disintegrating wood pulp, such as hardwood or softwood Kraft pulp which can include chemical pre- or post-treatments. The pulp used may be pre-processed enzymatically or chemically, for example, to reduce the quantity of hemicellulose. Furthermore, the cellulose fibers may be chemically modified, wherein the cellulose molecules contain functional groups other than in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose).

Generally, a high shear zone is formed during disintegration to delaminate multilayer cell walls of wood fibers and separate fibrils while minimizing cutting and entangling. This process is used to isolate high aspect ratio, semicrystalline cellulose fibrils with robust mechanical properties from the wood furnish. Nanofibrils are typically on the order of 4-20 nm wide and 500-2000 nm long. They possess good axial tensile strength due to inter- and intra-molecular hydrogen bonding among highly oriented cellulose molecules. Various processes suitable for making NFC are described in the following references: United States Patent Application Publication No. US 2011/0277947, entitled "Cellulose Nanofilaments and Method to Produce Same", of Hua et al.; United States Patent Application Publication No. US 2014/0083634, entitled "Method and an Apparatus for Producing Nanocellulose", of Bjoerkqvist et al.; and United States Patent Application Publication No. US 2014/0284407, entitled "A Method for Producing Nanofibrillar Cellulose", of Tamper et al.

The fiber morphology influences the amount of energy required to disintegrate it into NFC. Delamination can be facilitated by weakening fiber cell walls or decreasing the strength of fiber-to-fiber bonds through enzymatic or oxidative pretreatments as noted above. Pretreatments can be targeted to certain regions of the fiber or cause a general weakening effect. For example, cellulase enzymes degrade the amorphous portion of the fiber, whereas the TEMPO oxidation weakens the entire surface of the fiber by decreasing the degree of polymerization of cellulose. The TEMPO pretreatment weakens the fiber indiscriminately by converting primary hydroxyl groups of polysaccharides to carboxyl groups. The same techniques can also be used after mechanical fibrillation to achieve a desired quality of NFC. The choice and extent of pretreatment, as well as the morphology of the starting material, will influence the morphology of the nanofibrillated cellulose produced. For example, pulps that undergo extensive enzymatic hydrolysis before disintegration tend to be more uniform in size with a higher degree of crystallinity. With a lower fraction of amorphous cellulose, these fibers look more like cellulose nanocrystals and have a lower specific surface area. Mechanical disintegration with a microgrinder will increase the surface area of the fibrils and cause more branching. For glue reinforcement applications, this is a desired outcome as greater surface area will increase the amount of interfacial bonding with the matrix glue, PVOH.

Further details concerning making NFC or MFC with peroxide or ozone are seen in U.S. Pat. No. 7,700,764 to Heijnesson-Hulten, entitled Method of Preparing Microfibrillar Polysaccharide (Akzo Nobel N.V.); United States Patent Application Publication No. US 2015/0167243 of Bilodeau et al., entitled Energy Efficient Process for Preparing Nanocellulose Fibers (University of Main System Board of Trustees); and U.S. Pat. No. 8,747,612 to Heiskanen et al., entitled Process for the Production of Microfibrillated Cellulose in an Extruder and Microfibrillated Cellulose Produced According to the Process (Stora Enso OYJ). Discussion relating to making NFC or MFC with N-oxyl compounds is seen in U.S. Pat. No. 8,992,728 to Isogai et al., entitled Cellulose Nanofiber, Production Method of Same and Cellulose Nanofiber Dispersion (University of Tokyo); U.S. Pat. No. 8,377,563 to Miyawaki et al., entitled Papermaking Additive and Paper Containing the Same (Nippon Paper Industries Co., Ltd.); and U.S. Pat. No. 8,287,692 to Miyawaki et al., entitled Processes for Producing Cellulose Nanofibers (Nippon Paper Industries Co., Ltd.) which discloses a process for making nanofibers using N-oxyl compounds (TEMPO). References for making NFC or MFC with enzymes include U.S. Pat. No. 8,778,134 to Vehvilainen et al., entitled Process for Producing Microfibrillated Cellulose (Stora Enso OYJ); U.S. Pat. No. 8,728,273 to Heiskanen et al., entitled Process for the Production of a Composition Comprising Fibrillated Cellulose and a Composition (Stora Enso OYJ); U.S. Pat. No. 8,647,468 to Heiskanen et al., entitled Process for Producing Microfibrillated Cellulose (Stora Enso OYJ) which proposes two enzymatic treatments of the pulp used to make microfibers; and U.S. Pat. No. 8,546,558 to Ankerfors et al., entitled Method for the Manufacture of Microfibrillated Cellulose (STFI-Packforsk AB) which also relates to the use of an enzyme treatment.

NFC may be obtained through the University of Maine; see "The University of Maine—The Process Development Center-Nanofiber R & D," [Online]. Available: http://umaine.edu/pdc/nanofiber-r-d/. [Accessed 24 Nov. 2014]. This source is referred to as NFC I in the text and Figures. NFC may also be obtained from Paperlogic, operator of the first US commercial nanocellulose plant at the former Southworth Paper and now Paperlogic mill in Turners Falls, Mass. This source is referred to as NFC II in the text and Figures.

Figure 11A:
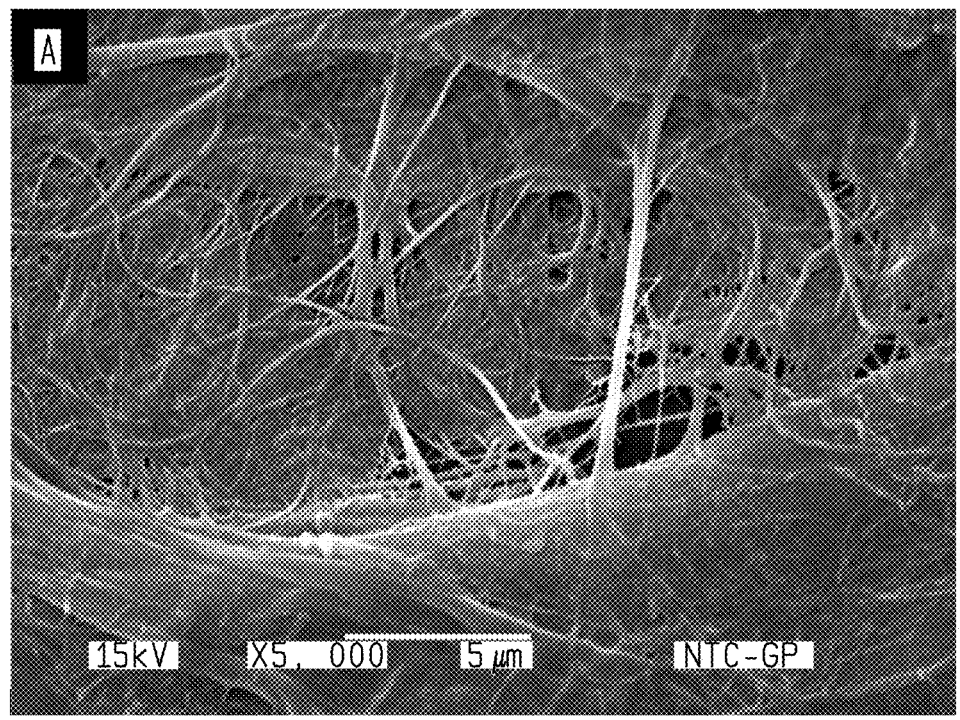
FIGS. 11A and 11B are scanning electron micrographs of NFC.
Figure 11B:
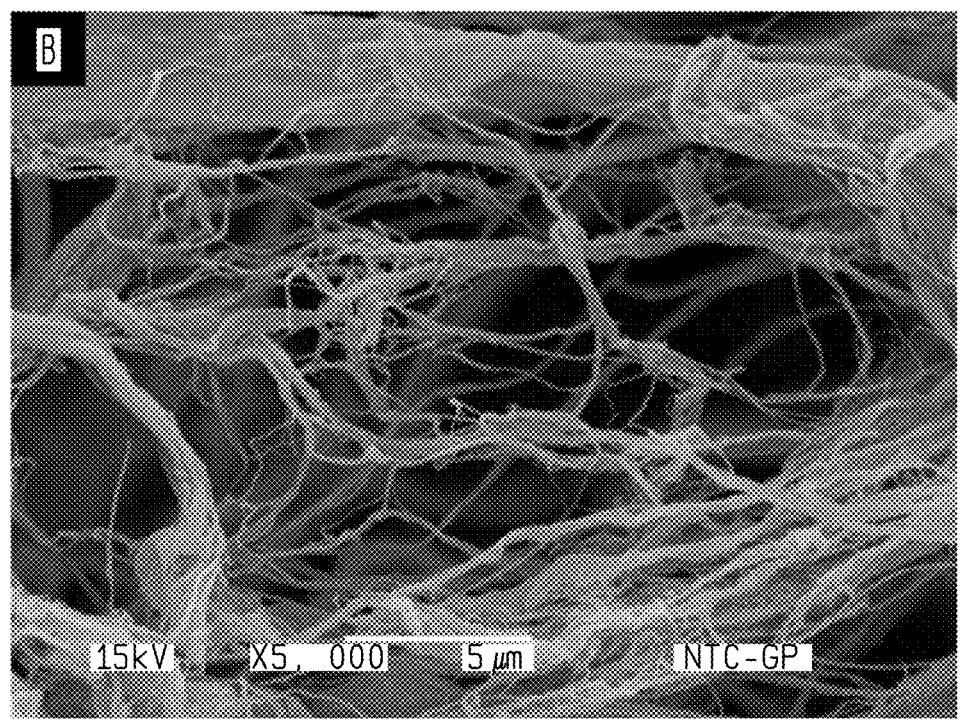

NFC structure is shown in the electron microscope images of FIGS. 11A and 11B.

Viscosity Analysis of NFC

Aqueous NFC suspensions were prepared to obtain 1% consistency. The suspensions were then characterized for their viscosity profiles using the test method and apparatus described above. Results appear in Table 6.

TABLE 6

NFC Viscosity Profiles

| NFC I Shear rate, 1/s | NFC I Viscosity, cP | NFC II Shear rate, 1/s | NFC II Viscosity, cP |
|---|---|---|---|
| 0.50 | 523000 | 0.50 | 47567 |
| 0.79 | 366000 | 0.79 | 30257 |
| 1.26 | 237000 | 1.26 | 20859 |
| 1.99 | 144000 | 1.99 | 18659 |
| 3.15 | 108000 | 3.15 | 20987 |
| 5.00 | 80400 | 5.00 | 33392 |
| 7.92 | 93300 | 7.92 | 50742 |
| 12.60 | 54100 | 12.56 | 51553 |
| 19.90 | 72000 | 19.90 | 53050 |
| 31.50 | 53200 | 31.55 | 46992 |
| 50.00 | 21900 | 50.00 | 17078 |
| 79.20 | 14100 | 79.24 | 9200 |
| 126.00 | 5670 | 125.59 | 9716 |
| 199.00 | 2640 | 199.05 | 5741 |
| 315.00 | 1190 | 315.48 | 3053 |
| 500.00 | 553 | 500.00 | 1381 |
| 792.00 | 234 | 792.44 | 674 |
| 1260.00 | 100 | 1255.94 | 308 |
| 1990.00 | 45.8 | 1990.54 | 124 |
| 2000.00 | 30.8 | 2000.00 | 111 |

Figure 12:
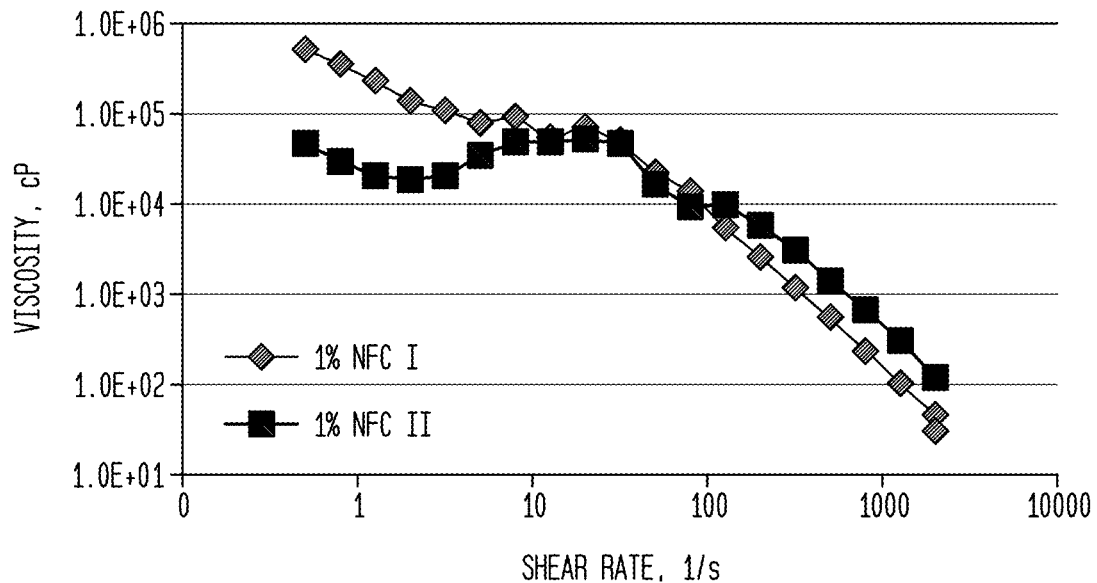
FIG. 12 is a plot of Cellulose Nanofiber Viscosity versus shear rate for NFC I and NFC II.

The data from Table 6 is shown graphically in FIG. 12. It is appreciated from FIG. 12 that NFC is a pseudoplastic material and the properties of NFC I and NFC II are substantially identical.

NFC Breaking Length and Stretch

Figure 13:
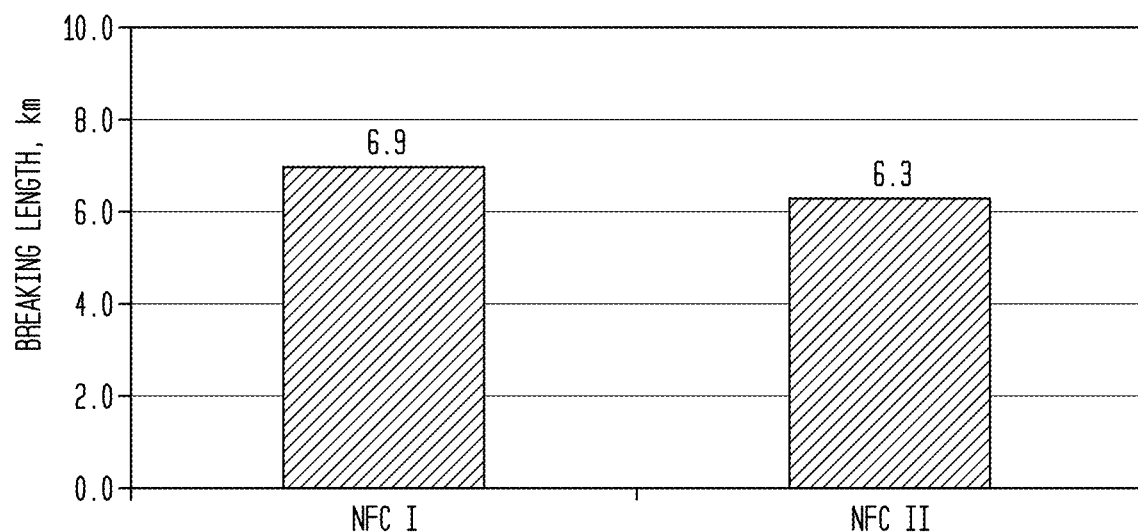
FIG. 13 is a histogram detailing breaking length for NFC I and NFC II formed into handsheets or films.
Figure 14:
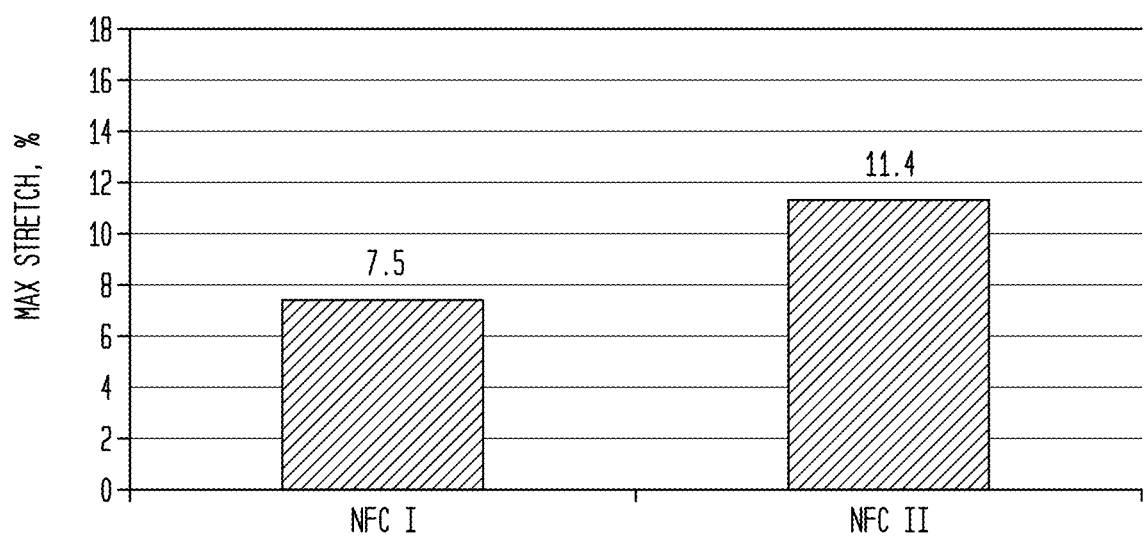
FIG. 14 is a histogram detailing maximum stretch, or stretch at break for NFC I and NFC II, formed into handsheets or film.

100% NFC films or handsheets were formed by vacuum filtration using nylon membrane with 0.45 μm pore size utilizing the NFC I and NFC II materials. Fully restrained drying of NFC films was conducted by attachment of one side of the film to a metal plate and the other side was pressed by a customized perforated ring with a piece of heavy metal on top. The diameter of dried NFC films was 1.5 in. Each film was cut into a 15 mm×1 in strip for tensile testing which provided the information to calculate the breaking length and maximum stretch at break. Results appear in Table 7, as well as in FIGS. 13 and 14.

TABLE 7

NFC Properties

| Sample | Breaking length, km | Max stretch, % |
|---|---|---|
| NFC I | 6.9 | 7.5 |
| NFC II | 6.3 | 11.4 |

Viscosity Modifiers

As will be appreciated from the foregoing, NFC has a very high viscosity even at 1% consistency. This is due to the large surface area and hydrogen bonds between the nano fibrils. The NFC slurry tends to agglomerate and form uneven spots. Such viscous slurry is not generally suitable to use directly as a bonding agent due to transfer issues to the sheet. A viscosity modifier is needed to evenly disperse the NFC particles and substantially reduce its viscosity with the increase of shear rate. Ideally, the agglomerated nano cellulose fibrils are separated from each other and a new interface, between an inner surface of the liquid dispersion medium and the surface of the particles to be dispersed, is generated. A medium to disperse NFC is expected to have high viscosity, but not necessarily to be the same as the viscosity of NFC. Mixing the viscosity modifier and NFC slurry will have a synergistic effect to suspend NFC. Since NFC slurry has a shear-thinning property, the viscosity modifier is expected to have consistent properties to prevent phase separation. Preferred viscosity modifiers include xanthan gum, carboxymethylcellulose (CMC) and to a lesser extent pectin.

Xanthan gum is a nature-derived, high-molecular weight polysaccharide produced by the microorganism *Xanthomonas campestris* through microbial fermentation having the structure shown below. Xanthan gum, sometimes referred to herein as "XG", is highly versatile in personal care applications as it is resistant to enzymatic degradation, extremely stable over a wide range of temperatures and pH. Xanthan gum is primarily used as a thickener, but is also a stabilizer for suspensions, emulsions, foams and solid particles in water-based formulations. The xanthan gum used in this study was purchased from Sigma-Aldrich (Xanthan gum from *Xanthomonas campestris*, G1253-500G).

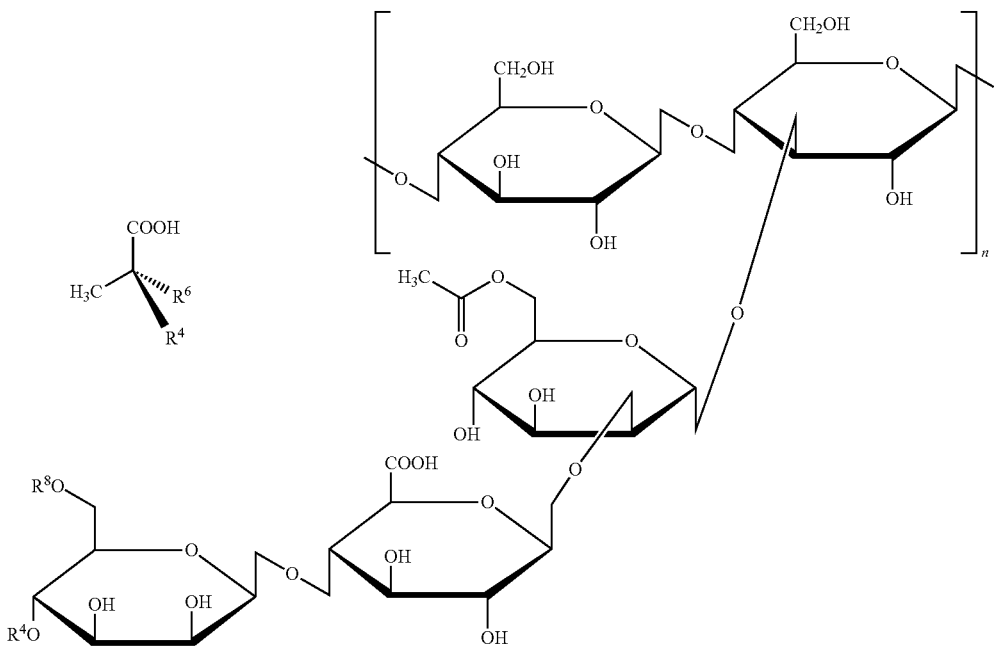

Typically, xanthan gum's molecular weight distribution ranges from $2 \times 10^6$ to $20 \times 10^6$ Da (1 Da=1 g/mol). This molecular weight distribution depends on the association between chains, forming aggregates of several individual chains. The variations of the fermentation conditions used in production are factors that can influence the molecular weight of xanthan gum. See Garcia-Ochoa, F., et al. (2000), "Xanthan gum production, recovery, and properties." *Biotechnology Advances* 18: 549-579.

A suitable carboxymethylcellulose is CMC-7MT which is a technical grade of sodium carboxymethyl cellulose manufactured by Hercules. It has a degree of substitution of about 0.7, a polymerization degree of 1000, and a molecular weight of 250,000 g/mol.

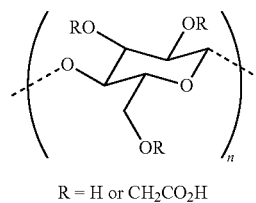

R = H or CH$_2$CO$_2$H

Pectin, sometimes referred to as poly-D-galacturonic acid methyl ester, is available from Sigma-Aldrich (Pectin from Apple, 76282). Its molecular weight is 30,000 to 100,000 g/mol.

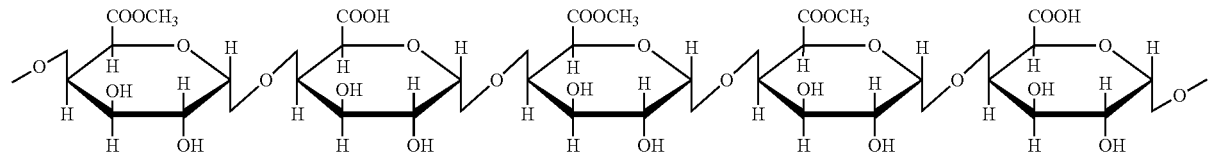

In addition to xanthan gum and CMC and Pectin, other suitable viscosity modifiers may include other polysaccharides (starches, vegetable gums), other natural gums or proteins such as collagen, furcellaran, gelatin and various synthetic polymers depending on solids content of the composition and ratio of NFC/viscosity modifier. Noted are the following viscosity modifiers which may be employed:
methylcellulose, ethylcellulose, hydroxyethylcellulose, carboxy ethylcellulose, natural resins, natural rosins, and the like;
starches including corn starch; potato starch; arrowroot; and the like;
ethoxylated linear alcohols;
polyethylene glycols, polypropylene glycols, and the like;
Natural gums obtained from seaweeds such as Agar, Alginic acid and Sodium alginate, Carrageenan;
Natural gums obtained from non-marine botanical resources such as Gum arabic from the sap of Acacia trees, Gum ghatti from the sap of *Anogeissus* trees, Gum tragacanth from the sap of *Astragalus* shrubs, Karaya gum from the sap of *Sterculia* trees, Guar gum from guar beans, Locust bean gum from the seeds of the carob tree, Beta-glucan from oat or barley bran, Chicle gum (an older base for chewing gum obtained from the chicle tree), Dammar gum from the sap of Dipterocarpaceae trees, Glucomannan from the konjac plant, Mastic gum (a chewing gum from ancient Greece obtained from the mastic tree), *Psyllium* seed husks from the *Plantago* plant, Spruce gum (a chewing gum of American Indians obtained from spruce trees), Tara gum from the seeds of the tara tree;
Other Natural gums produced by bacterial fermentation such as Gellan gum;
and any combination of the foregoing.

Surface Tension Modifiers

In embodiments used for converting it is desirable to use a surface tension modifier so that the adhesive coats applicator and pick-up rolls. PVOH is suitable for this purpose.

PVOH for use in connection with the present invention include those obtainable from Sekisui Specialty Chemicals, Houston, Tex. as well as other suppliers and distributors. Commercial polyvinyl alcohol resins are produced by saponifying polyvinyl acetate and include significant levels of vinyl acetate repeat units. The degree of hydrolysis (mol %) indicates the mol % alcohol repeat units in the polyvinyl alcohol, with the remainder being in acetate form. A partially hydrolyzed polyvinyl alcohol may be used and dissolved in water that is from about 70 mole percent to about 90 mole percent hydrolyzed, such as from about 84 mole percent to about 89 mole percent hydrolyzed. Partially hydrolyzed polyvinyl alcohols more rapidly dissolve; however, polyvinyl alcohols that are hydrolyzed to a greater extent may be used. For instance, polyvinyl alcohol may also be used in the process that has a percent hydrolysis (mole %) of greater than 90%. In some cases, the polyvinyl alcohol may be from about 91% to about 99.31% hydrolyzed. The molecular weight of the polyvinyl alcohol used can also vary. A relatively low molecular weight polyvinyl alcohol may be used. For instance, the polyvinyl alcohol may have a viscosity at 4% solids and at 20° C. of less than about 10 cps. For instance, the viscosity of the polyvinyl alcohol at 4% solids and 20° C. can be from about 3.5 cps to about 4.5 cps. In other embodiments, however, higher molecular weight polyvinyl alcohols can be used that have a viscosity at 4% solids and at 20° C. of greater than about 5 cps, such as up to about 75 cps. Generally, polyvinyl alcohol or PVOH resins consist mostly of hydrolyzed polyvinyl acetate repeat units (more than 50 mole %), but may include monomers other than polyvinyl acetate in amounts up to about 10 mole % or so in typical commercial resins. Suitable co-monomers include vinyl co-monomers in general and especially those with carboxylate or sulfonate functionality as is seen in U.S. Pat. No. 7,642,226. Typical commercial polyvinyl alcohols are listed in Table 8, below. Characteristic PVOH Viscosity is measured at 4 wt % solution of the polyvinyl alcohol in water at a temperature of 20° C. Viscosity is expressed in centipoises unless otherwise indicated, abbreviated cps or cP.

TABLE 8

Commercial Polyvinyl Alcohol for Adhesive

| Grade | % Hydrolysis, | Viscosity, cps[1] | pH | Volatiles, % Max. | Ash, % Max. |
|---|---|---|---|---|---|
| Super Hydrolyzed | | | | | |
| Selvol 125 | 99.3+ | 28-32 | 5.5-7.5 | 5 | 1.2 |
| Selvol 165 | 99.3+ | 62-72 | 5.5-7.5 | 5 | 1.2 |
| Fully Hydrolyzed | | | | | |
| Selvol 103 | 98.0-98.8 | 3.5-4.5 | 5.0-7.0 | 5 | 1.2 |
| Selvol 107 | 98.0-98.8 | 5.5-6.6 | 5.0-7.0 | 5 | 1.2 |
| Selvol 310 | 98.0-98.8 | 9.0-11.0 | 5.0-7.0 | 5 | 1.2 |
| Selvol 325 | 98.0-98.8 | 28.0-32.0 | 5.0-7.0 | 5 | 1.2 |
| Selvol 350 | 98.0-98.8 | 62-72 | 5.0-7.0 | 5 | 1.2 |
| Intermediate Hydrolyzed | | | | | |
| Selvol 418 | 91.0-93.0 | 14.5-19.5 | 4.5-7.0 | 5 | 0.9 |
| Selvol 425 | 95.5-96.5 | 27-31 | 4.5-6.5 | 5 | 0.9 |
| Partially Hydrolyzed | | | | | |
| Selvol 502 | 87.0-89.0 | 3.0-3.7 | 4.5-6.5 | 5 | 0.9 |
| Selvol 203 | 87.0-89.0 | 3.5-4.5 | 4.5-6.5 | 5 | 0.9 |
| Selvol 205 | 87.0-89.0 | 5.2-6.2 | 4.5-6.5 | 5 | 0.7 |
| Selvol 513 | 86.0-89.0 | 13-15 | 4.5-6.5 | 5 | 0.7 |
| Selvol 523 | 87.0-89.0 | 23-27 | 4.0-6.0 | 5 | 0.5 |
| Selvol 540 | 87.0-89.0 | 45-55 | 4.0-6.0 | 5 | 0.5 |

[1]4% aqueous solution, 20° C.

Commercial formulations containing PVOH are available from a variety of sources including H.B. Fuller of Minnesota. Such compositions may contain optional additives if so desired. See U.S. Pat. No. 7,201,815.

Figure 15A:
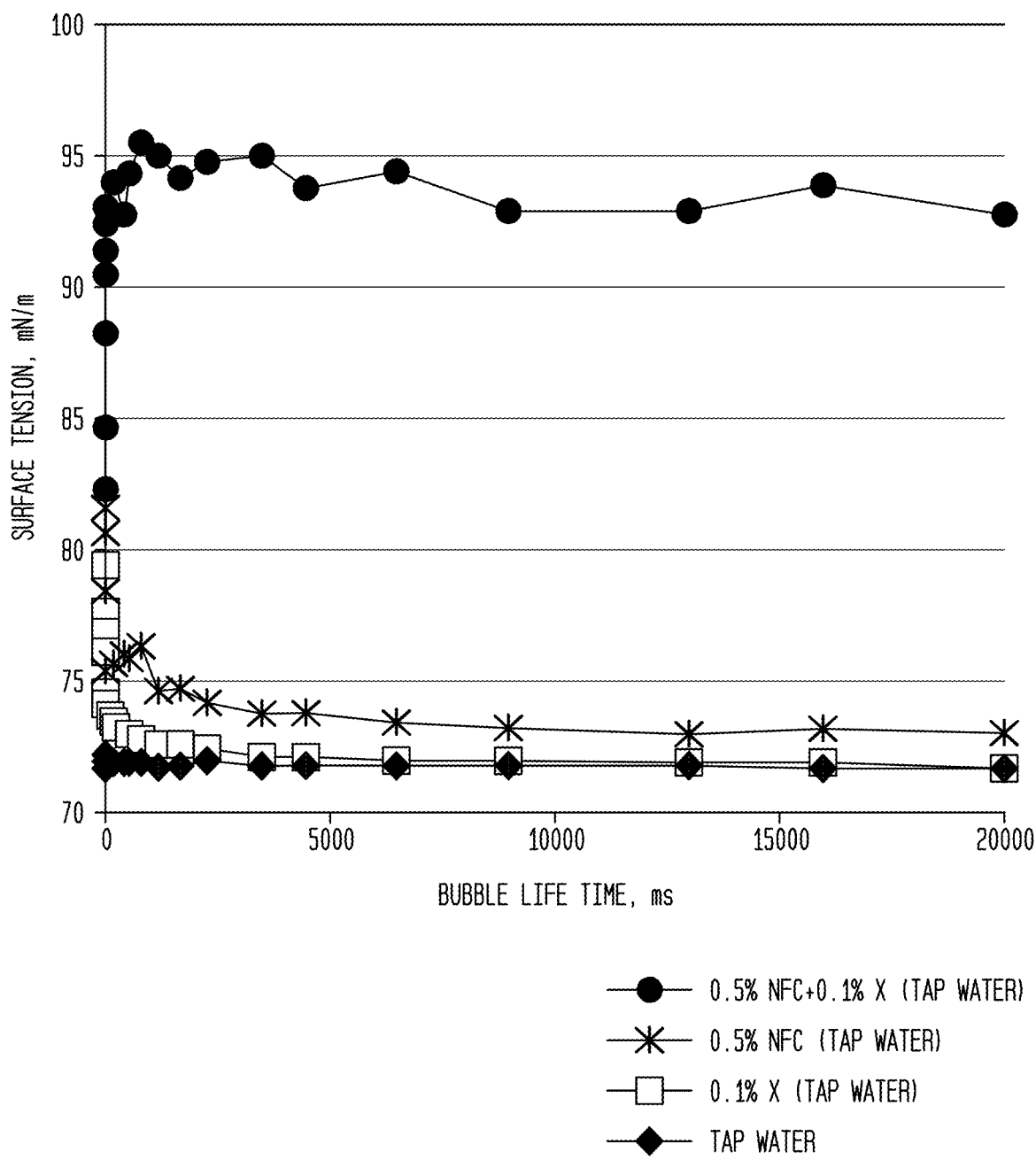
FIG. 15A is a plot showing the surface tension of NFC, tap water and xanthan gum.

It was observed that the NFC/Xanthan Gum bonding agent had difficulty coating a rubber pickup roll in the converting apparatus. A poor pickup of the bonding agent resulted in no lamination between the two-ply basesheet. For good wetting to occur, the surface energy of the adhesive should be less than the surface energy for the substrate to which it is applied. A surface tension analysis was conducted using a SITA pro line t15 tensiometer to verify this concern. As shown in FIG. 15A, at the room temperature, tap water has a surface tension of 72 mN/m. Adding 0.1% xanthan gum into water did not change the surface tension significantly. Mixing 0.5% NFC into the tap water slightly increased the surface tension to 73 mN/m. However, when the 0.5% NFC and 0.1% xanthan gum were mixed together, the surface tension increased to 93 mN/m. This dramatic change is additional evidence to indicate that the xanthan gum improved the NFC suspension and distribution in aqueous solution.

As a comparison (FIG. 15B), the surface tension of regular PVOH glue (2% PVOH) was below 50 mN/m after 0.6 sec, significantly less than water. The difference in surface tension between the NFC bonding agent and PVOH explained the challenge of coating NFC bonding agent on the rubber roll. It appeared necessary to lower the surface tension of the NFC bonding agent to a certain extent. By adding 2% PVOH into the NFC bonding agent, the surface tension of CH1 (2% PVOH+0.5% NFC) and CH2 (2% PVOH+0.5% NFC+0.1% xanthan gum) were effectively reduced, and the current surface tension did not cause issues during the pilot trial. It needs to be noted that the purpose of adding PVOH was only for reducing surface tension. 2% PVOH itself is too weak to form a good plybond.

Figure 15B:
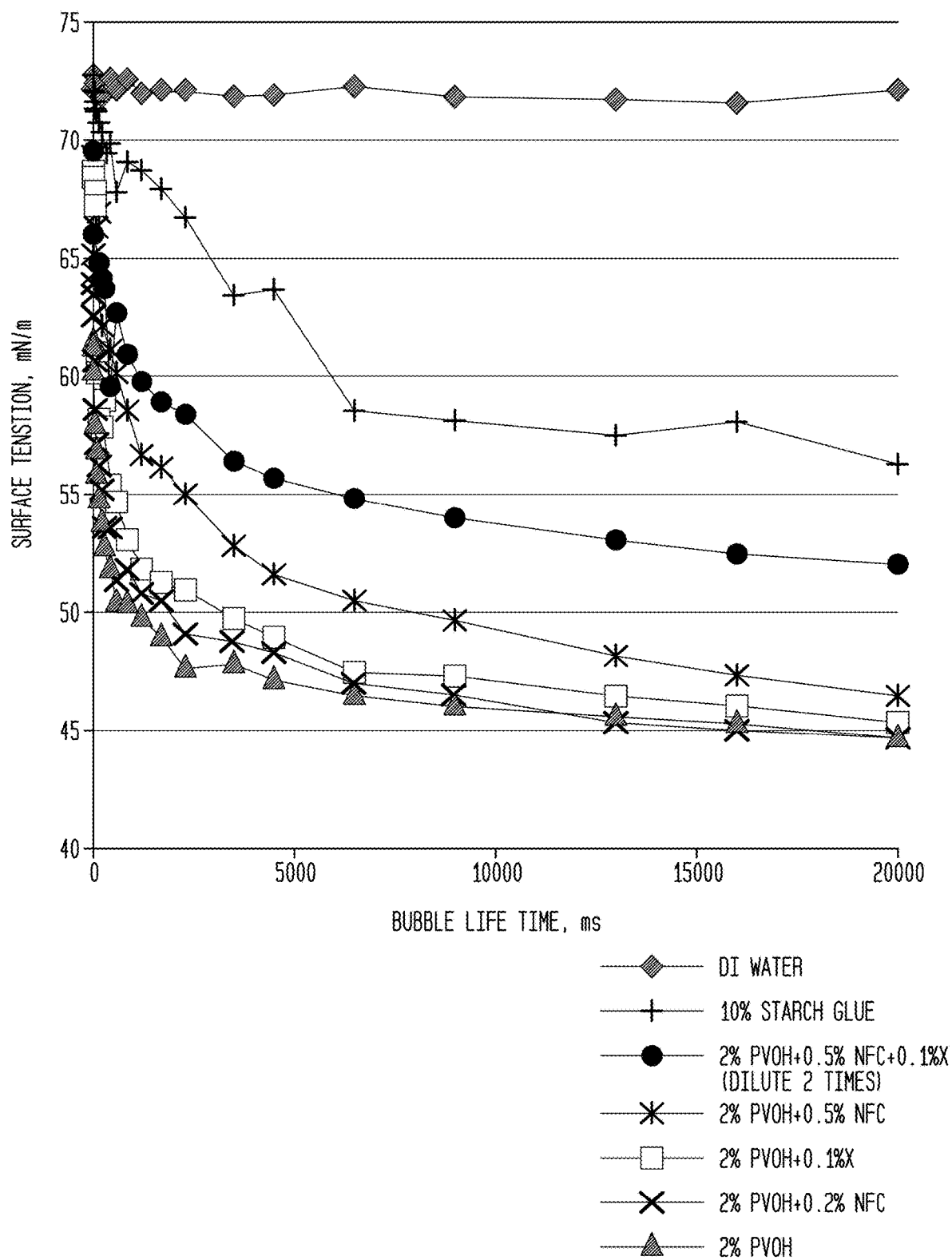
FIG. 15B is a plot showing the surface tension of various compositions.

In FIGS. 15A and 15B the dynamic surface tension of NFC bonding agent along with other liquid is measured at room temperature, using a SITA pro line t15 tensiometer. The device is based on the bubble pressure method whereby air is pumped through a capillary into the to-be-analyzed liquid. According to the Young-Laplace equation, the pressure difference, $P_{max}-P_{min}$, seen within the bubble's lifetime is proportional to the surface tension.

The sample temperature is equilibrated to room temperature before testing. The capillary of the tensiometer is sunk vertically into the liquid to be measured until the liquid is within the grey marking on the temperature sensor. "Auto mode" was used to measure the dynamic surface tension in the range of bubble lifetimes. For comparison purposes throughout the specification and claims, a surface tension of tested sample at bubble life time 5 seconds is used to characterize materials.

As a result of their adsorption at the surface or interface, surface tension modifiers bring about a reduction in the dynamic surface tension. Immediately after the surface is produced, the dynamic surface tension has the same value as the pure liquid. The value then reduces until an equilibrium value is reached. The time required for this depends on the diffusion rate and the adsorption rate of the surface tension modifier. Interfaces are produced extremely quickly in processes such as spraying, foaming, cleaning, printing, emulsifying or coating. In such processes it is not just the equilibrium value of the surface tension that is the decisive influence, but also the kinetics of the interface formation. The molecular mobility of the surface tension modifier used becomes an important factor in the formation of the dynamic surface tension. In this application, an ideal surface tension modifier is expected to effectively reduce the surface tension of NFC bonding agent within a few seconds of bubble lifetime.

Additional surface tension modifiers include surfactants in general such as anionic surfactants, cationic surfactants, zwitterionic surfactants and more preferably nonionic surfactants. One preferred nonionic surfactant is Tergitol® MIN FOAM 1× available from Sigma-Aldrich. This material is a polyglycol ether nonionic surfactant of the formula:

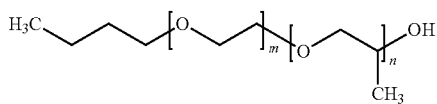

where m and n are integers.

Other suitable surface tension modifiers include $C_{12}$-$C_{18}$-alkyl polyethylene glycol-polypropylene glycol ethers having in each case up to 8 mol of ethylene oxide and propylene oxide units in the molecule. It is also possible to use other known surfactants, for example $C_{12}$-$C_{18}$-alkyl polyethylene glycol-polybutylene glycol ethers having in each case up to 8 mol of ethylene oxide and butylene oxide units in the molecule, end group-capped alkyl polyalkylene glycol mixed ethers, or $C_8$-$C_{14}$-alkyl polyglucosides with a degree of polymerization of about 1 to 4 and/or $C_{12}$-$C_{18}$-alkyl polyethylene glycols with 3 to 8 ethylene oxide units in the molecule. Likewise suitable are surfactants from the family of the glucamides, for example alkyl N-methylglucamides in which the alkyl moiety preferably originates from a fatty alcohol with the carbon chain length $C_6$-$C_{14}$. It is advantageous in some cases when the surfactants described are used as mixtures, for example the combination of alkyl polyglycoside with fatty alcohol ethoxylates or of glucamide with alkyl polyglycosides. The presence of amine oxides, betanes and ethoxylated alkylamines is also possible.

Antimicrobial Agents

The ply-bonding compositions of the invention suitably include antimicrobial agents, most preferably food-grade preservatives which function as antibacterial agents and antifungal agents. Without the addition of antimicrobial agent, all the NFC-xanthan gum laminating agents became moldy after two weeks at room temperature in a sealed centrifuge tube. The addition of a trace amount of potassium sorbate was found effective to inhibit the growth of microorganism in NFC laminating agent. Potassium sorbate is the potassium salt of sorbic acid. It is a white salt that is very soluble in water and is primarily used as a food preservative. Sorbate is a lipophilic compound and may permeate the bilipid layer of the bacterial cytoplasmic membrane. Interaction of sorbate with that membrane may result in the interference of membrane-associated cellular functions that inhibit the growth of microbes. The typical culinary usage rates of potassium sorbate are 0.025% to 0.1%. A light dosage of 0.025% potassium sorbate was added into 0.5% and 1% NFC-0.1% xanthan gum laminating agent. No mold has been found in the laminating agent after storing at room temperature for two months. Considering paper towel is a food contact material, potassium sorbate is a preferred antiseptic for use in NFC laminating agent of the present invention.

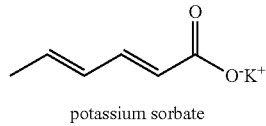

potassium sorbate

Other preferred antimicrobial agents may include other food-grade preservative compositions which include sorbic acid, sodium sorbate, calcium sorbate, benzoic acid, calcium benzoate, potassium benzoate, sodium benzoate, calcium hydrogen sulphite, calcium sulphite, potassium bisulphite, potassium metabisulphite, potassium sulphite, sodium bisulphite, sodium metabisulphite, sodium sulphite, sulphur dioxide, potassium nitrate, potassium nitrite, sodium nitrate, sodium nitrite, calcium propionate, potassium propionate, propionic acid, sodium propionate, mixtures thereof and the like.

Tackifiers

Tackifiers suitable for use in conjunction with the adhesive compositions described herein may, in some embodiments, include, but are not limited to, methylcellulose, ethylcellulose, hydroxyethylcellulose, carboxy methylcellulose, carboxy ethylcellulose, amides, diamines, polyesters, polycarbonates, silyl-modified polyamide compounds, polycarbamates, urethanes, natural resins, natural rosins, rosin esters SYLVATAC®RE85 and SYLVALITE® RE100, both esters of tall oil rosin, available from Arizona Chemical, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamido-methyl-propane sulfonate co-polymers, acrylic acid/acrylamido-methyl-propane sulfonate co-polymers, benzyl coco di-(hydroxyethyl) quaternary amines, p-T-amyl-phenols condensed with formaldehyde, dialkyl amino alkyl(meth)acrylates, acrylamides, N-(dialkyl amino alkyl) acrylamide, methacrylamides, hydroxy alkyl(meth)acrylates, methacrylic acids, acrylic acids, hydroxyethyl acrylates, ethylene vinyl acetate, vinyl acetate ethylene polymers, aliphatic hydrocarbons, cycloaliphatic hydrocarbons (e.g., EASTOTAC® products, available from Eastman Chemical Co.), aromatic hydrocarbons, aromatically modified aliphatic hydrocarbons, cycloaliphatic hydrocarbons, hydrogenated versions of the foregoing hydrocarbons, terpenes, polyterpenes, modified terpenes (e.g., phenolic modified terpene resins like SYLVARES™ TP96 and SYLVARES™ TP2040, available from Arizona Chemical, and the like, any derivative thereof, and any combination thereof.

PVOH may also be used as a tackifier as well as a surface tension modifier.

In some embodiments, tackifiers suitable for use in conjunction with the adhesive compositions described herein may be food-grade tackifiers. Examples of food-grade tackifiers include, but are not limited to, methylcellulose, ethylcellulose, hydroxyethylcellulose, carboxy methylcellulose, carboxy ethylcellulose, natural resins, natural rosins, and the like, and any combination thereof.

Water Soluble Cellulose Derivatives and Water Soluble Polyols

The invention compositions may include water soluble cellulose derivatives and/or water soluble polyols as hereinafter described in more detail. Water soluble cellulose derivatives include cellulose ethers, hydroxyethyl cellulose, carboxymethylcellulose, carboxymethyl hydroxyethyl cellulose and the like. "Water soluble polyols" include water soluble monomeric polyol, water soluble polymeric polyol, especially including PEG, glycols in general, functionalized polymeric polyol and combinations thereof. In some cases, when we refer to water soluble polyols, we refer to polyols other than PVOH.

Additional Components

A typical adhesive composition may optionally include additional additives. Additives suitable for use in conjunction with the adhesive compositions described herein may include, but are not limited to, crosslinkers, insolubilizers, fillers, thickeners, water-resistance additives, flame retardants, lubricants, softening agents, pigments, dyes, antioxidants, UV-stabilizers, resins, rosins, waxes, flowing agents, compatibilizers, aromas, and the like, and any combination thereof. Various exemplary additives are seen in United States Patent Application Publication No. US2015/0090156 of Combs et al., noted above.

NFC/PVOH Adhesive Formulation

Compositions with relatively high PVOH content and relatively low NFC content may be formulated from commercial polyvinyl alcohol (PVOH) adhesive and NFC by diluting a commercially available 8% solids by weight aqueous PVOH adhesive and thoroughly mixing with NFC as detailed in Table 9, wherein it is seen Conventional PVOH glue was diluted to 4-6% solid content from commercial PVOH plybond water-based adhesive (WB2746, H.B. Fuller, 8% solids). Two types of NFC were employed in the formulations of Table 9: NFC A, a relatively fine grade in an aqueous dispersion, 3.28% by weight solids; NFC B, a somewhat coarser grade in an aqueous dispersion, 1.92% solids; were mixed with the commercial PVOH to prepare NFC reinforced PVOH glues having the composition shown in Table 9.

TABLE 9

Preparation of Glue

| Glue # | Sample | PVOH Solids, % (w/w) | 8% PVOH, g | 3.28% NFC A, g | 1.92% NFC B, g | Water, g | Total, g |
|---|---|---|---|---|---|---|---|
| 1 | PVOH | 4 | 150 | | | 150.00 | 300.00 |
| 2 | | 4.5 | 170 | | | 132.22 | 302.22 |
| 3 | | 5 | 190 | | | 114.00 | 304.00 |
| 4 | | 5.5 | 210 | | | 95.45 | 305.45 |
| 5 | | 6 | 225 | | | 75.00 | 300.00 |
| 6 | PVOH + 5% NFC A * | 4 | 150 | 18.29 | | 131.71 | 300.00 |
| 7 | | 4.5 | 170 | 20.73 | | 111.49 | 302.22 |
| 8 | | 5 | 190 | 23.17 | | 90.83 | 304.00 |
| 9 | | 5.5 | 210 | 25.61 | | 69.84 | 305.45 |
| 10 | | 6 | 225 | 27.44 | | 47.56 | 300.00 |
| 11 | PVOH + 5% NFC B * | 4 | 150 | | 31.25 | 118.75 | 300.00 |
| 12 | | 4.5 | 170 | | 35.42 | 96.81 | 302.22 |
| 13 | | 5 | 190 | | 39.58 | 74.42 | 304.00 |
| 14 | | 5.5 | 210 | | 43.75 | 51.70 | 305.45 |
| 15 | | 6 | 225 | | 46.88 | 28.13 | 300.00 |

* based on PVOH content

PVOH Based Adhesive Viscosity Characteristics

Figure 16:
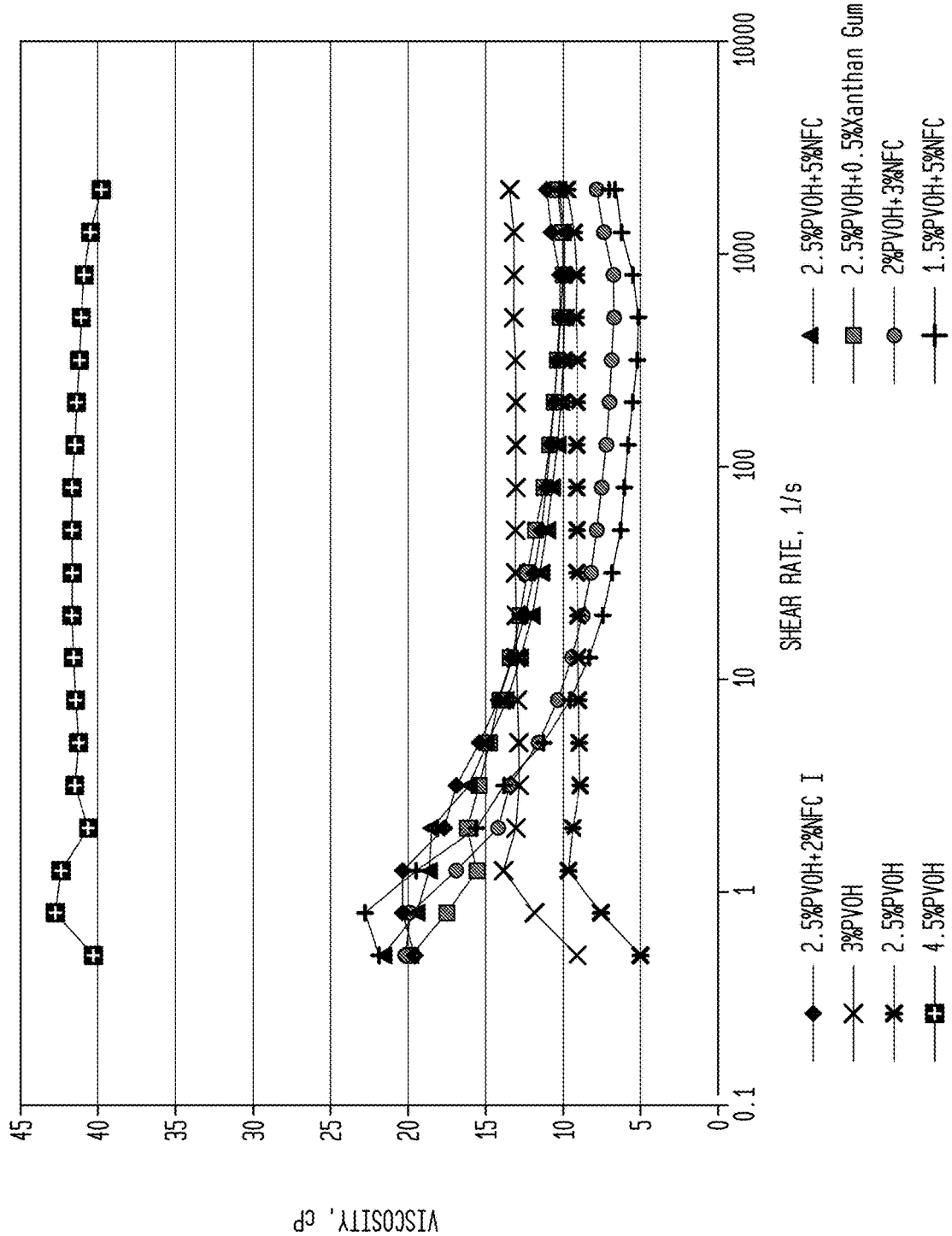
FIGS. 16 and 17 are plots of Adhesive Viscosity versus shear rate for various adhesives.
Figure 17:
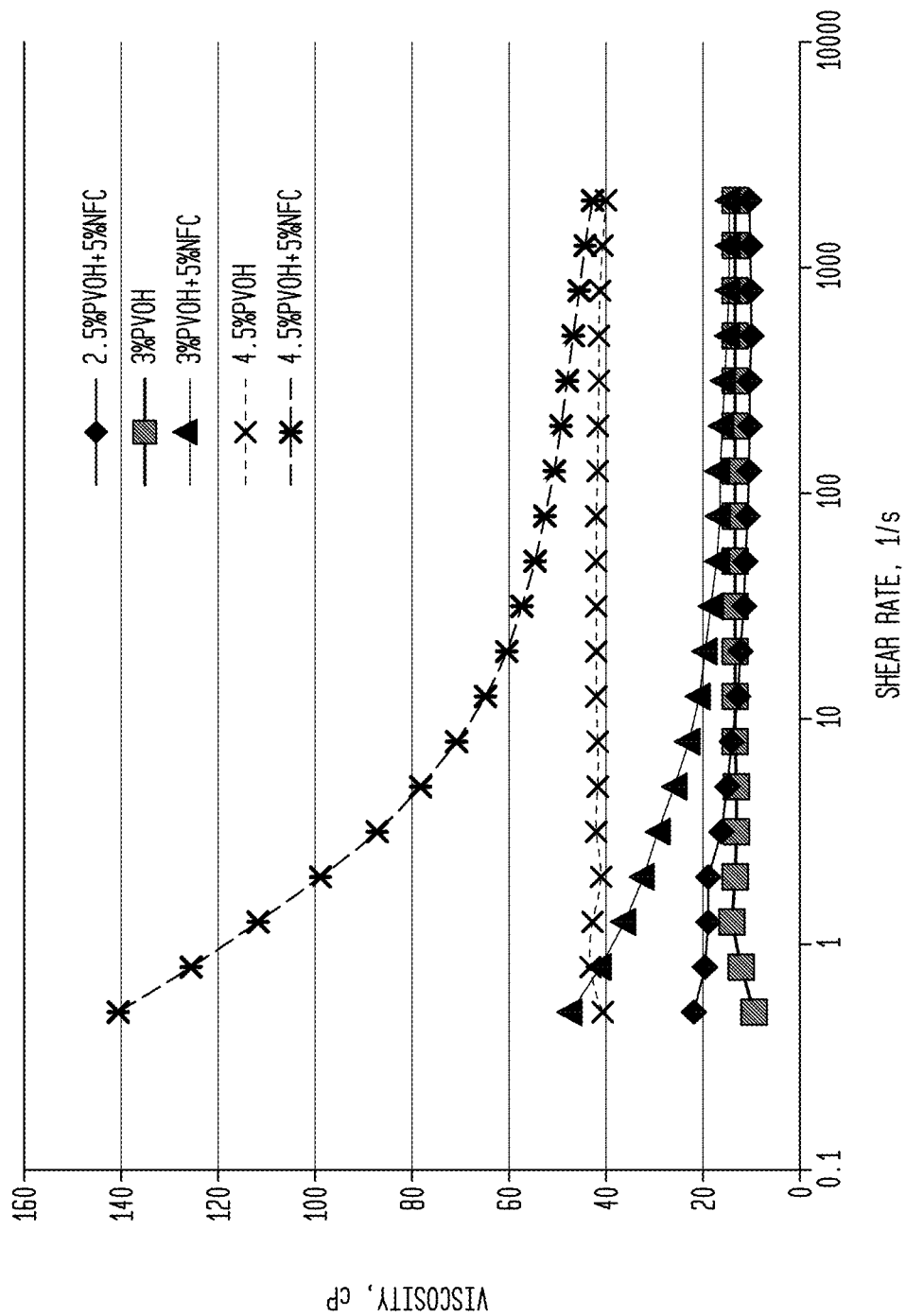

The above and additional glues with different levels of PVOH and NFC were tested for their viscosity with respect to shear rate using the procedure noted above. The viscosity of each glue represented as centiPoise vs. shear rate (γ, which is proportional to rotor speed and inversely related to gap) is shown in FIGS. 16 and 17. All the PVOH glues without NFC were typical Newtonian fluids in which viscosity stays the same regardless of shear rate in the range of 0.5-2000 $s^{-1}$. Viscosity of 4.5% PVOH was over three times the viscosity of 3% PVOH. All the glues that contain 5% NFC based on the dry weight of PVOH displayed a shear thinning property. For the NFC reinforced glues, 3% PVOH+5% NFC and 4.5% PVOH+5% NFC, the incorporation of NFC significantly increased the viscosity of the glue and the degree of increase depends on the shear rate. Two glue samples, 3% PVOH and 2.5% PVOH+5% NFC, had very similar viscosity curves. Therefore, it is likely that a similar volume of glue will be applied on base web when using these two types of glue. However, 2.5% PVOH+5% NFC provides a benefit in terms of softness since less total PVOH is used.

FIGS. 16, 17 likewise show that standard PVOH glue is converted from a Newtonian fluid to a pseudoplastic (shear-thinning) fluid by addition of a small quantity of NFC. Low-shear viscosity is also significantly increased. Glue containing 2.5% PVOH with NFC has a viscosity in a similar range as 3% PVOH. If the fluid dynamics of each glue results in the transfer of a similar liquid volume, it is reasonable to assume that the NFC glue supplied about 20% less PVOH (2.5/3). Softness is improved due to the smaller amount of glue being less detectable to touch. The glue/tissue interface between the applicator roll and emboss roll may involve the most important transfer of glue, and the shear rate becomes an important consideration for non-Newtonian fluids. If the shear rate is low, the alternative glues will have higher viscosity than 3% PVOH. If the shear rate is above about 10 $sec^{-1}$, the alternative glues will be thinner. Given that the roll speeds are matched and the nip pressure is low, the shear rate is expected to be low. Thus, the alternative glues are hypothesized to act as higher viscosity glues in terms of wet tack while delivering a smaller quantity of dry residual.

NFC Adhesive Viscosity Characteristics

Suitable bonding agents based on NFC and viscosity modifiers and optionally other components are prepared in dilute aqueous solution or suspension by mixing under shear, typically with an NFC content of 1% by weight or so with viscosity modifier and other optional components. Representative aqueous compositions are enumerated in Table 10 wherein the composition component content is reported in % by weight of the total composition, of which the balance is water (98%+) in most cases. When the adhesive is also intended for use in converting operations with an applicator roll, especially a rubber roll, a surface tension modifier is included as noted above. The data is tabulated in Table 10 and shown FIGS. 18-21.

The data shown in FIGS. 18-21 is tabulated below in Table 10.

TABLE 10

| Viscosity Properties | | | | | | | | | |
|---|---|---|---|---|---|---|---|---|---|
| 0.5% NFC + 0.1% Xanthan Gum | | 0.5% NFC + 0.07% Xanthan Gum | | 0.75% NFC + 0.1% Xanthan Gum | | 1.0% NFC + 0.1% Xanthan Gum | | 1.0% NFC + 0.13% Xanthan Gum | |
| Shear rate 1/s | Viscosity cP | Shear rate 1/s | Viscosity cP | Shear rate 1/s | Viscosity cP | Shear rate 1/s | Viscosity cP | Shear rate 1/s | Viscosity cP |
| 0.50 | 2285.51 | 0.50 | 1972.57 | 0.50 | 4224.78 | 0.50 | 7165.04 | 0.50 | 7934.89 |
| 0.79 | 1575.43 | 0.79 | 1309.78 | 0.79 | 2820.21 | 0.79 | 4966.77 | 0.79 | 5316.51 |
| 1.26 | 1043.28 | 1.26 | 874.30 | 1.26 | 1869.05 | 1.26 | 3322.62 | 1.26 | 3582.18 |
| 1.99 | 704.23 | 1.99 | 587.04 | 1.99 | 1227.38 | 1.99 | 2235.63 | 1.99 | 2426.69 |
| 3.15 | 478.15 | 3.15 | 405.18 | 3.15 | 801.51 | 3.15 | 1504.34 | 3.15 | 1666.15 |
| 5.00 | 333.09 | 5.00 | 285.76 | 5.00 | 568.07 | 5.00 | 1032.28 | 5.00 | 1232.16 |
| 7.92 | 205.50 | 7.92 | 205.12 | 7.92 | 427.17 | 7.92 | 713.33 | 7.92 | 856.73 |

TABLE 10-continued

Viscosity Properties

| 12.56 | 139.35 | 12.56 | 156.35 | 12.56 | 293.15 | 12.56 | 508.80 | 12.56 | 581.95 |
| 19.91 | 112.90 | 19.91 | 263.69 | 19.91 | 216.41 | 19.91 | 395.89 | 19.91 | 414.02 |
| 31.55 | 77.61 | 31.55 | 315.89 | 31.55 | 149.16 | 31.55 | 381.45 | 31.55 | 303.68 |
| 50.00 | 56.27 | 50.00 | 857.91 | 50.00 | 101.08 | 50.00 | 273.30 | 50.00 | 171.76 |
| 79.24 | 40.55 | 79.25 | 484.10 | 79.24 | 79.23 | 79.24 | 273.26 | 79.24 | 132.78 |
| 125.59 | 27.96 | 125.59 | 251.89 | 125.59 | 62.87 | 125.59 | 248.12 | 125.59 | 97.72 |
| 199.05 | 23.66 | 199.06 | 126.79 | 199.05 | 74.96 | 199.05 | 139.44 | 199.05 | 75.55 |
| 315.48 | 19.10 | 315.478 | 68.06 | 315.48 | 65.16 | 315.48 | 94.73 | 315.48 | 53.36 |
| 500.00 | 15.07 | 500.00 | 42.41 | 500.00 | 38.42 | 500.00 | 51.36 | 500.00 | 35.85 |
| 792.45 | 11.95 | 792.45 | 26.29 | 792.45 | 25.76 | 792.45 | 35.80 | 792.45 | 26.27 |
| 1255.95 | 8.89 | 1255.94 | 17.51 | 1255.94 | 23.22 | 1255.94 | 25.75 | 1255.94 | 20.36 |
| 1990.54 | 7.37 | 1990.53 | 12.09 | 1990.54 | 15.91 | 1990.54 | 18.91 | 1990.53 | 16.71 |
| 2000.00 | 7.36 | 2000.00 | 12.17 | 2000.00 | 15.62 | 2000.00 | 16.52 | 2000.00 | 16.88 |

| 1.0% NFC Slurry_Paperlogic | | 1.0% Xanthan Gum | | 5% PVOH_TT3005 | | 2.5% PVOH_TT3005 | | 4.5% PVOH | |
|---|---|---|---|---|---|---|---|---|---|
| Shear rate 1/s | Viscosity cP | Shear rate 1/s | Viscosity cP | Shear rate 1/s | Viscosity cP | Shear rate 1/s | Viscosity cP | Shear rate 1/s | Viscosity cP |
| 0.50 | 47567.1 | 0.50 | 16684 | 0.50 | 61.04 | 0.50 | 6.44 | 0.50 | 38.43 |
| 0.79 | 30257 | 0.79 | 12759.8 | 0.79 | 58.83 | 0.79 | 7.00 | 0.79 | 41.30 |
| 1.26 | 20858.7 | 1.26 | 8829.06 | 1.26 | 59.01 | 1.26 | 7.28 | 1.26 | 42.02 |
| 1.99 | 18659.4 | 1.99 | 5897.01 | 1.99 | 60.85 | 1.99 | 7.03 | 1.99 | 40.17 |
| 3.15 | 20986.7 | 3.15 | 3868.86 | 3.15 | 60.30 | 3.15 | 7.10 | 3.15 | 40.83 |
| 4.50 | 33391.9 | 4.50 | 2501.74 | 5.00 | 60.71 | 5.00 | 7.03 | 5.00 | 40.68 |
| 7.92 | 50741.6 | 7.92 | 1609.89 | 7.92 | 60.86 | 7.92 | 7.04 | 7.92 | 40.82 |
| 12.56 | 51552.9 | 12.56 | 1040.07 | 12.56 | 60.96 | 12.56 | 7.06 | 12.56 | 40.99 |
| 19.90 | 53049.5 | 19.91 | 676.49 | 19.91 | 61.12 | 19.91 | 7.07 | 19.91 | 41.08 |
| 31.55 | 46991.5 | 31.55 | 441.97 | 31.55 | 61.23 | 31.55 | 7.09 | 31.55 | 41.18 |
| 50.00 | 17077.7 | 50 | 292.58 | 50 | 61.24 | 50 | 7.09 | 50 | 41.22 |
| 79.24 | 9200.18 | 79.24 | 195.90 | 79.24 | 61.08 | 79.24 | 7.08 | 79.24 | 41.21 |
| 125.59 | 9716.41 | 125.59 | 132.61 | 125.59 | 60.58 | 125.59 | 7.06 | 125.59 | 41.12 |
| 199.05 | 5740.54 | 199.05 | 91.19 | 199.05 | 59.95 | 199.05 | 7.06 | 199.05 | 40.95 |
| 315.48 | 3052.84 | 315.48 | 63.50 | 315.48 | 59.41 | 315.48 | 7.07 | 315.48 | 40.76 |
| 500.00 | 1381.11 | 500 | 45.08 | 500 | 58.94 | 500.00 | 7.08 | 500 | 40.66 |
| 792.44 | 673.67 | 792.446 | 32.49 | 792.45 | 58.37 | 792.45 | 7.15 | 792.45 | 40.51 |
| 1255.94 | 307.66 | 1255.94 | 23.91 | 1255.94 | 57.48 | 1255.94 | 7.40 | 1255.94 | 40.15 |
| 1990.54 | 123.97 | 1990.54 | 18.13 | 1990.54 | 55.82 | 1990.54 | 8.04 | 1990.54 | 39.46 |
| 2000 | 111.17 | 2000 | 18.04 | 2000 | 56.04 | 2000 | 8.04 | 2000 | 39.64 |

| 0.5% NFC + 0.1% CMC | | 1% NFC + 0.1% CMC | | 1% CMC | | 0.5% NFC + 0.1% Pectin | | 1% NFC + 0.1% Pectin | |
|---|---|---|---|---|---|---|---|---|---|
| Shear rate 1/s | Viscosity cP | Shear rate 1/s | Viscosity cP | Shear rate 1/s | Viscosity cP | Shear rate 1/s | Viscosity cP | Shear rate 1/s | Viscosity cP |
| 0.50 | 1448.19 | 0.50 | 6509.86 | 0.50 | 29.58 | 0.50 | 2448.86 | 0.50 | 14498.6 |
| 0.79 | 1085.57 | 0.79 | 4470.14 | 0.79 | 9.71 | 0.79 | 1736.49 | 0.79 | 9780.89 |
| 1.26 | 792.46 | 1.26 | 3164.25 | 1.26 | 5.53 | 1.26 | 1344.6 | 1.26 | 6842.66 |
| 1.99 | 507.88 | 1.99 | 2331.13 | 1.99 | 3.54 | 1.99 | 1524.33 | 1.99 | 5595.46 |
| 3.15 | 325.95 | 3.15 | 1852.03 | 3.15 | 3.08 | 3.15 | 1849.64 | 3.15 | 5920.71 |
| 5.00 | 218.70 | 5 | 1369.12 | 5.00 | 2.75 | 5.00 | 1805.29 | 5.00 | 6035.95 |
| 7.92 | 146.73 | 7.92 | 1028.09 | 7.92 | 2.59 | 7.92 | 1992.44 | 7.92 | 5883.83 |
| 12.56 | 105.28 | 12.56 | 764.01 | 12.56 | 2.47 | 12.56 | 2233.02 | 12.56 | 6096.8 |
| 19.9 | 79.38 | 19.91 | 625.82 | 19.91 | 2.39 | 19.91 | 2835.81 | 19.91 | 8231.61 |
| 31.55 | 61.14 | 31.55 | 525.88 | 31.55 | 2.34 | 31.55 | 3109.2 | 31.55 | 10798.3 |
| 50 | 49.79 | 50 | 523.52 | 50 | 2.30 | 50.00 | 2201.81 | 50.00 | 10238.7 |
| 79.24 | 41.42 | 79.25 | 202.46 | 79.24 | 2.26 | 79.24 | 1381.82 | 79.25 | 3706.51 |
| 125.59 | 35.14 | 125.59 | 86.02 | 125.59 | 2.24 | 125.60 | 1339.05 | 125.60 | 541.87 |
| 199.05 | 28.87 | 199.05 | 54.57 | 199.05 | 2.23 | 199.06 | 1394.46 | 199.05 | 50.96 |
| 315.48 | 21.84 | 315.48 | 43.02 | 315.48 | 2.26 | 315.48 | 514.42 | 315.48 | 43.13 |
| 500.00 | 18.31 | 500 | 33.78 | 500 | 2.38 | 500.00 | 208.01 | 500.00 | 29.51 |
| 792.45 | 16.67 | 792.45 | 28.15 | 792.45 | 2.61 | 792.45 | 101.96 | 792.45 | 27.03 |
| 1255.94 | 12.95 | 1255.94 | 23.89 | 1255.94 | 3.04 | 1255.94 | 47.02 | 1255.94 | 26.63 |
| 1990.54 | 9.58 | 1990.54 | 18.98 | 1990.54 | 3.69 | 1990.53 | 24.64 | 1990.53 | 16.57 |
| 2000 | 9.55 | 2000 | 18.80 | 2000 | 3.70 | 2000 | 23.02 | 2000 | 18.42 |

| 1% Pectin | | 2.5% PVOH_TT3005 | | 4.5% PVOH | | 1.0% NFC Slurry_Paperlogic | |
|---|---|---|---|---|---|---|---|
| Shear rate 1/s | Viscosity cP | Shear rate 1/s | Viscosity cP | Shear rate 1/s | Viscosity cP | Shear rate 1/s | Viscosity cP |
| 0.50 | 40.39 | 0.50 | 6.44 | 0.50 | 38.43 | 0.50 | 47567.1 |
| 0.79 | 39.15 | 0.79 | 7.00 | 0.79 | 41.30 | 0.79 | 30257 |
| 1.26 | 38.07 | 1.26 | 7.28 | 1.26 | 42.02 | 1.26 | 20858.7 |
| 1.99 | 36.15 | 1.99 | 7.03 | 1.99 | 40.17 | 1.99 | 18659.4 |
| 3.15 | 33.87 | 3.15 | 7.10 | 3.15 | 40.83 | 3.15 | 20986.7 |
| 5.00 | 33.00 | 5.00 | 7.03 | 5.00 | 40.68 | 5.00 | 33391.9 |
| 7.92 | 32.38 | 7.921 | 7.04 | 7.92 | 40.82 | 7.92 | 50741.6 |

TABLE 10-continued

| | Viscosity Properties |
|---|---|---|---|---|---|---|---|
| 12.56 | 31.83 | 12.56 | 7.06 | 12.56 | 40.99 | 12.56 | 51552.9 |
| 19.91 | 31.27 | 19.91 | 7.07 | 19.91 | 41.08 | 19.90 | 53049.5 |
| 31.55 | 30.79 | 31.55 | 7.09 | 31.55 | 41.18 | 31.55 | 46991.5 |
| 50 | 30.36 | 50 | 7.09 | 50 | 41.22 | 50.00 | 17077.7 |
| 79.24 | 29.90 | 79.24 | 7.08 | 79.24 | 41.21 | 79.24 | 9200.18 |
| 125.59 | 29.41 | 125.59 | 7.06 | 125.59 | 41.12 | 125.59 | 9716.41 |
| 199.05 | 28.80 | 199.05 | 7.06 | 199.05 | 40.95 | 199.05 | 5740.54 |
| 315.48 | 27.93 | 315.48 | 7.07 | 315.48 | 40.76 | 315.48 | 3052.84 |
| 500 | 26.81 | 500.00 | 7.08 | 500 | 40.66 | 500.00 | 1381.11 |
| 792.45 | 25.35 | 792.45 | 7.15 | 792.4 | 40.51 | 792.44 | 673.67 |
| 1255.94 | 23.54 | 1255.94 | 7.40 | 1255.94 | 40.15 | 1255.94 | 307.66 |
| 1990.54 | 21.50 | 1990.54 | 8.04 | 1990.54 | 39.46 | 1990.54 | 123.97 |
| 2000 | 21.46 | 2000 | 8.04 | 2000 | 39.64 | 2000 | 111.17 |

Bonding Agent and Component Viscosity

Figure 18:
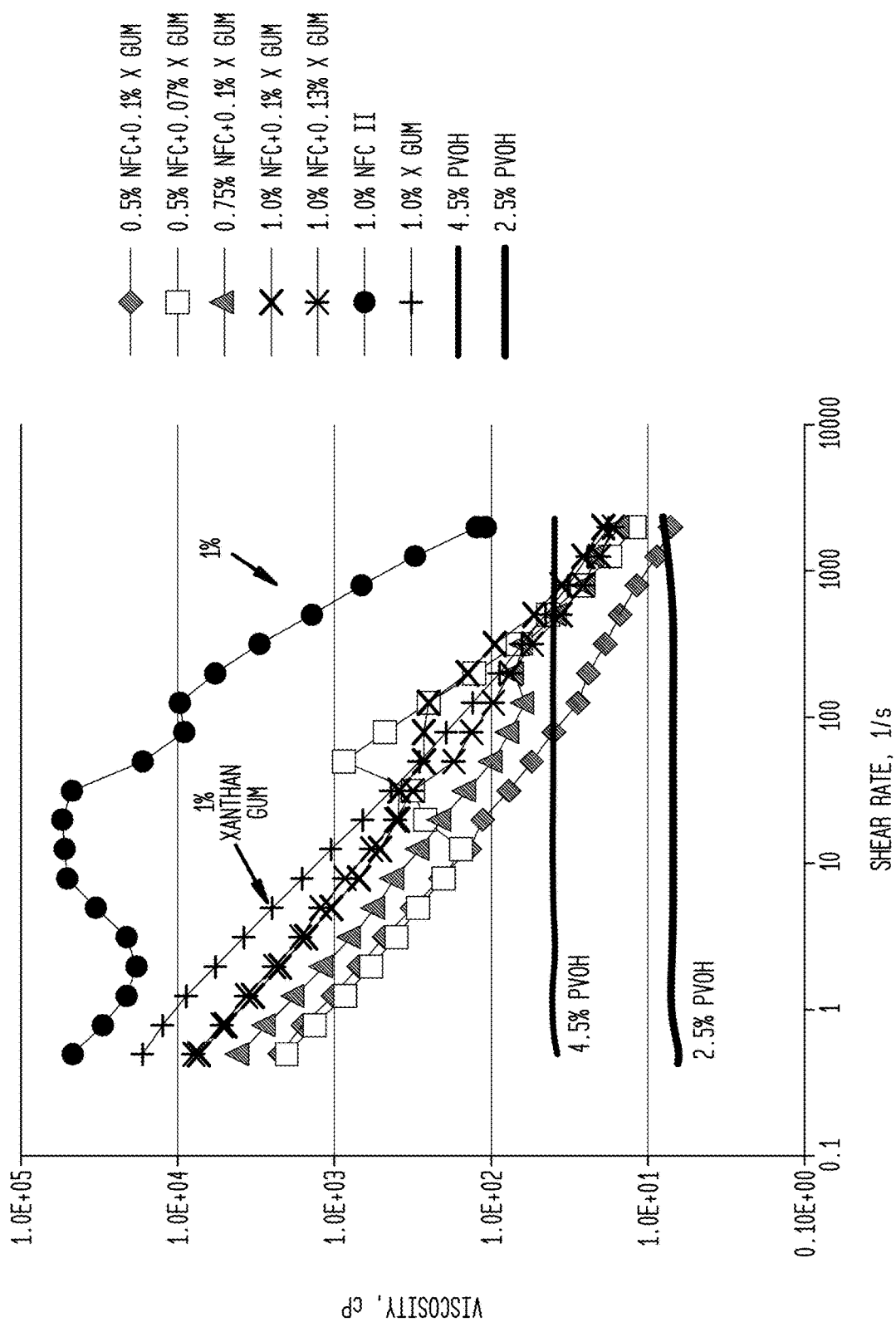
FIGS. 18-21 are plots of Viscosity versus shear rate for various ply-bonding adhesives and components thereof.
Figure 19:
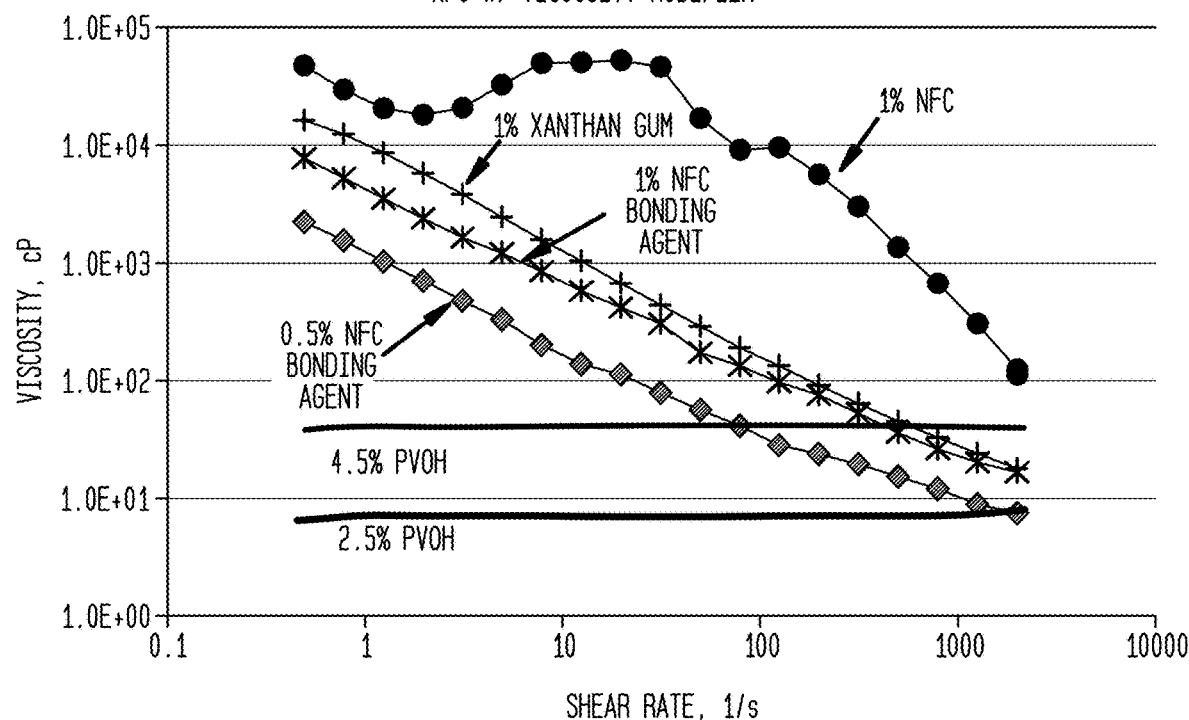

According to viscosity analysis (FIGS. 18-21), both NFC slurry and xanthan gum are pseudoplastic materials and their viscosities are significantly higher than 4.5% PVOH. At the same concentration 1%, xanthan gum has much lower viscosity than NFC. By mixing 0.1% xanthan gum with 1% NFC, the viscosity of 1% NFC+0.1% xanthan gum was significantly decreased and the viscosity appears very similar to 1% xanthan gum. The blend of 1% NFC with 0.13% xanthan gum completely smoothens the viscosity curve and makes the viscosity even lower than 1% xanthan gum. This observation suggested that a tiny amount of xanthan gum was effective in dispersing and suspending NFC to increase its fluidity. A similar trend can also be found for 0.5% NFC with a viscosity reducing amount of xanthan gum. At a commercial converting speed 1000-2000 fpm, the shear rate range is roughly equivalent to between 100 and 2000 $s^{-1}$, and the viscosity of NFC-xanthan gum laminating agents is in between 2.5% and 4.5% PVOH, which allows the NFC-xanthan gum laminating agents to run at converting line speed. FIG. 18 also provides information to help determine the optimal ratio of NFC to xanthan gum. For example, 0.07% xanthan gum was found enough to suspend 0.5% NFC. The big jump of viscosity curve beyond 10 $s^{-1}$ shear rate indicated that the amount of xanthan gum is insufficient to overcome the strong friction of NFC particles at high shear rate, and the high viscosity is a risk for a stable run of converting and non-uniform application of laminating agent to the basesheet. Based on the viscosity information, a recommended ratio of NFC to xanthan gum appears to be in the range of 1:0.13-0.2.

Figure 20:
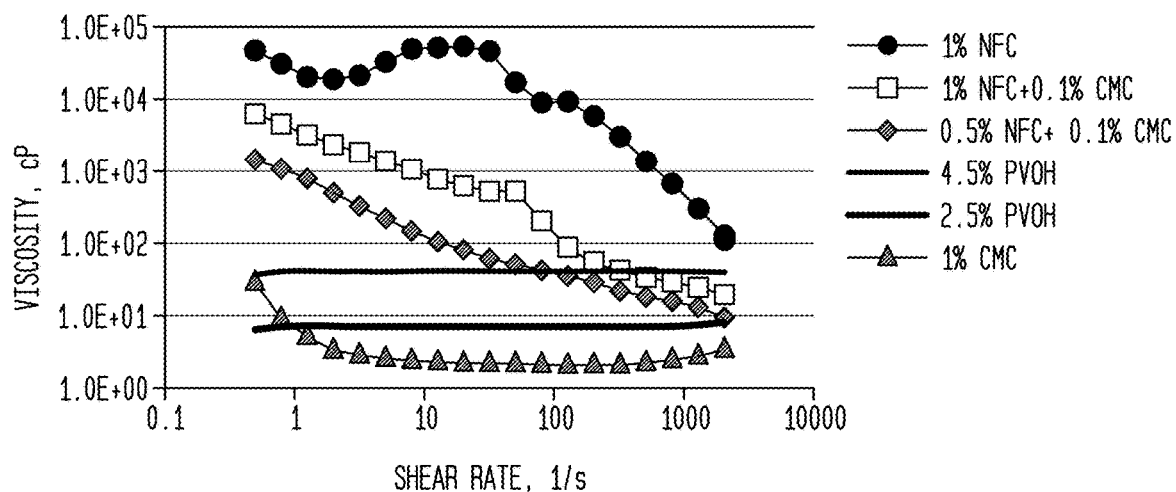
Figure 21:
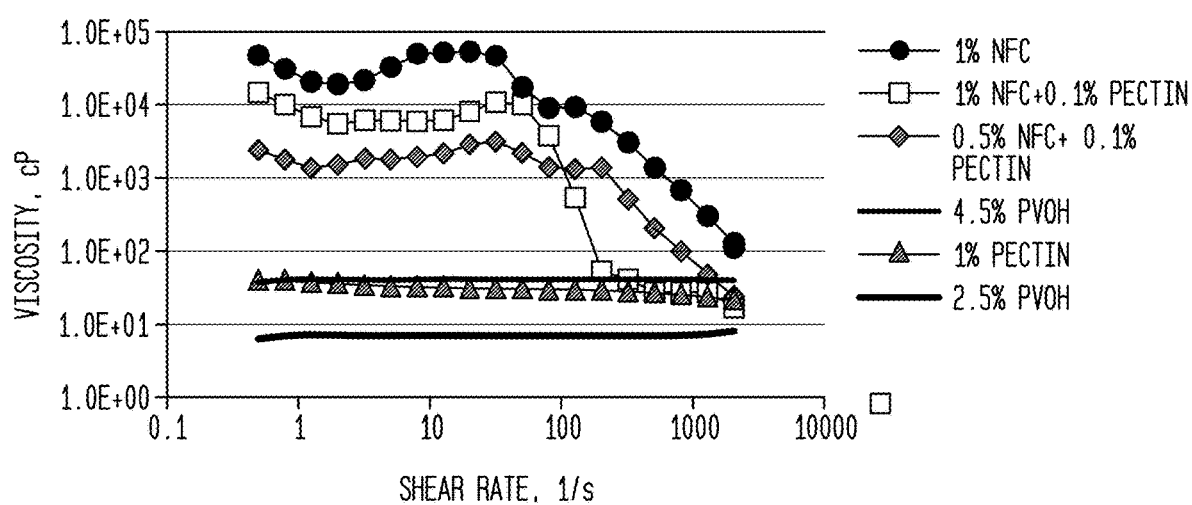

Bonding Agents formulated with CMC and pectin show similar rheological behavior as is seen in FIGS. 20, 21.

Debonder Effect on Lamination

Adding debonder into the basesheet during the papermaking process is a common way to improve the softness of the finished product. However, having debonder at the air layer of a basesheet can cause difficulties for converting basesheet into multi-ply products at normal commercialization speed (1500-2000 fpm). Robust ply-bonding adhesive of the invention addresses this problem without impairing the softness of finished product. By selecting an appropriate recipe of NFC containing ply-bonding adhesive, the negative impact of debonder is overcome and softer towel with stronger plybond results. In the examples which follow, it is seen the addition of debonder in the air layer showed negative impact on the Peel Test Plybond. Without intending to be bound by any particular theory, it is believed that the debonder creates a slippery surface at the air side and hinders the lamination of the two air sides together. The NFC containing ply-bonding adhesive unexpectedly and effectively improved the Peel Test Plybond of TAD towel which contained debonder on the air side. The improvement was up to 70%. Details are discussed below.

Debonder Examples 1-18

A laboratory study was conducted to evaluate the effect of NFC containing ply-bonding adhesive lamination on debonder treated TAD towel basesheet. A debonder made up of 30 wt % of imidazolinium (Im+) quats in a 1:1 mixture of PEG-400-mono and dioleates was sprayed on the air side of TAD basesheet at 0, 2, and 4 lb/ton individually. Peel Test Plybond was measured for the control basesheet (no debonder) and debonder treated basesheet laminated using regular plybond adhesive glue (4.5% PVOH) and two types of NFC containing ply-bonding adhesives. It was found that the NFC containing ply-bonding adhesives significantly increased peel test plybond up to 70% on TAD basesheet with debonder treatment, as compared to the same or less PVOH glue composition without any NFC.

The NFC containing ply-bonding adhesive was prepared by mixing plybond adhesive H.B. Fuller TT3005 with NFC slurry (at 3% consistency; produced by Paper Logic Company, Turners Falls, Mass.).

Diluted debonder was sprayed on the air side surface of a 2"×12" TAD towel basesheet in a well-controlled manner. To determine the dilution factor, a preliminary spraying test was conducted using water only. The dry weight of 2"×12" TAD towel basesheet was weighed first, and then the water was sprayed on the air side of the basesheet twice, from left to right and from right to left, to make sure the whole area of the air side was covered by water. After that, the total weight of the wet basesheet was weighed. The difference between the dry weight and the wet weight was the amount of water that stayed on the basesheet (Table 11). The water spraying test was repeated 10 times and it was found that the $CV^2$ was fewer than 5% which means the results were consistent, therefore this method can be used to spray debonder by diluting debonder to a certain concentration.

For debonder spraying preparation, the debonders were diluted 807 and 404 times when applying 2 lb/ton and 4 lb/ton on the basesheet, respectively. Due to the slight difference in physical properties between diluted debonder and water, 2 to 3 sprays of diluted debonder was needed on each basesheet. The actual amount of debonder applied was calculated using the retained weight of the diluted debonder on the basesheet and the dilution factor. The average applied debonder was fairly close to 2 lb/ton and 4 lb/ton (see Tables 11 and 12 for calculation).

TABLE 11

Water Spraying Test

| Basesheet (2" × 12") | Dry wt, g | After 2 sprays, g | Water, g |
|---|---|---|---|
| 1 | 0.375 | 0.690 | 0.315 |
| 2 | 0.377 | 0.680 | 0.303 |
| 3 | 0.381 | 0.697 | 0.316 |
| 4 | 0.380 | 0.702 | 0.322 |
| 5 | 0.379 | 0.657 | 0.278 |
| 6 | 0.374 | 0.680 | 0.306 |
| 7 | 0.378 | 0.700 | 0.321 |
| 8 | 0.387 | 0.676 | 0.290 |
| 9 | 0.381 | 0.698 | 0.316 |
| 10 | 0.376 | 0.668 | 0.291 |
| Avg | 0.379 | 0.685 | 0.306 |
| STDEV | 0.004 | 0.015 | 0.015 |
| CV | 1.0% | 2.2% | 4.9% |

Calculation of Debonder's Dilution Factor:

$$2\#/\text{ton debonder} = 2\#/2000\# = 0.1\%$$

$$4\#/\text{ton debonder} = 4\#/2000\# = 0.2\%$$

Dilution factor for 2#/ton debonder:

$$x = 0.3058/(0.3788 * 0.1\%) = 807$$

Dilution factor for 2#/ton debonder:

$$x = 0.3058/(0.3788 * 0.2\%) = 404$$

TABLE 12

Debonder Treated Basesheet for 4.5% PVOH + 5% NFC Lamination
Target: 4#/ton debonder

| Sample (2" × 12") | Dry wt, g | After 2-3 sprays, g | 404 times diluted debonder, g | Actually applied debonder, #/ton |
|---|---|---|---|---|
| 1 | 0.3782 | 0.6692 | 0.291 | 3.8 |
| 2 | 0.3837 | 0.7161 | 0.3324 | 4.3 |
| 3 | 0.3889 | 0.6974 | 0.3085 | 3.9 |
| 4 | 0.3766 | 0.6935 | 0.3169 | 4.2 |
| 5 | 0.3836 | 0.7524 | 0.3688 | 4.8 |
| 6 | 0.3804 | 0.7437 | 0.3633 | 4.7 |
| Avg | | | | 4.3 |
| STDEV | | | | 0.398 |
| CV | | | | 9% |

Figure 22:
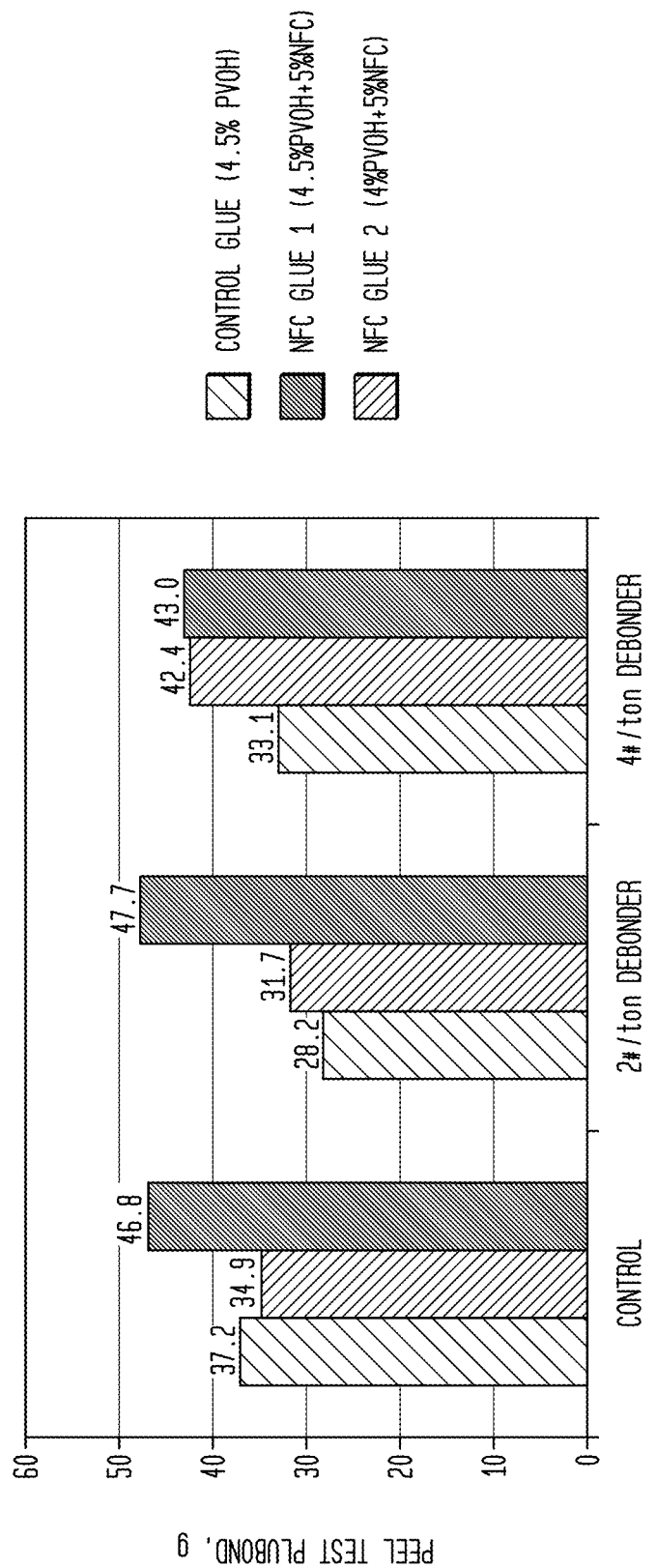
FIG. 22 is a histogram of Peel Test Plybond for various adhesives and basesheets with and without debonder.

The laboratory Peel Test Plybond results confirmed that applying debonder on the air side of TAD towel had negative impact on the plybond, and using NFC glue could effectively improve the plybond of TAD towel basesheet with debonder treated air side. The addition of NFC is based on the dry weight of PVOH. The total solids weight of NFC containing ply-bonding adhesive was: ADH1 (Glue 1, 4.5% PVOH, 5% NFC): 4.5%×(1+5%)=4.7% solids; ADH2 (Glue 2, 4% PVOH, 5% NFC): 4%×(1+5%)=4.2% solids. It is seen in FIG. 22 and Table 13, using 2 lb/ton and 4 lb/ton of debonder decreased the lab peel plybond by 24.2% and 11%, respectively. A higher variation in plybond results was found for 4 lb/ton debonder treated specimen. With 2 and 4 lb/ton of debonder sprayed on the air side of TAD towel basesheet, compared to the control glue in each case, NFC glue 1 significantly improved the plybond by 69% and 30%, respectively and NFC glue 2, with less PVOH solids, also increased the plybond by 12%-28%. Compared to the plybond of untreated basesheet laminated with control glue 4.5% PVOH, using NFC glue 1 which had the same amount of PVOH even increased the plybond of 2 and 4 lb/ton debonder treated basesheet by 28% and 16%.

TABLE 13

Peel Test Plybond

| Specimen | 4.5% PVOH Control Plybond, g | 4.5% PVOH 2#/ton Plybond, g | 4.5% PVOH 4#/ton Plybond, g | ADH1 Control Plybond, g | ADH1 2#/ton Plybond, g | ADH1 4#/ton Plybond, g | ADH2 Control Plybond, g | ADH2 2#/ton Plybond, g | ADH2 4#/ton Plybond, g |
|---|---|---|---|---|---|---|---|---|---|
| 1 | 36.2 | 28.1 | 33.3 | 48.5 | 51.1 | 40.2 | 32.7 | 35.4 | 50.3 |
| 2 | 29.0 | 28.4 | 31.2 | 49.6 | 43.3 | 32.0 | 35.2 | 31.2 | 37.3 |
| 3 | 36.3 | 28.0 | 27.9 | 42.2 | 42.3 | 33.5 | 34.6 | 30.1 | 37.0 |
| 4 | 42.4 | 25.4 | 27.4 | | 56.1 | 47.5 | 32.2 | 34.4 | 37.5 |
| 5 | 39.7 | 24.0 | 32.8 | | 48.7 | 48.2 | 39.6 | 29.5 | 47.0 |
| 6 | 39.4 | 35.5 | 45.8 | | 44.8 | 56.8 | | 29.4 | 45.1 |
| Avg | 37.2 | 28.2 | 33.1 | 46.8 | 47.7 | 43.0 | 34.9 | 31.7 | 42.4 |
| Stdev | 4.6 | 4.0 | 6.7 | 4.0 | 5.3 | 9.5 | 2.9 | 2.6 | 5.8 |
| CV | 12% | 14% | 20% | 8% | 11% | 22% | 8% | 8% | 14% |

Converting

Figure 23:
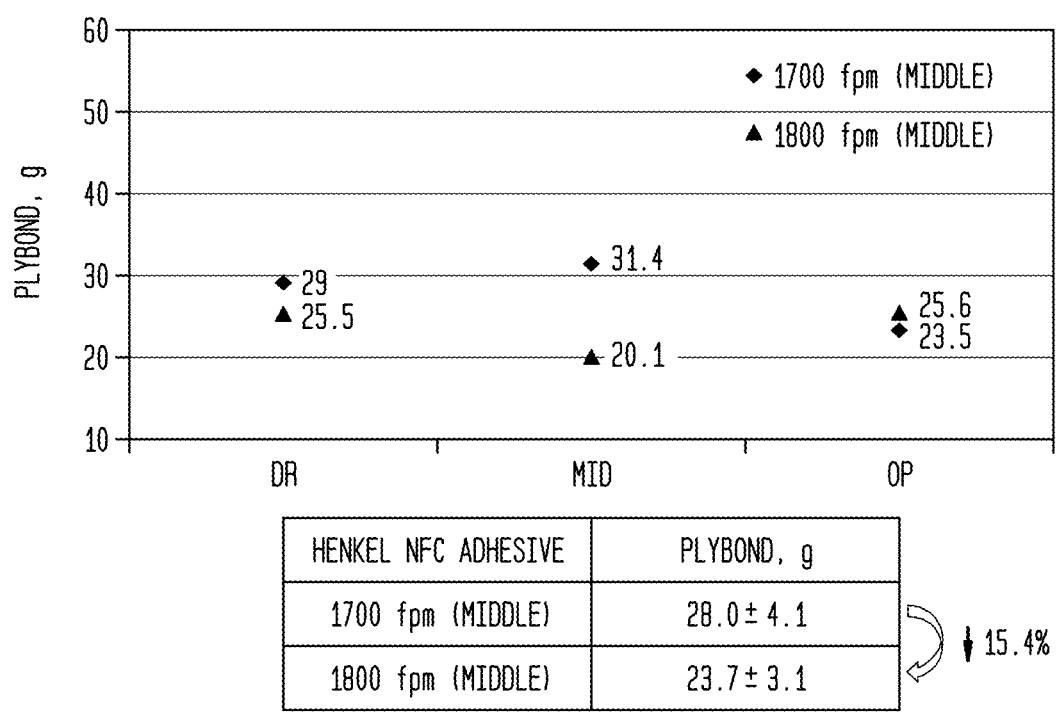
FIG. 23 is a plot showing the effect of converting speed on plybond with NFC containing ply-bonding adhesive.
Figure 24:
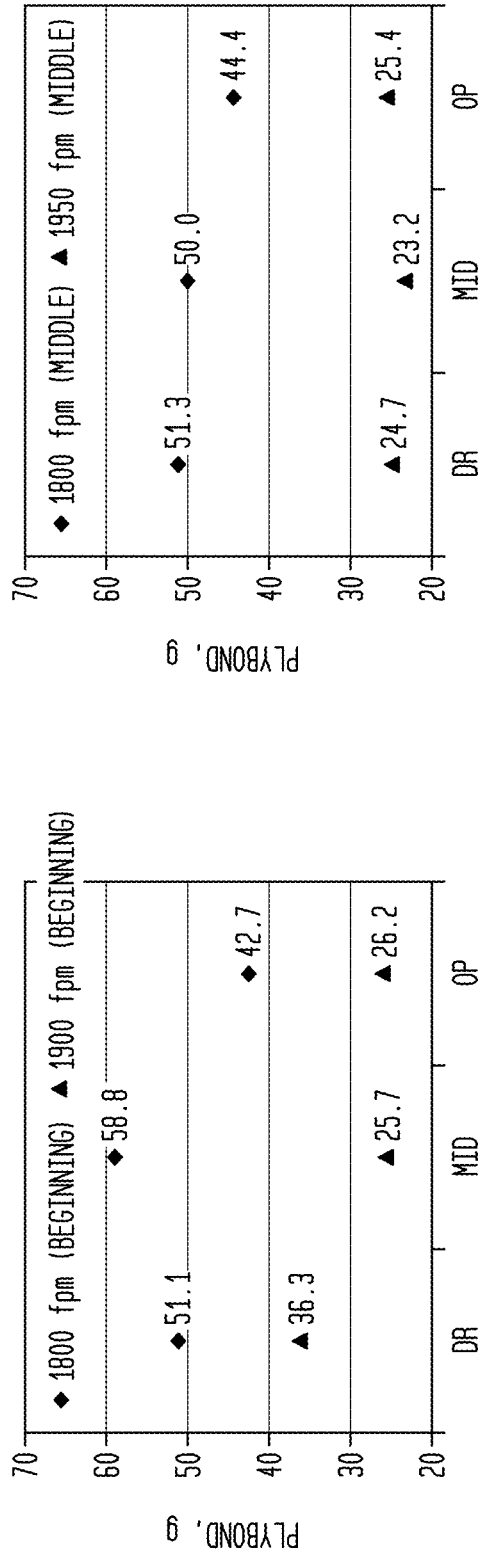
FIG. 24 is a plot showing the effect of converting speed on plybond with regular PVOH glue and NFC containing ply-bonding adhesive.

One of the most challenging obstacles of high speed converting is that the loss of plybond causes ply separation and eventually stops the machine. Higher web tension along with machine vibration can partially tear apart the plybond and the faster the converting runs, the more drastic vibration that the machine will experience. A significant decrease of plybond, over 40%, was seen with conventional glue when the converting speed was increased from 1800 fpm to 1900 fpm and above (FIG. 24). However, having a robust plybond adhesive, such as ply-bonding adhesive containing NFC, satisfies the need of sustaining a reliable plybond at high converting speed (compare FIGS. 23 and 24).

Moreover, adding debonder into the airside of a basesheet for softness benefit will ordinarily decrease the converting speed even more. For example, it has been observed that when using debonder treated TAD basesheet and conventional glue, the converting speed was plybond limited and the speed decreased from 1800 fpm to 1250-1400 fpm. Also in addition, using NFC containing ply-bonding adhesive might produce a softer product without sacrificing converting speed.

Figure 25:
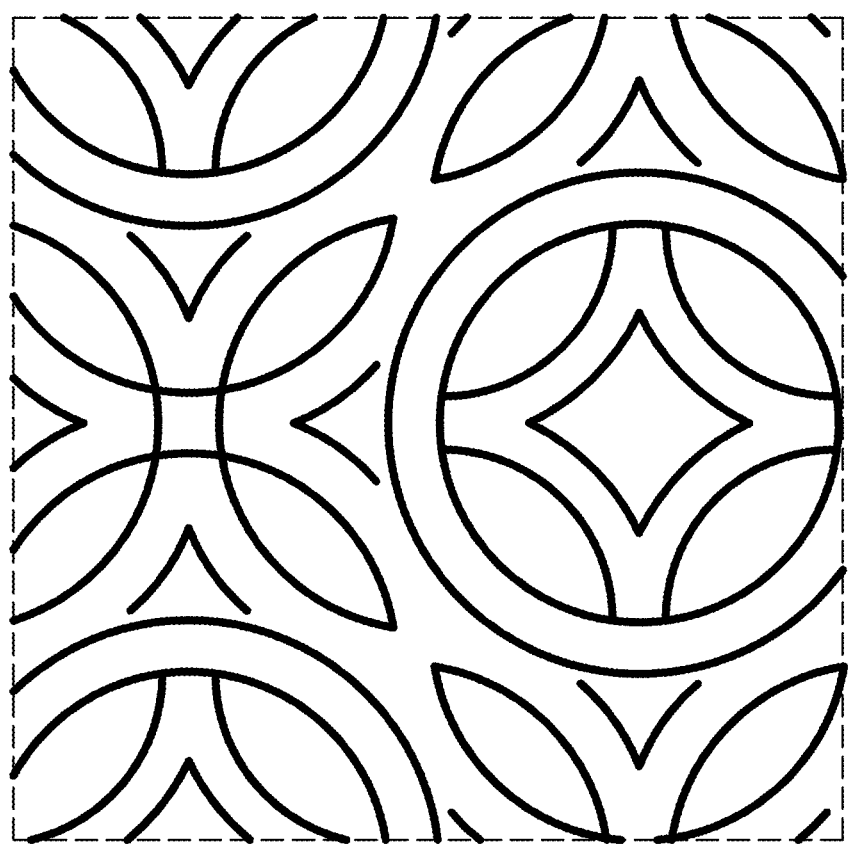
FIG. 25 is a diagram of an arabesque line emboss pattern for TAD towel.

Another factor that affects achievable converting speed is the emboss pattern employed. When an arabesque dots emboss pattern was replaced by a new arabesque line emboss pattern (FIG. 25) for better appearance on TAD basesheet, plybond was significantly reduced. The old arabesque dots emboss pattern was designed for CWP basesheet not for TAD basesheet, and the emboss clarity was not satisfying when used on TAD sheet. The bond areas of arabesque dots emboss and arabesque line emboss are 5.4% and 9.3%, respectively. Although the increase of bond area improves the clarity of emboss, it also requires more conventional glue to laminate the sheets and as a result, the softness of the finished product decreased. Plybond also deteriorates with the increase of converting speed which could be the limiting factor for a higher production speed (above 1800 fpm).

Converting Trials

The NFC containing ply-bonding adhesive was prepared by mixing control PVOH glue available from Henkel and H.B. Fuller with NFC slurry (at 3% consistency; produced by Paper Logic Company, Turners Falls, Mass.). The control glues and NFC containing ply-bonding adhesive included:
1. Henkel AQUENCE LAM 5137: 5.5% solids
2. Henkel bulk tank: 5.5% solids
3. Henkel NFC containing ply-bonding adhesive: 5.25% solids (4.95% PVOH+6% NFC)
4. H.B. Fuller TT3000S: 6.0% solids
5. H.B. Fuller NFC containing ply-bonding adhesive: 5.5% solids (5.2% PVOH+5% NFC)

The control glues and NFC containing ply-bonding adhesives were treated on four (4) different converting lines of the class illustrated and described hereinafter and consistently demonstrated unexpected, superior results in terms of runnability, converting speed and plybond. In particular, it was found that using NFC containing ply-bonding adhesive improves converting productivity by increasing the converting speed without decreasing plybond; NFC containing ply-bonding adhesive has a potential application for improved softness; NFC containing ply-bonding adhesive may improve the plybond on debonder-treated basesheet to maintain the current converting speed while making softer product; and NFC containing ply-bonding adhesive does not have negative impact on softness. Still more specifically, at the same converting speed of 1800 fpm, H.B. Fuller NFC containing ply-bonding adhesive (5.2% PVOH+5% NFC, total solids 5.5%) improved the plybond by nearly 40% compared to H.B. Fuller glue at 6% solids; at the same plybond target, using Henkel bulk tank NFC containing ply-bonding adhesive (4.95% PVOH+6% NFC, 5.25% total solids) instead of Henkel bulk tank glue at 5.5% solids enabled the converting speed increase by 12.5% (from 1600 fpm to 1800 fpm) while maintaining the same plybond; and if switching from Henkel Aquence LAM 5137 glue to H.B. Fuller NFC containing ply-bonding adhesive, the productivity could be improved by 30% with reliable plybond (from 1500 fpm to 1950 fpm with at least 20 g of plybond).

The converting experiments had results consistent with previous lab and pilot trial observations that, at the same converting speed, NFC containing ply-bonding adhesive developed a much stronger bond than regular glue. In addition, the hypothesis that NFC containing ply-bonding adhesive could improve the converting speed was demonstrated by increasing the converting speed from 1600 fpm to 1800 fpm at the same plybond. A best converting speed of 1950 fpm was achieved with over 20 g of plybond.

In the discussion which follows and on the various Figures, DR refers to the drive side of a present roll being converted and OP refers to the portion of the roll most distal to the drive side of the present roll being converted. Since there is also some variation in plybond along the beginning, middle and end of the sheet along the longitudinal direction, these features are also identified as beginning, middle or end, as appropriate.

Figure 26:
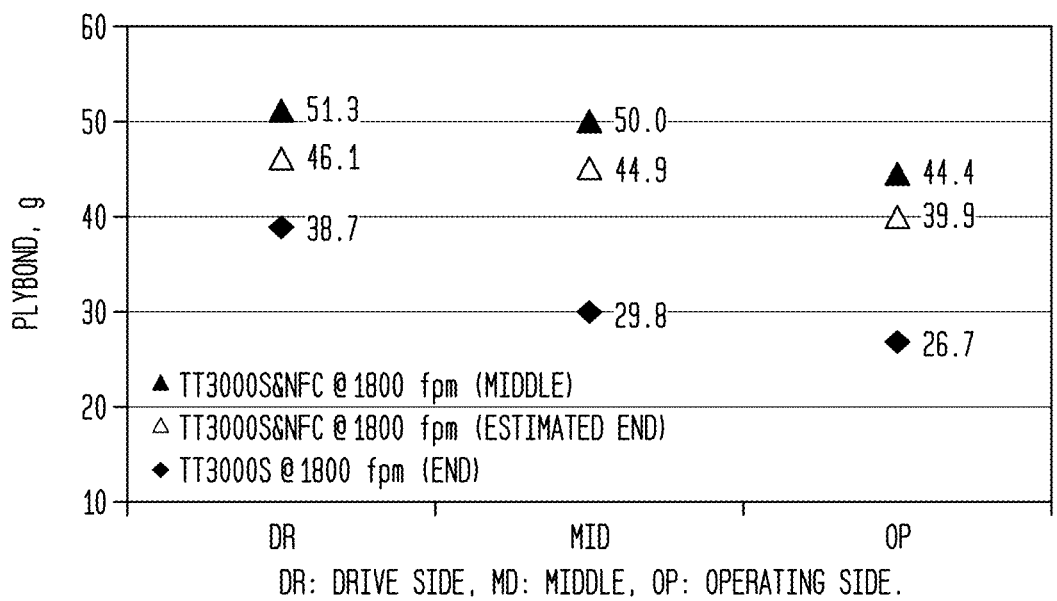
FIG. 26 is a plot comparing plybond of multi-ply sheet made with regular PVOH glue and NFC containing plybonding adhesive.
Figure 27:
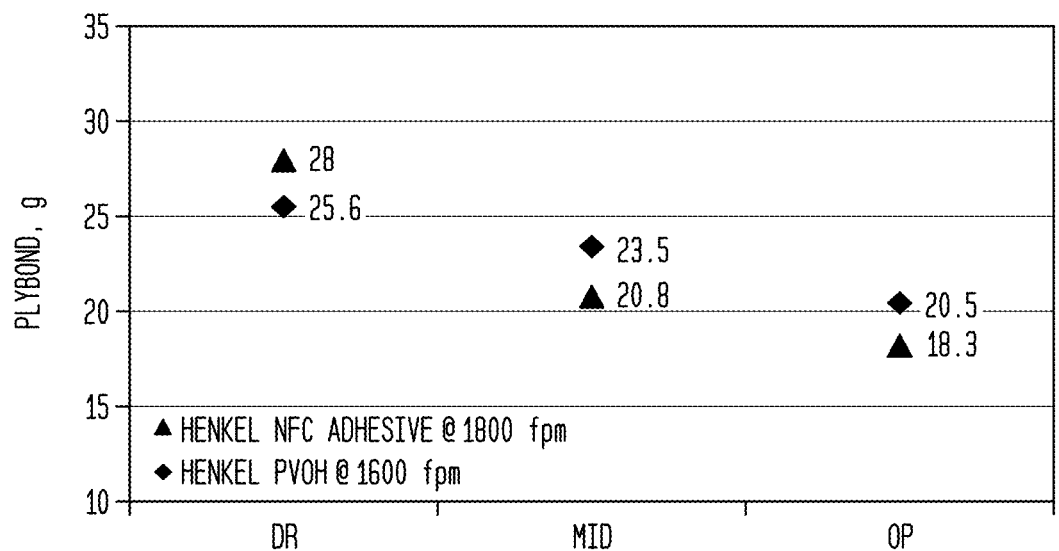
FIG. 27 is a plot comparing plybond and converting speed for regular PVOH glue and NFC containing poly-bonding adhesive.

At 1800 fpm converting speed (FIG. 26), the regular glue H.B. Fuller TT3000S with 6.0% solids allowed the converting line to run smoothly with sufficient plybond from 38.7 g at the DR side, 29.8 g at MID and 26.7 at the OP side when the paper for converting was from the end of a set of parent rolls. The uneven plybond across the log was due to mechanical settings. Using H.B. Fuller NFC containing ply-bonding adhesive at 5.5% total solids (5.2% PVOH+5% NFC) at the same converting speed developed a much stronger plybond which was 46.1 g at the DR side, 44.9 at the MID and 39.9 g at the OP side. This result was consistent with the lab and pilot observation noted above. It is seen that the plybond decreases with the increase of converting speed. The NFC containing ply-bonding adhesive improves the plybond at the same converting speed, allows the converting run at a higher speed at the same plybond. FIG. 27 demonstrates this result. Note, also, the results seen in Tables 14, 15 and 16, below.

TABLE 14

| Plybond Results | |
| --- | --- |
| Plybond Glue | Plybond, g |
| H. B. Fuller NFC containing ply-bonding adhesive @ 1800 fpm (Est. end) | 43.6 ± 3.3 |
| H. B. Fuller TT3000S @ 1800 fpm (End) | 31.7 ± 6.3 |

Henkel PVOH glue has 5.5% solids. Henkel NFC containing ply-bonding adhesive was prepared with Henkel bulk tank glue, and it had 5.25% total solids (4.95% PVOH+6% NFC). As shown in FIG. 27, by using Henkel NFC containing ply-bonding adhesive, the converting speed was increased to 1800 fpm while the plybond was about the same compared to using Henkel bulk tank glue at 1600 fpm. This 12.5% increase of production rate has tremendous commercial value to a converter.

TABLE 15

Plybond Results

| Plybond Glue | Plybond, g |
|---|---|
| Henkel NFC containing ply-bonding adhesive @ 1800 fpm (End) | 23.2 ± 2.5 |
| Henkel PVOH @ 1600 fpm (End) | 22.3 ± 5.1 |

Figure 28:
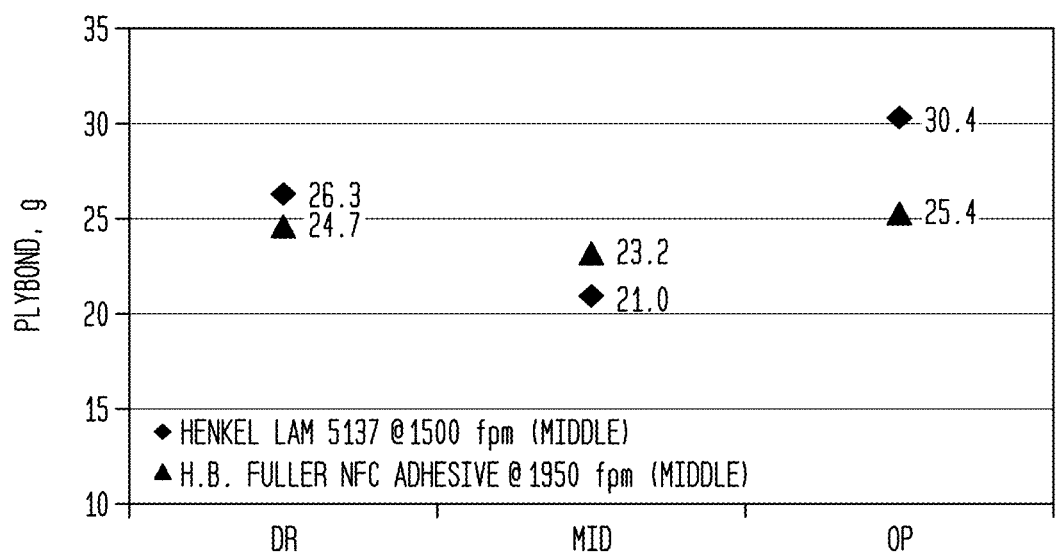
FIG. 28 is a plot comparing plybond and converting speed of regular PVOH glue and NFC containing poly-bonding adhesive.

An even more attractive case is to use H.B. Fuller NFC containing ply-bonding adhesive instead of the current Henkel Aquence LAM 5137. As shown in FIG. 28, H.B. Fuller NFC containing ply-bonding adhesive at 5.5% solids (5.2% PVOH+5% NFC) allowed the converting line to run at 1950 fpm with plybond of 24.7 g at DR side, 23.2 g at MID and 25.4 g at OP side. The plybond across the log was relatively even and the average plybond of 24.4 g was very close to the average plybond developed by Henkel bulk tank glue at 1500 fpm. This was a 30% productivity improvement.

TABLE 16

Plybond Results

| Plybond Glue | Plybond, g |
|---|---|
| Henkel LAM 5137 @ 1500 fpm (Middle) | 25.9 ± 4.7 |
| H.B. Fuller NFC containing ply-bonding adhesive @ 1950 fpm (Middle) | 24.4 ± 1.1 |

Representative preferred compositions thus may have one or more features enumerated in Tables 17 through 24 below and may consist essentially of the listed components optionally with ranges adopted from another table in the series as discussed herein or by omitting a particular feature such as wt % of one component or weight ratios of two components. The various ranges in Tables 17 through 23 and 25 through 29 may be combined or interchanged between compositions as to various ingredients, that is, a general content range as to wt % PVOH content in one table may be matched with a select content range of NFC wt % content in the same or another table in a particular embodiment of the invention, in which case the weight ratios listed in the following tables may be inapplicable to the particular embodiment contemplated as discussed in connection with Tables 1A through 1C and Table 2, above.

TABLE 17

Additional PVOH based/NFC Ply-Bonding Adhesive Content Ranges

| Component | Typical | Select |
|---|---|---|
| PVOH (wt %) | 2.5%-6% | 3%-5% |
| NFC (wt %) | 0.1%-0.6% | 0.125%-0.5% |
| Weight Ratio NFC/PVOH | 0.017-0.24 | 0.025-0.17 |
| NFC (% based on PVOH) | 1%-20% | 4%-11% |
| Water (wt %) | >90% | >90% |
| Other Additives | Balance | Balance |

Preferred PVOH based/NFC adhesives include those wherein the adhesive exhibits an Adhesive Viscosity reduction of at least 15% as shear rate is increased from 1 sec$^{-1}$ to 100 sec$^{-1}$; more preferably wherein the adhesive exhibits an Adhesive Viscosity reduction of at least 25% as shear rate is increased from 1 sec 100 sec$^{-1}$; and still more preferably wherein the adhesive exhibits an Adhesive Viscosity reduction of at least 50% as shear rate is increased from 1 sec$^{-1}$ to 100 sec$^{-1}$.

TABLE 18

Additional NFC and PVOH Ply-Bonding Adhesive Composition Content Ranges

| Component | Typical | Select |
|---|---|---|
| PVOH (wt %) | 1%-3% | 1.75%-2.5% |
| NFC (wt %) | 0.25%-1% | 0.4%-0.75% |
| Viscosity modifier (wt %) | 0-0.2% | 0.05%-0.15% |
| NFC (% based on PVOH) | 10%-100% | 15%-45% |
| Weight Ratio NFC/PVOH | 0.08-1 | 0.15-0.4 |
| Weight Ratio NFC/Viscosity modifier | 0-15 | 4-8 |
| Water (wt %) | >95% | >95% |
| Other Additives | Balance | Balance |

TABLE 19

Additional NFC/Viscosity Modifier Ply-Bonding Bonding Composition Content Ranges

| Component | Typical | Typical | Select |
|---|---|---|---|
| NFC (wt %) | 0.15%-3% | 0.175%-2% | 0.2%-1.25% |
| Viscosity modifier (wt %) | 0.02%-0.2% | 0.05%-0.15% | 0.07%-0.13% |
| Weight Ratio NFC:Viscosity Modifier | 2.5-10 | 3-9 | 4-8 |
| Water (wt %) | >95% | >95% | >95% |
| Other Additives | Balance | Balance | Balance |

The NFC/Viscosity Modifier Bonding Compositions of Table 19 include those wherein the ply-bonding agent composition contains a surface tension modifier. In some embodiments, the ply-bonding adhesive or composition has a surface tension of less than 60 mN/m; preferably less than 55 mN/m.

TABLE 20

Representative PVOH, Viscosity Modifier Based NFC Ply-Bonding Adhesive Compositions

| Component | General | Typical |
|---|---|---|
| PVOH (wt %) | 1-5 | 2-4 |
| Viscosity Modifier (wt %) | 0.25-3 | 0.4-2 |
| NFC (wt %) | 0.25-1 | 0.4-0.7 |
| PVOH:NFC Weight Ratio | 1-25 | 1-10 |
| Water (wt %) | 90-99 | 95-98 |
| Other additives | balance | balance |

TABLE 21

Representative Viscosity Modifier Based Ply-Bonding Adhesive Compositions

| Component | General | Typical |
|---|---|---|
| Viscosity Modifier (wt %) | 0.05-2 | 0.075-1.5 |
| NFC (wt %) | 0.05-0.75 | 0.075-0.65 |
| NFC:Viscosity Modifier Weight Ratio (%) | 2.5%-1000% | 7%-500% |
| Water (wt %) | 95-99 | 97-98.5 |
| Other additives | balance | balance |

TABLE 22

Representative PVOH/NFC/Viscosity Modifier Ply-Bonding Adhesive Compositions with NFC:Viscosity Modifier Ratios of <100%

| Component | General | Typical |
|---|---|---|
| Viscosity Modifier (wt %) | 0.3-2 | 0.5-1.5 |
| NFC (wt %) | 0.025-0.2 | 0.035-0.15 |
| Weight Ratio, NFC:Viscosity Modifier Ratio (%) | 2.5%-75% | 3%-15% |
| PVOH | 0.5-5 | 1-3.5 |
| Water (wt %) | >90 | >95 |
| Other additives | balance | balance |

TABLE 23

Representative NFC Viscosity Modifier Ply-Bonding Adhesive Compositions with NFC:Viscosity Modifier Ratios of <100%

| Component | General | Typical |
|---|---|---|
| Viscosity Modifier (wt %) | 0.3-3 | 0.5-1.5 |
| NFC (wt %) | 0.05-0.2 | 0.75-0.15 |
| Weight Ratio, NFC:Viscosity Modifier Ratio (%) | 2.5%-75% | 3%-15% |
| Water (wt %) | >90 | >95 |
| Other additives | balance | balance |

In Tables 20 through 23, as well as throughout this disclosure, "viscosity modifier" refers to xanthan gum, carboxymethylcellulose, pectin and the like as hereinafter described. Percentages in the above Tables are based on the weight of the recited component based on the weight of the aqueous composition, except that in Tables 21, 22 and 23 and sometimes hereinafter the NFC: modifier ratio in percent is the weight ratio of the two components times 100%, which may be referred to as the percent weight ratio. The chemistries in Tables 21 through 24 include relatively low ratios of NFC to viscosity modifier which can be viewed in these types of compositions, i.e. where the amount of viscosity modifier is greater than the amount of NFC, as a glue resin modified with NFC as a strength agent.

TABLE 24

Additional Exemplary NFC Containing Ply-Bonding Adhesive Compositions

| Material | Components |
|---|---|
| PVOH Based | 5.5% PVOH + 0.048% NFC (Total solids 5.548%) |
| Viscosity Modifier/ NFC Based | 0.1% NFC + 1.35% XG (total solids 1.45%) |
| PVOH/Viscosity Modifier/ NFC Based | 2.9% PVOH + 0.675% XG + 0.05% NFC (total solids 3.625%) |

Cellulose/Polyol Adhesives

In addition to the ply-bonding adhesives described above, NFC containing adhesives based on NFC/Water Soluble Cellulose/Water Soluble Polyols and additional NFC containing adhesives may be used in the converting processes described herein and illustrated in the Figures. In general, these are aqueous, NFC containing adhesive comprising: (a) water; (b) nanofibrillated cellulose; and (c) one or more of: (i) a water-soluble cellulose derivative; or (ii) a water soluble polyol; and (iii) a viscosity modifier other than a water soluble cellulose derivative. Adhesives having the features enumerated in Tables 25-29 and described below may be used for ply-bonding CWP, TAD and structured sheet products. The adhesives are typically formulated by diluting conventional adhesives and adding NFC and another modifier or combining NFC with viscosity modifiers as described herein. "PolymerGC Glue" in Tables 25, 26 and 28 refers to glue material made up primarily of glycols such as PEG and water soluble cellulose derivatives as is described generally in U.S. Pat. No. 6,342,297 to LaBrash. For the glue components (other than water), weight percent refers to weight percent solids. The Glycol:Cellulose derivative weight ratios appear in the tables describing the PolymerGC Glue compositions. The PolymerGC Glue components are blended with NFC to make the adhesive. The adhesives may consist essentially of the listed components.

TABLE 25

Representative PolymerGC Glue based NFC Containing Adhesives

| Component | General | Typical |
|---|---|---|
| PolymerGC Glue (wt %) | 1.5-7 | 2-6 |
| NFC (wt %) | 0.025-0.5 | 0.035-0.35 |
| PolymerGC Glue:NFC Weight Ratio | 5-125 | 10-120 |
| Glycol:CellD Weight Ratio | 2-10 | 3-7 |
| Water (wt %) | 90-99 | 94-98 |
| Other additives | balance | balance |

TABLE 26

Representative PolymerGC Glue, Viscosity Modifier Based NFC Containing Adhesives

| Component | General | Typical |
|---|---|---|
| PolymerGC Glue (wt %) | 1-5 | 2-4 |
| Viscosity Modifier (wt %) | 0.25-3 | 0.4-2 |
| NFC (wt %) | 0.25-1 | 0.4-0.7 |
| PolymerGC Glue:NFC Weight Ratio | 1-25 | 1-10 |
| Glycol:CellD Weight Ratio | 2-10 | 3-7 |
| Water (wt %) | 90-99 | 95-98 |
| Other additives | balance | balance |

TABLE 27

Representative Viscosity Modifier Based NFC Containing Adhesives

| Component | General | Typical |
|---|---|---|
| Viscosity Modifier (wt %) | 0.05-2 | 0.075-1.5 |
| NFC (wt %) | 0.05-0.75 | 0.075-0.65 |
| NFC:Viscosity Modifier Weight Ratio (%) | 2.5%-1000% | 7%-500% |
| Water (wt %) | 95-99 | 97-98.5 |
| Other additives | balance | balance |

TABLE 28

Representative PolymerGC Glue/NFC/Viscosity Modifier Compositions with NFC:Viscosity Modifier Ratios of <100%

| Component | General | Typical |
|---|---|---|
| Viscosity Modifier (wt %) | 0.3-2 | 0.5-1.5 |
| NFC (wt %) | 0.025-0.2 | 0.035-0.15 |

TABLE 28-continued

Representative PolymerGC Glue/NFC/Viscosity Modifier Compositions with NFC:Viscosity Modifier Ratios of <100%

| Component | General | Typical |
|---|---|---|
| Weight Ratio, NFC:Viscosity Modifier Ratio (%) | 2.5%-75% | 3%-15% |
| PolymerGC Glue (wt %) | 0.5-5 | 1-3.5 |
| Glycol:CellD Weight Ratio | 2-10 | 3-7 |
| Water (wt %) | >90 | >95 |
| Other additives | balance | balance |

TABLE 29

Representative NFC Viscosity Modifier Compositions with NFC:Viscosity Modifier Ratios of <100%

| Component | General | Typical |
|---|---|---|
| Viscosity Modifier (wt %) | 0.3-3 | 0.5-1.5 |
| NFC (wt %) | 0.05-0.2 | 0.75-0.15 |
| Weight Ratio, NFC:Viscosity Modifier Ratio (%) | 2.5%-75% | 3%-15% |
| Water (wt %) | >90 | >95 |
| Other additives | balance | balance |

In Tables 26 through 29, as well as throughout this disclosure, "viscosity modifier" refers to xanthan gum, carboxymethylcellulose, pectin and the like as herein described. Percentages in the above Tables 25-29 are based on the weight of the recited component and based on the weight of the aqueous composition, except that in Tables 27, 28 and 29 the NFC: modifier ratio in percent is the weight ratio of the two components times 100%.

In Tables 25, 26 and 28, "CellD" (and throughout) refers to water soluble cellulose derivatives which include cellulose ethers, hydroxyethyl cellulose, hydroxyethyl cellulose (hydrophobically modified), hydroxypropyl cellulose, hydroxy propyl methyl cellulose, hydroxy propyl ethyl cellulose, hydroxymethyl cellulose, methyl cellulose, ethyl cellulose, methyl ethyl cellulose, ethylhydroxyethyl cellulose, cyanoethylcellulose, cellulose gum, carboxymethylcellulose, carboxymethyl hydroxyethyl cellulose, calcium carboxymethylcellulose, sodium carboxymethylcellulose, and the like. Commercially available cellulose derivatives include Klucel® from Aqualon which is hydroxypropylcellulose; Methocel® from Dow Chemical Co. which is hydroxypropyl methyl cellulose; and Cellosize® QP 100MH from Union Carbide which is hydroxyethylcellulose that has been surface treated to be water dispersible or quick processed having a viscosity of about 100,000 cps with 2% solids. J-75MS® from Dow Chemical is hydroxypropylmethyl cellulose which has been surface treated and has a 2% solution viscosity of 75,000 cps. CMC 7H® from Aqualon is sodium carboxymethylcellulose having a high viscosity range. A preferred water soluble cellulose derivative is hydroxy propyl cellulose, preferably hydroxy propyl methyl cellulose. The water soluble cellulose derivative is present in the composition in an amount of at least about 0.5 to about 2% by weight, preferably about 0.8 to about 1.0% by weight.

"Water soluble polyols" to make the composition of the present invention include water soluble monomeric polyol, water soluble polymeric polyol, especially including PEG, functionalized polymeric polyol and combinations thereof.

The water soluble monomeric polyol includes any polyol such as diol, triol, tetraol and combinations thereof, having a molecular weight of less than 400. Examples of water soluble monomeric polyol are glycerin, propylene glycol, diethylene glycol, dipropylene glycol, triethylene glycol and tetramethylene glycol. Commercially available glycols include water soluble 75-H series, UCON lubricants from Union Carbide.

The water soluble polymeric polyol includes polyols having molecular weights from about 400 to about 12,000, preferably about 400 to about 10,000 or optionally up to 8,000. The water soluble polymeric polyol includes water soluble polymeric polyol such as polyethylene glycol, polypropylene glycol and mixtures thereof. Commercially available glycols include polyethylene glycols such as polyethylene glycol 8000® from Dow Chemical Co. and Carbowax® from Union Carbide, polyethylene wax emulsions and paraffin wax emulsions.

The functionalized polymeric polyol includes polyester polyol, polyether polyol, polyesterether polyol, polyhydroxy compounds and combinations thereof. The functionalized polymeric polyol may be present in an amount of about 0.2% to about 5% by weight, preferably about 0.5% to 2% by weight, most preferably about 0.3% to about 1% by weight.

The functionalized polyols can be either low or high molecular weight materials and in general will have average hydroxyl values as determined by ASTM E 222-67, Method B, between about 1000 and 10 and preferably between about 500 and 50.

The functionalized polyol component may comprise an acid grafted polyether polyol such as polypropylene oxide grafted with for example, maleic or fumaric acid as taught in Frentzel, U.S. Pat. No. 4,460,738 or Knopf U.S. Pat. No. 4,528,334 and are incorporated herein by reference. Other polyester polyols produced from mixtures of di- and tri- or higher functional acid and polyol components in ratios which provide residual acid functionality as well as plural hydroxy groups may be employed.

Polyester polyol can be prepared by polyesterification of organic polycarboxylic acid or anhydride thereof with organic polyols. Usually, the polycarboxylic acid and polyol are aliphatic or aromatic dibasic acids and diols. Any ester of the monomeric polyol and polymeric polyol can be used. Examples of these are fatty esters of polyethylene glycols having a molecular weight of about 400 to about 12,000, preferably about 800 to about 8,000. Suitable polyester polyols are sold by Ruco Corp. Other polyester polyol includes Myrj® 45 from ICI which is a polyoxyl 8 stearate.

Alternatively, the polyol component may comprise a mixture of a polyol free of acid functionality and an acid functional compound having hydroxy, amine or thiol functionality. Suitable acid functional compounds include hydroxy and mercaptocarboxylic acids, aminocarboxylic acids, aminohydroxycarboxylic acids, hydroxysulfonic acids, aminosulfonic acids and aminohydroxysulfonic acids. Representative non-limiting examples of such acids include dimethylolpropionic acid, glycolic acid, thioglycolic acid, lactic acid, maleic acid, dihydroxymaleic acid, tartaric acid, dihydroxytartaric acid, 2,6-dihydroxybenzoic acid, oxaluric acid, anilidoacetic acid, glycine, α-alanine, 6 aminocaproic acid, the reaction products of ethanolamine and acrylic acid, hydroxyethylpropionic acid, 2 hydroxyethanesulfonic acid and sulphanilic acid.

The most suitable functionalized polymeric polyols include polyalkylene ether polyol including thioethers, polyester polyols including polyhydroxypolyesteramides, and hydroxy containing polycaprolactones. Any suitable polyalkylene ether polyol may be used. Included are polyoxytetramethylene glycol, polyoxyethyleneglycol, polypropylene glycol and the reaction products of ethylene glycol with a mixture of propylene oxide and ethylene oxide. Commercially available water soluble polyethylene oxide includes Polyox® from Union Carbide.

Also useful are polyether polyols formed from the oxyalkylation of various polyols. For example, glycols such as ethylene glycol, 1,6 hexanediols, Bisphenol A and the like, higher polyols such as trimethylolpropane, trimethylethane, pentaerythritol and the like. Polyols of higher functionality which can be utilized as indicated can be made for instance by oxyalkylation of compounds such as sorbitol or sucrose. One commonly utilized oxyalkylation method is by reacting a polyol with an alkylene oxide, for example, ethylene or propylene oxide in the presence of an acidic or a basic catalyst.

The polyhydroxy compounds can have a molecular weight of at least about 400 to about 3,000, preferably about 1,000 to about 2,000. Examples of polyhydroxy compounds include sorbitol, mannitol, corn syrup, dextrin, fructose, sucrose and combinations thereof. The polyhydroxy compound is present in an amount of about 0.5% to about 5% by weight, more preferably about 0.5 to about 3% by weight.

In practice, the adhesive contents designated PolymerGC Glue in Tables 25, 26, 28 are actually diluted commercial adhesives based mostly on PEG and water soluble cellulose derivatives as noted above. Weight percents refer to the percentage of solids which approximates glycol and cellulose levels. In particular, the weight percent PolymerGC Glue is based on diluted solids content in commercial adhesive compositions, such as Fuller WB4955MX2 and WB4959 which are predominantly PEG and cellulose based compositions. The solids content of these compositions in the adhesives is thus referred to as PolymerGC Glue.

Summary of Preferred Embodiments

There is thus provided in accordance with the present invention a ply-bonding agent or adhesive composition characterized by a viscosity and a surface tension for the manufacture of multi-ply paper tissue and multi-ply paper towel comprising: (a) water; (b) nanofibrillated cellulose; and (c) one or more modifiers effective to modify either or both of (i) the viscosity of the composition or (ii) the surface tension of the composition.

The NFC containing ply-bonding agent or adhesive composition of the invention preferably comprises water, nanofibrillated cellulose and one or more additional components selected from the group consisting of components (i), (ii), (iii) and (iv), wherein: (i) is PVOH; (ii) is PVOH and a viscosity modifier; (iii) is a viscosity modifier; and (iv) is a viscosity modifier and a surface tension modifier other than PVOH.

In the foregoing embodiments and in any of the embodiments described herein, the ply-bonding agent or adhesive composition may be characterized wherein the composition includes a viscosity modifier; wherein the viscosity modifier comprises a polysaccharide; wherein the viscosity modifier comprises xanthan gum; wherein the viscosity modifier comprises carboxymethylcellulose; or wherein the viscosity modifier is selected from pectin, collagen, furcellaran, gelatin, methylcellulose, ethylcellulose, hydroxyethylcellulose, carboxy ethylcellulose, natural rosins, corn starch, potato starch, arrowroot, ethoxylated linear alcohols, polyethylene glycols, polypropylene glycols, agar, alginic acid, and sodium alginate, carrageenan, gum arabic from the sap of Acacia trees, gum ghatti from the sap of *Anogeissus* trees, gum tragacanth from the sap of *astragalus* shrubs, karaya gum from the sap of *sterculia* trees, guar gum from guar beans, locust bean gum from the seeds of the carob tree, beta-glucan from oat or barley bran, chicle gum, dammar gum from the sap of dipterocarpaceae trees, glucomannan from the konjac plant, mastic gum obtained from the mastic tree, *psyllium* seed husks from the *plantago* plant, spruce gum, tara gum from the seeds of the tara tree, gellan gum and combinations thereof.

In the foregoing embodiments and in any of the embodiments described herein, the ply-bonding agent or adhesive composition may be characterized wherein the weight ratio of nanofibrillated cellulose:viscosity modifier in the ply-bonding agent is from 1:0.05 to 1:0.5; or wherein the weight ratio of nanofibrillated cellulose:viscosity modifier in the ply-bonding agent is from 1:0.75 to 1:0.35; or wherein the weight ratio of nanofibrillated cellulose:viscosity modifier in the ply-bonding agent is from 1:0.1 to 1:0.3; or wherein the weight ratio of nanofibrillated cellulose:viscosity modifier in the ply-bonding agent is from 1:0.13 to 1:0.2.

In any embodiment described herein, the ply-bonding agent or adhesive composition may contain a surface tension modifier and/or the amount of water in the aqueous composition is >90 wt. % based on the weight of the composition.

In many cases the surface tension modifier comprises a PVOH, such as wherein PVOH is present in an amount of from 0.5 percent by weight to 3 percent by weight based on the weight of the aqueous composition; or wherein the weight ratio of nanofibrillated cellulose:PVOH is greater than 0.2; or wherein the weight ratio of nanofibrillated cellulose:PVOH is greater than 0.3 or wherein the weight ratio of nanofibrillated cellulose:PVOH is greater than 0.4, greater than 0.5, greater than 0.6 or in general wherein the weight ratio of nanofibrillated cellulose:PVOH is greater than 0.2 and up to 2.

Alternatively, the surface tension modifier may be a surface tension modifier other than PVOH. The surface tension modifier may be selected from surfactants and water soluble polymers. Specifically, in some preferred embodiments the surface tension modifier comprises a nonionic surfactant.

In any of the embodiments described herein the ply-bonding agent or adhesive composition may be characterized wherein nanofibrillated cellulose is present in an amount of greater than 0.4 percent by weight based on the weight of the aqueous composition or wherein nanofibrillated cellulose is present in an amount of greater than 0.4 percent by weight based on the weight of the aqueous composition and up to 1.5 percent by weight based on the weight of the aqueous composition.

Likewise, in any of the embodiments described herein the ply-bonding agent or adhesive composition may be characterized wherein the composition contains from 0.25 percent by weight to 3 percent by weight of nanofibrillated cellulose based on the weight of the aqueous composition, such as wherein the composition contains from 0.25 percent by weight to 2.5 percent by weight of nanofibrillated cellulose based on the weight of the aqueous composition; or wherein the composition contains from 0.35 percent by weight to 1.5 percent by weight of nanofibrillated cellulose based on the weight of the aqueous composition; or wherein the ply-bonding agent contains from 0.35 percent by weight to 1 percent by weight of nanofibrillated cellulose based on the weight of the aqueous composition; or wherein the ply-bonding agent contains from 0.35 percent by weight to 0.75 percent by weight of nanofibrillated cellulose based on the weight of the aqueous composition.

In any embodiment described herein (unless otherwise specified), the ply-bonding agent or adhesive composition may be characterized wherein the composition contains from 0.4 percent by weight to 0.6 percent by weight of nanofibrillated cellulose based on the weight of the aqueous composition.

In any embodiment described herein, the ply-bonding agent or adhesive composition may be characterized wherein the composition has a surface tension of less than 60 mN/m; or wherein the composition has a surface tension of less than 55 mN/m.

In any embodiment described herein, the nanofibrillated cellulose may have a Characteristic Breaking Length of at least 3 km, such as a Characteristic Breaking Length of from 3 km to 10 km or from 4.5 km to 9 km; or from 6.5 km to 7.5 km. So, also, the nanofibrillated cellulose may have a Characteristic Nanofiber Viscosity of greater than 15,000 cP at a shear rate of 5 $\sec^{-1}$ and a Characteristic Nanofiber Viscosity of less than 2,000 cP at a shear rate of 500 $\sec^{-1}$; and/or the nanofibrillated cellulose may exhibit a Characteristic Nanofiber Viscosity reduction of at least 60% as the shear rate is increased from 5 $\sec^{-1}$ to 500 $\sec^{-1}$; and/or the nanofibrillated cellulose exhibits a Characteristic Nanofiber Viscosity reduction of at least 70%, 80% or 90% as the shear rate is increased from 5 $\sec^{-1}$ to 500 $\sec^{-1}$.

In any embodiment described herein, the ply-bonding agent or adhesive composition may contain an anti-microbial additive. The anti-microbial additive may comprise potassium sorbate; sorbic acid; sodium sorbate; calcium sorbate; benzoic acid; calcium benzoate; potassium benzoate; sodium benzoate; calcium hydrogen sulphite; calcium sulphite; potassium bisulphite; potassium metabisulphite; potassium sulphite; sodium bisulphite; sodium metabisulphite; sodium sulphite; sulphur dioxide; potassium nitrate; potassium nitrite; sodium nitrate; sodium nitrite; calcium propionate; potassium propionate; propionic acid; sodium propionate; and mixtures thereof. Especially preferred is potassium sorbate.

In any embodiment described herein, the ply-bonding agent or adhesive may further contain a tackifier; a cross-linker; an insolubilizer; a filler; a second viscosity modifier; a water-resistance additive; a flame retardant; a lubricant; a softening agent; a pigment; a dye; an antioxidant; a UV-stabilizer; a resin; a rosin; a wax; a flowing agent; a compatibilizer; an aroma; or combinations thereof.

In another aspect of the invention, there is provided a method of making absorbent sheet comprising: (a) feeding a first absorbent cellulosic to an embossing nip; (b) embossing a pattern of raised embossments in said first basesheet; (c) applying an aqueous ply-bonding agent according to any of the embodiments described herein to the raised embossments of said first sheet; and (d) plying a second absorbent cellulosic sheet with said first sheet by pressing said second cellulosic sheet to the ply-bonding agent disposed on the raised embossments of said first cellulosic sheet. The ply-bonding agent may be applied between the plies in a discontinuous pattern, optionally wherein the discontinuous pattern corresponds to a pattern of raised embossments on one of the absorbent plies of cellulosic sheet. The method may further comprise plying a third cellulosic basesheet with said first and second cellulosic basesheets without additional adhesive.

Another aspect of the invention is directed to a multi-ply absorbent sheet comprising: (a) a first absorbent ply of cellulosic sheet; (b) a second absorbent ply of cellulosic sheet; and (c) a ply-bonding agent interposed between said first absorbent ply and said second absorbent ply, said ply-bonding agent adhering said absorbent plies together, wherein said ply-bonding agent comprises nanofibrillated cellulose and a viscosity modifier. The multi-ply absorbent sheet is a multi-ply tissue sheet composed predominantly of hardwood papermaking fiber, or the multi-ply absorbent sheet is a multi-ply towel sheet composed predominantly of softwood fiber. The multi-ply absorbent sheet may have a basis weight of from 20 to 40 lbs/3000 ft$^2$ ream. Optionally, the multi-ply absorbent sheet comprises a third absorbent ply of cellulosic sheet plied together with the first and second ply.

In still yet another aspect of the invention, there is provided a method of making multi-ply absorbent sheet comprising: (a) providing a first absorbent cellulosic basesheet; (b) providing a second absorbent cellulosic basesheet, wherein at least one of said first absorbent cellulosic basesheet or said second absorbent cellulosic basesheet is treated with a debonder composition; (c) interposing an NFC containing ply-bonding adhesive between said first absorbent cellulosic basesheet and said second absorbent cellulosic basesheet, wherein the NFC containing ply-bonding adhesive comprises nanofibrillated cellulose and one or more additional components selected from the group consisting of components (i), (ii), (iii) and (iv), wherein: (i) is PVOH; (ii) is PVOH and a viscosity modifier; (iii) is a viscosity modifier and (iv) is a viscosity modifier and a surface tension modifier other than PVOH; and (d) plying said first absorbent cellulosic basesheet with said second absorbent cellulosic basesheet by pressing them together with the NFC containing ply-bonding adhesive interposed therebetween. The method may comprise (a) feeding said first absorbent cellulosic basesheet to an embossing nip; (b) embossing a pattern of raised embossments in said first absorbent cellulosic basesheet; (c) applying the NFC containing ply-bonding adhesive to the raised embossments of said first absorbent cellulosic basesheet; and (d) plying said second absorbent cellulosic basesheet with said first absorbent cellulosic basesheet by pressing said second absorbent cellulosic basesheet to the adhesive disposed on the raised embossments of said first absorbent cellulosic basesheet.

In any method of making a multi-ply absorbent sheet in accordance with the invention the NFC ply-bonding agent or adhesive may have the attributes described in any embodiment directed to the ply-bonding agent or adhesive composition herein. So, also, in any method of making multi-ply absorbent sheet in accordance with the invention, the process may be characterized wherein the multi-ply basesheet comprises a third absorbent cellulosic basesheet plied together with the first and second ply; wherein the ply-bonding adhesive is interposed only between two plies prior to lamination; wherein at least one of the first absorbent cellulosic basesheet or the second absorbent cellulosic basesheet is treated with debonder composition by incorporating the debonder composition into an aqueous furnish used to prepare the basesheet; wherein at least one of the first absorbent cellulosic basesheet or the second cellulosic basesheet are treated with debonder composition in an amount of from 1 lb of debonder composition per ton of cellulosic papermaking fiber used to make the basesheet to 16 lbs of debonder composition per ton of papermaking fiber used to make the basesheet, such as wherein at least one of the first absorbent cellulosic basesheet or the second cellulosic basesheet are treated with debonder composition in an amount of from 2 lbs of debonder composition per ton of cellulosic papermaking fiber used to make the basesheet to 10 lbs of debonder composition per ton of papermaking fiber used to make the basesheet; or wherein at least one of the first absorbent cellulosic basesheet or the second cellulosic basesheet are treated with debonder composition in an amount of from 3 lbs of debonder composition per ton of cellulosic papermaking fiber used to make the basesheet to 8 lbs of debonder composition per ton of papermaking fiber used to make the basesheet; or wherein at least one of the first absorbent cellulosic basesheet or the second cellulosic basesheet are treated with debonder composition in an amount of from 4 lbs of debonder composition per ton of cellulosic papermaking fiber used to make the basesheet to 6 lbs of debonder composition per ton of papermaking fiber used to make the basesheet; and/or wherein the first basesheet and the second basesheet are treated with debonder composition in amounts noted above; and/or wherein the first basesheet and the second basesheet are treated with debonder composition by incorporating the debonder composition into aqueous furnish used to prepare the first and second basesheets in the amounts noted above. In cases where a three-ply product is provided, the first basesheet, the second basesheet and the third basesheet may be treated with debonder composition in amounts recited above and the first basesheet, the second basesheet and the third basesheet are treated with debonder composition by incorporating the debonder composition into aqueous furnish used to prepare the basesheets.

The debonder composition may include a surfactant selected from nonionic surfactants and quaternary ammonium surfactants. The quaternary ammonium surfactant may be selected from the group consisting of a dialkyldimethylammonium salts of the formula:

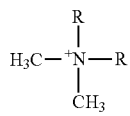

a bis-dialkylamidoammonium salt of the formula:

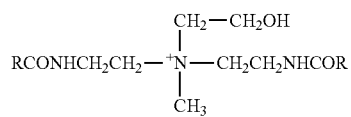

a dialkylmethylimidazolinium salt of the formula:

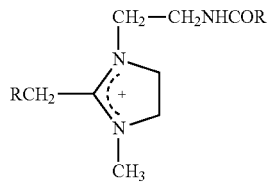

wherein each R may be the same or different and each R indicates a hydrocarbon chain having a chain length of from about twelve to about twenty-two carbon atoms and may be saturated or unsaturated; and wherein said compounds are associated with a suitable anion.

In any embodiment, the debonder composition comprises a nonionic surfactant selected from alkoxylated fatty acids and alkoxylated fatty alcohols which may be the reaction product of a fatty acid or fatty alcohol with ethylene oxide.

Another aspect of the invention is directed to a method of making a multi-ply absorbent sheet according to any of the methods described herein, wherein the multi-ply absorbent sheet has a basis weight of from 12 to 60 lbs/3000 ft$^2$.

Some preferred ply-bonding agents or cellulosic compositions that can be used in connection with any embodiment are those wherein the NFC containing ply-bonding composition contains PVOH and NFC and NFC is present in an amount of from 1% to 20% based on the weight of PVOH in the composition; wherein the NFC containing ply-bonding adhesive contains PVOH and NFC and NFC is present in an amount of from 1.5% to 8% based on the weight of PVOH in the composition; wherein the NFC containing poly-bonding adhesive comprises from 1.5% to 6% by weight polyvinyl alcohol; wherein the NFC containing ply-bonding adhesive comprises from 90-98.5% by weight of the composition water, from 1.5% to 6% by weight of the composition polyvinyl alcohol and from 1% to 30% by weight of nanofibrillated cellulose based on the weight of poly vinyl alcohol in the adhesive; wherein the NFC containing ply-bonding adhesive comprises from 94-98.5% by weight of the composition water, from 1.5% to 6% by weight of the composition polyvinyl alcohol and from 1% to 30% by weight of nanofibrillated cellulose based on the weight of poly vinyl alcohol in the adhesive.

Additional preferred ply-bonding agents that can be used in any embodiment may be those wherein the composition comprises: (a) water; (b) polyvinyl alcohol; and (c) nanofibrillated cellulose, and wherein the NFC ply-bonding adhesive comprises from 90-98.5% by weight of the composition water, from 0.5% to 10% by weight of the composition polyvinyl alcohol and from 0.05% to 2.5% by weight of the composition nanofibrillated cellulose, optionally wherein the weight ratio of nanofibrillated cellulose:PVOH is greater than 0.025 and up to 2; or wherein the weight ratio of nanofibrillated cellulose:PVOH is greater than 0.25 and up to 2. These compositions may be characterized wherein nanofibrillated cellulose is present in an amount of greater than 0.4 percent by weight based on the weight of the aqueous composition and up to 1.5 percent by weight based on the weight of the aqueous composition.

Still other preferred compositions which can be utilized in any embodiment are those wherein the aqueous NFC containing ply-bonding adhesive comprises from 2.5 wt % to 6 wt % PVOH based on the weight of the composition, greater than 90 wt % water based on the weight of the composition and from 1% to 20% NFC based on the weight of the PVOH in the composition; or wherein the aqueous NFC containing ply-bonding adhesive comprises from 1 wt % to 3 wt % PVOH, from 0.25 wt % to 1 wt % NFC and greater than 95 wt % water wherein the content of PVOH, NFC and water is based on the weight of the composition; or wherein the NFC containing ply-bonding adhesive comprises from 0.15 wt % to 3 wt % NFC, a viscosity modifier and greater than 90 wt % water wherein the content of NFC and water are based on the weight of the composition, and wherein the viscosity modifier is present in an amount such that the weight ratio of NFC:viscosity modifier is from 2.5 to 10; and/or wherein the NFC containing ply-bonding adhesive contains PVOH and NFC and NFC is present in an amount of from 15% to 45% based on the weight of PVOH in the composition.

Other compositions that can be utilized in any embodiment include those wherein the NFC containing ply-bonding adhesive contains NFC and a viscosity modifier, such as wherein the weight ratio of NFC:viscosity modifier in the NFC containing ply-bonding adhesive is from 2.5 to 10; or wherein the weight ratio of NFC:viscosity modifier in the NFC containing ply-bonding adhesive is from 4 to 8; or wherein the percent weight ratio of NFC:viscosity modifier is from 5% to 10%; or wherein the percent weight ratio of NFC:viscosity modifier is from 200% to 750%.

A significant advantage of using the ply-bonding compositions of the invention is the increased capability of tolerating higher converting speed. The methods of making multi-ply absorbent sheet of the invention are thus characterized by processes wherein the basesheet is converted to multi-ply absorbent sheet at a converting speed of greater than 1000 fpm; wherein the basesheet is converted to multi-ply absorbent sheet at a converting speed of greater than 1250 fpm; wherein the basesheet is converted to multi-ply absorbent sheet at a converting speed of greater than 1500 fpm; wherein the basesheet is converted to multi-ply absorbent sheet at a converting speed of greater than 1750 fpm; generally wherein the basesheet is converted to multi-ply absorbent sheet at a converting speed of from 1000 fpm to 2250 fpm.

Products include multi-ply absorbent sheet comprising: (a) a first absorbent ply of absorbent cellulosic basesheet; (b) a second absorbent ply of absorbent cellulosic basesheet, wherein at least one of said first absorbent ply of absorbent cellulosic basesheet or said second absorbent ply of cellulosic basesheet is treated with a debonder composition; (c) an NFC containing ply-bonding adhesive interposed between said first absorbent ply and said second absorbent ply, said ply-bonding adhesive adhering said absorbent plies together, wherein said NFC containing ply-bonding adhesive comprises nanofibrillated cellulose and one or more additional components selected from the group consisting of components (i), (ii), (iii) and (iv), wherein: (i) is PVOH; (ii) is PVOH and a viscosity modifier; (iii) is a viscosity modifier and (iv) is a viscosity modifier and a surface tension modifier other than PVOH. The adhesive may be applied between the plies in a discontinuous pattern, such as wherein the discontinuous pattern corresponds to a pattern of raised embossments on one of the absorbent plies of cellulosic sheet.

One method of making absorbent sheet in accordance with the invention comprises (a) providing a first absorbent cellulosic basesheet; (b) providing a second absorbent cellulosic basesheet; (c) interposing an NFC containing ply-bonding adhesive between said first absorbent cellulosic basesheet and said second absorbent cellulosic basesheet, wherein the NFC containing ply-bonding adhesive comprises nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier; said NFC containing ply-bonding adhesive optionally including (vi) a surface tension modifier other than PVOH; and (d) plying said first absorbent cellulosic basesheet with said second absorbent cellulosic basesheet by pressing them together with the NFC containing ply-bonding adhesive interposed therebetween. One preferred NFC containing ply-bonding adhesive used in the process comprises one or more of: (i) a water soluble cellulose derivative; (ii) a water soluble polyol; and (iii) a viscosity modifier other than a water soluble cellulose derivative. The water soluble polyol employed may be polyethylene glycol, optionally having a molecular weight of from 400 to 10,000 Daltons. When a water soluble cellulose derivative is used, the water soluble cellulose derivative is optionally selected from hydroxypropyl methyl cellulose and hydroxypropyl cellulose.

The present invention thus also encompasses an adhesive comprising water, nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier; said NFC containing ply-bonding adhesive optionally including (vi) a surface tension modifier other than PVOH. Any of the components may be present in amounts noted herein.

Also included are multiply products incorporating the adhesive comprising: (a) a first absorbent ply of absorbent cellulosic basesheet; (b) a second absorbent ply of absorbent cellulosic basesheet, wherein optionally at least one of said first absorbent ply of absorbent cellulosic basesheet or said second absorbent ply of cellulosic basesheet is treated with a debonder composition; (c) an NFC containing ply-bonding adhesive interposed between said first absorbent ply and said second absorbent ply, said ply-bonding adhesive adhering said absorbent plies together, wherein said NFC containing ply-bonding adhesive comprises nanofibrillated cellulose and one or more additional components selected from the group consisting of components (i), (ii), (iii), (iv) and (v) wherein (i) is a water-soluble cellulose derivative; (ii) is a water soluble polyol; (iii) is a viscosity modifier other than a water soluble cellulose derivative; (iv) is PVOH; and (v) is PVOH and a viscosity modifier; said NFC containing ply-bonding adhesive optionally including (vi) a surface tension modifier other than PVOH.

In any embodiment, including processes of making multi-ply absorbent products and the products so made, an adhesive comprising (a) water; (b) nanofibrillated cellulose; (c) one or more of: (i) a water-soluble cellulose derivative; or (ii) a water soluble polyol; and (iii) a viscosity modifier other than a water soluble cellulose derivative may be employed. The water soluble polyol may be a polyethylene glycol, suitably having a molecular weight of from 400 to 10,000 Daltons; whereas the water soluble cellulose derivative is selected from hydroxypropyl methyl cellulose and hydroxypropyl cellulose. The other components may be present or absent; if present they are present in amounts and having the characteristics of any embodiment described herein.

One preferred adhesive comprises: (a) greater than 90 wt % water; (b) water soluble polyol and a water soluble cellulose derivative present in an aggregate amount of from 1.5 wt % to 7 wt %, wherein the weight ratio of water soluble polyol to water soluble cellulose derivative is from 2 to 10; and (c) nanofibrillated cellulose present in an amount of from 0.025 wt % to 0.5 wt %, wherein the weight ratio of water soluble polyol and water soluble cellulose derivative collectively to NFC is from 5 to 125.

Another preferred adhesive comprises: (a) greater than 90 wt % water; (b) a viscosity modifier other than a water soluble cellulose derivative present in an amount of from 0.25% to 3 wt %; (c) water soluble polyol and a water soluble cellulose derivative present in an aggregate amount of from 1 wt % to 5 wt %, wherein the weight ratio of the water soluble polyol to the water soluble cellulose derivative is from 2 to 10; and (d) nanofibrillated cellulose present in an amount of from 0.25 wt % to 1 wt %, wherein the weight ratio of water soluble polyol and water soluble cellulose derivative collectively to NFC is from 1 to 25.

Yet another preferred adhesive comprises: (a) 95 wt % or more water; (b) NFC present in an amount of from 0.05 wt % to 0.75 wt %; and (c) a viscosity modifier present in an amount of from 0.05 wt % to 2 wt %, wherein the percent weight ratio of NFC:viscosity modifier is from 2.5% to 1000%.

Still yet another adhesive comprises: (a) greater than 90 wt % water; (b) water soluble polyol and a water soluble cellulose derivative present in an aggregate amount of 0.5 wt % to 5 wt % wherein the weight ratio of the water soluble polyol to the water soluble cellulose derivative is from 2 to 10; (c) nanofibrillated cellulose in an amount of from 0.025 wt % to 0.2 wt %; and (d) a viscosity modifier other than a water soluble cellulose derivative present in an amount of from 0.3 wt % to 2 wt %, wherein the percent weight ratio of NFC:viscosity modifier other than water soluble cellulose derivative is from 2.5% to 75%.

A further adhesive composition which may be employed comprises:
(a) greater than 90 wt % water; (b) nanofibrillated cellulose present in an amount of from 0.05 wt % to 0.2 wt %; and (c) a viscosity modifier present in an amount of from 0.3% to 3 wt %, wherein the percent weight ratio of NFC:viscosity modifier is from 2.5% to 75%.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A ply-bonding agent or adhesive composition characterized by a viscosity and a surface tension for the manufacture of paper tissue and paper towel, said composition comprising:
   (a) water in an amount of greater than 90 percent by weight of the agent or the composition;
   wherein components of the ply-bonding agent or adhesive composition other than water comprise 90% or more by weight of components (b) and (c), wherein
   (b) is nanofibrillated cellulose (NFC); and
   (c) is at least two modifiers effective to modify (i) the viscosity of the composition and (ii) the surface tension of the composition,
   wherein the modifiers are selected from the group consisting of components (iii) or (iv), wherein: (iii) is PVOH and a viscosity modifier; and (iv) is a viscosity modifier and a surface tension modifier other than PVOH, and
   wherein the viscosity modifier is selected from xanthan gum, natural gums other than xanthan gum, carboxymethylcellulose, methylcellulose, ethylcellulose, hydroxyethylcellulose, carboxyethylcellulose, polyethylene glycols, polypropylene glycols, proteins, synthetic polymers and pectin, and wherein the viscosity modifier is effective to disperse NFC particles and reduce the viscosity of an aqueous composition including NFC.

2. The ply-bonding agent or adhesive composition according to claim 1, wherein the viscosity modifier is xanthan gum, carboxymethylcellulose or pectin.

3. The ply-bonding agent or adhesive composition according to claim 1, wherein the viscosity modifier is xanthan gum.

4. The ply-bonding agent or adhesive composition according to claim 1, wherein the viscosity modifier is carboxymethylcellulose.

5. The ply-bonding agent or adhesive composition according to claim 1, wherein the weight ratio of nanofibrillated cellulose:viscosity modifier in the ply-bonding agent or adhesive composition is from 1:0.05 to 1:0.5.

6. The ply-bonding agent or adhesive composition according to claim 1, wherein the weight ratio of nanofibrillated cellulose:viscosity modifier in the ply-bonding agent or adhesive composition is from 1:0.13 to 1:0.2.

7. The ply-bonding agent or adhesive composition according to claim 1, wherein PVOH is present in an amount of from 0.5 percent by weight to 3 percent by weight based on the weight of the agent or the composition.

8. The ply-bonding agent or adhesive composition according to claim 1, wherein the ply-bonding agent or the adhesive composition contains a surface tension modifier selected from surfactants and water soluble polymers.

9. The ply-bonding agent or adhesive composition according to claim 1, wherein the ply-bonding agent or adhesive composition contains from 0.25 percent by weight to 3 percent by weight of nanofibrillated cellulose based on the weight of the agent or the composition.

10. The ply-bonding agent or adhesive composition according to claim 9, wherein the agent or the composition contains from 0.35 percent by weight to 1.5 percent by weight of nanofibrillated cellulose based on the weight of the agent or the composition.

11. The ply-bonding agent or adhesive composition according to claim 1, wherein said nanofibrillated cellulose has a Characteristic Breaking Length of at least 3 km.

12. The ply-bonding agent or adhesive composition according to claim 1, wherein said nanofibrillated cellulose has a Characteristic Nanofiber Viscosity of greater than 15,000 cP at a shear rate of 5 sec$^{-1}$ and a Characteristic Nanofiber Viscosity of less than 2,000 cP at a shear rate of 500 sec$^{-1}$.

13. A multi-ply absorbent sheet comprising:
   (a) a first absorbent ply of absorbent cellulosic basesheet;
   (b) a second absorbent ply of absorbent cellulosic basesheet,
   wherein at least one of said first absorbent ply of absorbent cellulosic basesheet or said second absorbent ply of cellulosic basesheet is treated with a debonder composition;
   (c) a ply-bonding agent or adhesive composition according to claim 1 interposed between said first absorbent ply and said second absorbent ply, said ply-bonding agent or adhesive composition adhering said absorbent plies together.

14. The ply-bonding agent or adhesive composition according to claim 1, wherein the viscosity modifier is effective to reduce the room temperature viscosity of a 1% NFC aqueous composition by at least 750 cP at a shear rate of 100 s$^{-1}$ when added to the composition at a level of 0.1% by weight of the aqueous composition.

15. The ply-bonding agent or adhesive composition according to claim 1, comprising—from 0.15 wt % NFC to 3 wt % NFC, from 0.02 wt % to 0.2 wt % of the viscosity modifier and from 95 wt % to 99.9 wt % water, wherein the weight ratio of NFC to the viscosity modifier is from 150 to 0.75.

16. A method of making multi-ply absorbent sheet comprising:
   (a) providing a first absorbent cellulosic basesheet;
   (b) providing a second absorbent cellulosic basesheet,
   (c) interposing a ply-bonding agent or adhesive composition according to claim 1 between said first absorbent cellulosic basesheet and said second absorbent cellulosic basesheet, and
   (d) plying said first absorbent cellulosic basesheet with said second absorbent cellulosic basesheet by pressing them together with the ply-bonding agent or adhesive composition interposed therebetween.

17. The method of making multi-ply absorbent sheet according to claim 16, wherein at least one of said first absorbent cellulosic basesheet or said second absorbent cellulosic basesheet is treated with a debonder composition.

18. The method of making multi-ply absorbent sheet according to claim 17, wherein at least one of the first absorbent cellulosic basesheet or the second cellulosic basesheet are treated with debonder composition in an amount of from 1 lb of debonder composition per ton of cellulosic papermaking fiber used to make the basesheet to 16 lbs of debonder composition per ton of papermaking fiber used to make the basesheet.

19. The method of making a multi-ply absorbent sheet according to claim 17, wherein at least one of the first absorbent cellulosic basesheet or the second cellulosic basesheet are treated with debonder composition in an amount of from 2 lbs of debonder composition per ton of cellulosic papermaking fiber used to make the basesheet to 10 lbs of debonder composition per ton of papermaking fiber used to make the basesheet.

20. The method of making a multi-ply absorbent sheet according to claim 17, wherein at least one of the first absorbent cellulosic basesheet or the second absorbent cellulosic basesheet is treated with debonder composition by incorporating the debonder composition into an aqueous furnish used to prepare the basesheet.

21. The method of making a multi-ply absorbent sheet according to claim 17, wherein the debonder composition comprises a surfactant selected from nonionic surfactants and quaternary ammonium surfactants and mixtures thereof.

22. A method of making multi-ply absorbent sheet comprising:
   (a) providing a first absorbent cellulosic basesheet;
   (b) providing a second absorbent cellulosic basesheet, wherein at least one of the first absorbent cellulosic basesheet or the second cellulosic basesheet are treated with debonder composition in an amount of from 1 lb of debonder composition per ton of cellulosic papermaking fiber used to make the basesheet to 16 lbs of debonder composition per ton of papermaking fiber used to make the basesheet;
   (c) interposing a nanofibrillated cellulose (NFC) containing ply-bonding adhesive between said first absorbent cellulosic basesheet and said second absorbent cellulosic basesheet; and
   (d) plying said first absorbent cellulosic basesheet with said second absorbent cellulosic basesheet by pressing them together with the NFC containing ply-bonding adhesive interposed therebetween,
      wherein the NFC containing ply-bonding adhesive comprises
   (e) water in an amount of greater than 90 percent by weight of the ply-bonding adhesive;
   wherein components of the ply-bonding adhesive other than water comprise 90% or more by weight of components (f) and (g), wherein
   (f) is NFC; and
   (g) is at least two modifiers effective to modify (i) the viscosity of the composition and (ii) the surface tension of the adhesive,
   wherein the modifiers are selected from the group consisting of components (iii) or (iv), wherein:(iii) is PVOH and a viscosity modifier; and (iv) is a viscosity modifier and a surface tension modifier other than PVOH, and
   wherein the viscosity modifier is selected from xanthan gum, natural gums other than xanthan gum, carboxymethylcellulose, methylcellulose, ethylcellulose, hydroxyethylcellulose, carboxyethylcellulose, polyethylene glycols, polypropylene glycols, proteins, synthetic polymers and pectin, and wherein the viscosity modifier is effective to disperse NFC particles and reduce the viscosity of an aqueous composition including NFC.

23. The method of making a multi-ply absorbent sheet according to claim 22, wherein the process comprises:
   (A) feeding said first absorbent cellulosic basesheet to an embossing nip;
   (B) embossing a pattern of raised embossments in said first absorbent cellulosic basesheet;
   (C) applying the NFC containing ply-bonding adhesive to the raised embossments of said first absorbent cellulosic basesheet; and
   (D) plying said second absorbent cellulosic basesheet with said first absorbent cellulosic basesheet by pressing said second absorbent cellulosic basesheet to the adhesive disposed on the raised embossments of said first absorbent cellulosic basesheet.

24. The method of making a multi-ply absorbent sheet according to claim 22, wherein the multi-ply basesheet comprises a third absorbent cellulosic basesheet plied together with the first and second ply.

25. The method of making a multi-ply absorbent sheet according to claim 22, wherein the NFC containing ply-bonding adhesive comprises—from 90-98.5% by weight of the adhesive water—and from 0.05% to 2.5% by weight of the adhesive of the nanofibrillated cellulose.

26. The method of making a multi-ply absorbent sheet according to claim 25, wherein the weight ratio of nanofibrillated cellulose: viscosity modifier in the NFC containing ply-bonding adhesive is from 1:0.05 to 1:0.5.

* * * * *